United States Patent
Zhang et al.

(10) Patent No.: US 11,961,265 B2
(45) Date of Patent: Apr. 16, 2024

(54) POINT CLOUD ENCODING AND DECODING METHOD AND APPARATUS

(71) Applicant: Huawei Technologies Co., Ltd., Shenzhen (CN)

(72) Inventors: Dejun Zhang, Shenzhen (CN); Kangying Cai, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 528 days.

(21) Appl. No.: 17/345,514

(22) Filed: Jun. 11, 2021

(65) Prior Publication Data

US 2021/0304443 A1    Sep. 30, 2021

Related U.S. Application Data

(63) Continuation of application No. PCT/CN2019/122216, filed on Nov. 29, 2019.

(30) Foreign Application Priority Data

Dec. 13, 2018    (CN) .......................... 201811538662.9

(51) Int. Cl.
    *G06T 9/00*      (2006.01)
    *G06T 7/10*      (2017.01)

(52) U.S. Cl.
    CPC ................ *G06T 9/001* (2013.01); *G06T 7/10* (2017.01); *G06T 2207/10028* (2013.01); *G06T 2207/20021* (2013.01)

(58) Field of Classification Search
    CPC . G06T 9/001; G06T 7/10; G06T 2207/10028; G06T 2207/20021;

(Continued)

(56) References Cited

U.S. PATENT DOCUMENTS 9,562,971 B2    2/2017  Shenkar et al.
2017/0347122 A1  11/2017  Chou et al.
(Continued)

FOREIGN PATENT DOCUMENTS

CN    104778688 A    7/2015
CN    105976353 A    9/2016
(Continued)

OTHER PUBLICATIONS

Huawei Technologies, et al., "TMC2 Improved Temporally Consistent Patch Packing (Temporally Consistent Multiframe Patch Packing TCMPP)," Apr. 2018, San Diego, USA, 4 pages.

(Continued)

*Primary Examiner* — Molly Wilburn
(74) *Attorney, Agent, or Firm* — Conley Rose, P.C.

(57) ABSTRACT

The point cloud encoding method includes obtaining subgroup information of N frames of point clouds, where the subgroup information includes a quantity M of subgroups into which the N frames of point clouds are divided or a quantity of frames of point clouds included in each of one or more subgroups among the M subgroups, and writing the subgroup information of the N frames of point clouds into a bitstream. The point cloud decoding method includes receiving a bitstream, parsing the bitstream to obtain subgroup information, where the subgroup information includes a quantity M of subgroups into which N frames of point clouds are divided or a quantity of frames of point clouds included in each of one or more subgroups among the M subgroups, and decoding the N frames of point clouds based on the subgroup information.

20 Claims, 20 Drawing Sheets

(58) Field of Classification Search
CPC ........ G06T 9/40; H04N 19/88; H04N 19/597; H04N 19/184; H04N 19/119; H04N 19/42; H04N 19/44; H04N 19/503; H04N 19/91
See application file for complete search history.

(56) References Cited

U.S. PATENT DOCUMENTS

| | | | |
|---|---|---|---|
| 2018/0268570 A1 | 9/2018 | Budagavi et al. | |
| 2018/0324240 A1 | 11/2018 | Fleureau et al. | |
| 2019/0371044 A1 | 12/2019 | Yu et al. | |
| 2020/0153885 A1* | 5/2020 | Lee | G06T 15/04 |
| 2020/0381022 A1* | 12/2020 | Ilola | H04N 19/70 |
| 2021/0029381 A1 | 1/2021 | Zhang et al. | |
| 2021/0219000 A1 | 7/2021 | Zhang et al. | |

FOREIGN PATENT DOCUMENTS

| | | |
|---|---|---|
| CN | 108171761 A | 6/2018 |
| CN | 108632607 A | 10/2018 |
| CN | 108765487 A | 11/2018 |
| CN | 108810571 A | 11/2018 |
| EP | 3399757 A1 | 11/2018 |
| EP | 3399758 A1 | 11/2018 |
| WO | 2019196475 A1 | 10/2019 |
| WO | 2020063246 A1 | 4/2020 |

OTHER PUBLICATIONS

3DG subgroup, et al., "Second Working draft for Video-based Point Cloud Coding (Draft 2)," ISO/IEC JTC1/SC29/WG11 MPEG 2018/N17771, Jul. 2018, Ljubljana, Slovenia, 45 pages.

Liu, J., "Data-Adaptive Packing Method for Compression of Dynamic Point Cloud Sequences," 2019 IEEE International Conference on Multimedia and Expo (ICME), 6 pages.

ITU-T H.263, Jan. 2005, "Series H: Audiovisual and Multimedia Systems, Infrastructure of audiovisual services—Coding of moving video, Video coding for low bit rate communication," 226 pages.

JCTVC-AG0026, Litwix, L., et al., "Random Access encoding with HM for video-based point cloud codec," Joint Collaborative Team on Video Coding (JCT-VC) of ITU-T SH 16 WP 3 and ISO/IEC JTC 1/SC 29/WG 11,33rd Meeting: Macau, CN, Oct. 6-12, 2018, 4 pages.

ITU-T H.264, Apr. 2017, "Series H: Audiovisual and Multimedia Systems, Infrastructure of audiovisual services—Coding of moving video, Advanced video coding for generic audiovisual services," 812 pages.

ITU-T H.265, Feb. 2018 "Series H: Audiovisual and Multimedia Systems Infrastructure of audiovisual services—Coding of moving video, High efficiency video coding," 692 pages.

* cited by examiner

POINT CLOUD ENCODING AND DECODING METHOD AND APPARATUS

CROSS-REFERENCE TO RELATED APPLICATIONS

This is a continuation of International Patent Application No. PCT/CN2019/122216 filed on Nov. 29, 2019, which claims priority to Chinese Patent Application No. 201811538662.9 filed on Dec. 13, 2018. The disclosures of the aforementioned applications are hereby incorporated by reference in their entireties.

TECHNICAL FIELD

This application relates to the point cloud field, and in particular, to a point cloud encoding method and apparatus, and a point cloud decoding method and apparatus.

BACKGROUND

With continuous development of a three-dimensional (3D) sensor (for example, a 3D scanner) technology, it is increasingly convenient to collect point cloud data, and the point cloud data is collected on an increasingly large scale. Therefore, how to effectively code the point cloud data is an urgent problem to be resolved.

In existing point cloud encoding and decoding processes, when a signal is processed and coded based on a fixed frame length, because correlation of patches in a plurality of consecutive frames of point clouds is not considered, spatial consistency of patches having a matching relationship cannot be effectively ensured. As a result, video coding performance and patch auxiliary information coding performance are degraded.

SUMMARY

Embodiments of this application provide a point cloud encoding method and apparatus, and a point cloud decoding method and apparatus, to help improve coding efficiency of point cloud data.

According to a first aspect, an embodiment of this application provides a point cloud encoding method, including obtaining subgroup information of N frames of point clouds, where the subgroup information includes a quantity M of subgroups into which the N frames of point clouds are divided and/or a quantity of frames of point clouds included in each of one or more subgroups among the M subgroups, writing the subgroup information of the N frames of point clouds into a bitstream, and encoding the N frames of point clouds based on the subgroup information of the N frames of point clouds.

The M subgroups are obtained by grouping the N frames of point clouds in an adaptive grouping manner. Further, the method further includes pre-dividing a plurality of frames of point clouds in the N frames of point clouds to obtain a pre-divided subgroup, and determining the pre-divided subgroup is to be one of the M subgroups based on characteristic information of the pre-divided subgroup, where the characteristic information is used to represent a size of an occupancy map of a point cloud in the pre-divided subgroup.

In an embodiment, encoding the N frames of point clouds based on the subgroup information of the N frames of point clouds further includes the subgroup information of the N frames of point clouds is used to decode auxiliary information of the patch in the N frames of point clouds, and then the N frames of point clouds are encoded based on the auxiliary information of the patch in the N frames of point clouds.

In a possible embodiment, writing the subgroup information of the N frames of point clouds into a bitstream includes writing $N_0, N_1, \ldots, N_{M-1}$, and/or M into the bitstream, where M is greater than or equal to 1, or writing (M−1) values in values of $N_0, N_1, \ldots,$ and $N_{M-1}$ and M into the bitstream, where M is greater than or equal to 1, $N_m$ represents a quantity of frames of point clouds in an $m^{th}$ subgroup of the M subgroups, and m=0, 1, ..., and M−1.

Writing $N_0, N_1, \ldots, N_{M-1}$, and/or M into the bitstream includes writing only M into the bitstream, where M=1 in this case, that is, N frames of point clouds are divided into one group, writing $N_0, N_1, \ldots,$ and $N_{M-1}$ into the bitstream, where M is greater than or equal to 1, or writing $N_0, N_1, \ldots, N_{M-1}$, and M into the bitstream, where M is greater than or equal to 1.

In a possible embodiment, writing the subgroup information of the N frames of point clouds into a bitstream further includes writing T frames in $N_0, N_1, \ldots,$ and $N_{M-1}$ and/or T into the bitstream, where T is greater than 0 and less than M−1.

T frames in $N_0, N_1, \ldots,$ and $N_{M-1}$ may each mean a quantity of frames of point clouds included in each of T consecutive subgroups in terms of a division order among the M subgroups.

It should be noted herein that one or more of $N_0, N_1, \ldots,$ and $N_{M-1}$ can be written into the bitstream by using a fixed-length encoding scheme or a variable-length encoding scheme. The fixed-length encoding scheme means that encoding is performed by using a fixed quantity of bits. The variable-length encoding scheme includes but is not limited to an arithmetic encoding scheme and an exponential Columbus encoding scheme.

In a possible embodiment, writing the subgroup information of the N frames of point clouds into a bitstream includes generating one or more bit strings based on a quantity of frames of point clouds in one or more subgroups among the M subgroups, where a length of an $s^{th}$ bit string in the one or more bit strings is a quantity of frames of point clouds included in an $s^{th}$ subgroup of the one or more subgroups, and writing the one or more bit strings into the bitstream. In this manner, for the N frames of point clouds, a bit string (that is, M bit strings) including N bits may be finally obtained, and the N bits can be encoded by using N bits, or encoded by using an arithmetic encoding scheme.

In a possible embodiment, the one or more subgroups include an $(s-1)^{th}$ subgroup and an $s^{th}$ subgroup, and a value of a bit in a bit string corresponding to the $(s-1)^{th}$ subgroup is different from a value of a bit in a bit string corresponding to the $s^{th}$ subgroup. For example, the value of the bit in the bit string corresponding to the $(s-1)^{th}$ subgroup is a first identifier, and the value of the bit in the bit string corresponding to the $s^{th}$ subgroup is a second identifier. A value of a bit in a bit string corresponding to an $(s+1)^{th}$ subgroup may be a first identifier or a third identifier, and the third identifier is different from both the first identifier and the second identifier.

Optionally, the first identifier may be 0 or 1, the second identifier may be 0 or 1, and the first identifier is different from the second identifier.

In a possible embodiment, values of bits in a bit string corresponding to each of the one or more subgroups are the same. It should be noted that, that values of bits in a bit string corresponding to each subgroup are the same means that values of all bits in the bit string corresponding to each subgroup are the same.

It should be noted herein that one subgroup corresponds to one bit string, and one bit of the bit string represents a frame of point cloud in one subgroup. Therefore, a quantity of frames of point clouds included in the subgroup corresponding to the bit string can be determined based on a quantity of bits in the bit string (that is, a length of the bit string). For a bit string corresponding to one subgroup, values of all bits in the bit string are the same, and values of bits in two bit strings respectively corresponding to two adjacent subgroups in terms of a division order are different. Therefore, quantities of frames of point clouds respectively included in two adjacent subgroups in terms of a division order can be distinguished.

In a possible embodiment, the encoding method further includes writing rotation angle information of one or more matched patches in a patch set of the first frame of point cloud in a current subgroup into the bitstream.

The rotation angle information includes a specific rotation angle value or a rotation angle index. For example, if a rotation angle value of a patch is 0, it indicates that the patch does not rotate. If the rotation angle value of the patch is 20, it indicates that the patch rotates by 20 degrees. For another example, if a rotation angle index of a patch is 0, it indicates that the patch does not rotate. If the rotation angle index of the patch is 1, it indicates that the patch rotates by 15 degrees. If the rotation angle index of the patch is 2, it indicates that the patch rotates by 30 degrees.

The rotation angle information can be written into the bitstream by using a fixed-length encoding scheme or a variable-length encoding scheme.

It should be noted that the one or more matched patches in the patch set of the first frame of point cloud in the current subgroup are patches for which a matched patch is found in a patch set of a reference frame of the first frame of point cloud in the current subgroup. The reference frame of the first frame of point cloud in the current subgroup may be a point cloud in a previous subgroup of the current subgroup.

The one or more matched patches in the patch set of the first frame of point cloud in the current subgroup are patches for which a matched patch is found in a patch set of a reference frame of the first frame of point cloud in the current subgroup.

According to a second aspect, an embodiment of this application provides a point cloud decoding method, including receiving a bitstream, parsing the bitstream to obtain subgroup information, where the subgroup information includes a quantity M of subgroups into which N frames of point clouds are divided and/or a quantity of frames of point clouds included in each of one or more subgroups among the M subgroups, and decoding the N frames of point clouds based on the subgroup information.

Decoding the N frames of point clouds based on the subgroup information includes obtaining auxiliary information of a patch in the N frames of point clouds based on the subgroup information, and reconstructing the N frames of point clouds based on the auxiliary information of the patch in the N frames of point clouds.

In a possible embodiment, parsing the bitstream to obtain subgroup information includes parsing the bitstream to obtain a quantity of frames of point clouds in each of the M subgroups and/or M, where M is greater than or equal to 1, or parsing the bitstream to obtain M and a quantity of frames of point clouds in each of M−1 subgroups, where M is greater than or equal to 1.

Parsing the bitstream to obtain a quantity of frames of point clouds in each of the M subgroups and/or M includes parsing the bitstream to obtain only M, where M=1 in this case, parsing the bitstream to obtain only $N_0, N_1, \ldots,$ and $N_{M-1}$, where M is greater than or equal to 1, or parsing the bitstream to first obtain M, and then obtain $N_0, N_1, \ldots,$ and $N_{M-1}$ based on M, where M is greater than or equal to 1 in this case, $N_m$ represents a quantity of frames of point clouds in an $m^{th}$ subgroup of the M subgroups, and m=0, 1, ..., and M−1.

It should be noted that M=1 means that the N frames of point clouds are divided into one subgroup, and the subgroup includes the N frames of point clouds. Therefore, a decoder side can deduce, according to M=1, that an encoder side divides the N frames of point clouds into one subgroup, where the subgroup includes the N frames of point clouds. Further, the decoder side can decode the N frames of point clouds based on M and N.

In a possible embodiment, decoding the N frames of point clouds based on the subgroup information includes determining a quantity of frames of point clouds in a target subgroup based on N and a quantity of frames of point clouds in each of M−1 subgroups, where the target subgroup is a subgroup other than the M−1 subgroups in the M subgroups, and M is greater than or equal to 1, and decoding the N frames of point clouds based on a quantity of frames of point clouds included in each of the M subgroups.

In a possible embodiment, some of the N frames of point clouds are grouped adaptively, and the other frames of point clouds are grouped based on a fixed frame length. Therefore, the bitstream can be parsed to obtain T frames in $N_0, N_1, \ldots,$ and $N_{M-1}$ and/or T. T frames in $N_0, N_1, \ldots,$ and $N_{M-1}$ each mean a quantity of frames of point clouds included in each of T consecutive subgroups in terms of a division order among the M subgroups. After the bitstream is parsed to obtain T frames in $N_0, N_1, \ldots,$ and $N_{M-1}$ and/or T, a quantity P of frames of point clouds other than point clouds included in the T subgroups in the M subgroups is obtained based on N and T frames in $N_0, N_1, \ldots,$ and $N_{M-1}$. Because the P frames of point clouds are grouped based on a fixed frame length, a quantity of subgroups into which the P frames of point clouds are divided is determined based on P and the fixed frame length, that is, P/fixed frame length. Further, M and a quantity of frames of point clouds included in each of the M subgroups are determined, where M=T+ P/fixed frame length.

In a possible embodiment, parsing the bitstream to obtain subgroup information includes parsing the bitstream to obtain one or more bit strings, where a length of an $s^{th}$ bit string in the one or more bit strings is a quantity of frames of point clouds included in an $s^{th}$ subgroup of the one or more subgroups, and one or more subgroups correspond to one or more bit strings.

In a possible embodiment, decoding the N frames of point clouds based on the subgroup information includes obtaining a quantity of frames of point clouds included in each of one or more subgroups based on a length of each of one or more bit strings, determining a quantity of frames of point clouds included in each of the M subgroups, where the M subgroups include one or more subgroups, and decoding the N frames of point clouds based on the quantity of frames of point clouds included in each of the M subgroups.

When a plurality of bit strings are M bit strings, the quantity of frames of point clouds included in each of the M subgroups can be determined based on a length of each of the plurality of bit strings (that is, the M bit strings).

When the plurality of bit strings is M−1 bit strings, a quantity of frames of point clouds included in each of the M−1 subgroups can be determined based on a length of each of the M−1 bit strings. Then, a quantity of frames of point clouds included in the target subgroup is determined based on N and the quantity of frames of point clouds included in each of the M−1 subgroups, where the M−1 subgroups correspond to the M−1 bit strings, and the target subgroup is a subgroup other than the M−1 subgroups in the M subgroups.

When the plurality of bit strings are T bit strings, where T is greater than 0 and less than M−1, a quantity of frames of point clouds included in each of the T subgroups can be determined based on a length of each of the T bit strings, and the T bit strings correspond to the T subgroups. Then, a quantity P of frames of point clouds other than point clouds included in the T subgroups can be determined based on N and the quantity of frames of point clouds included in each of the T subgroups. Because the P frames of point clouds are grouped based on a fixed frame length, a quantity of subgroups into which the P frames of point clouds are divided is determined based on P and the fixed frame length, that is, P/fixed frame length. Further, M and a quantity of frames of point clouds included in each of the M subgroups are determined, where M=T+P/fixed frame length.

In a possible embodiment, the one or more subgroups include an $(s-1)^{th}$ subgroup and an $s^{th}$ subgroup, and a value of a bit in a bit string corresponding to the $(s-1)^{th}$ subgroup is different from a value of a bit in a bit string corresponding to the $s^{th}$ subgroup.

In a possible embodiment, values of bits in a bit string corresponding to each of the one or more subgroups are the same. That values of bits in a bit string corresponding to each subgroup are the same means that values of all bits in the bit string corresponding to each subgroup are the same.

It should be noted that, a value of a bit in a bit string corresponding to an $m^{th}$ subgroup is a first identifier, when a zeroth bit in the $m^{th}$ subgroup is a first identifier, a value of an $n^{th}$ bit is a first identifier, and a value of an $(n+1)^{th}$ bit is not a first identifier, a quantity of frames in the $m^{th}$ subgroup is determined to be n+1. The first identifier is, for example, 0 or 1.

In a possible embodiment, the method further includes parsing the bitstream to obtain rotation angle information of one or more matched patches in a patch set of the first frame of point cloud in a current subgroup, and determining rotation angle information of a matched patch in a patch set of a non-first frame of point cloud in the current subgroup based on the rotation angle information of the one or more matched patches in the patch set of the first frame of point cloud.

The one or more matched patches in the patch set of the first frame of point cloud in the current subgroup are patches for which a matched patch is found in a patch set of a reference frame of the first frame of point cloud in the current subgroup. The reference frame of the first frame of point cloud in the current subgroup may be a point cloud in a previous subgroup of the current subgroup.

The non-first frame of point cloud in the current subgroup is a point cloud other than the first frame in the current subgroup. The matched patch in the patch set of the non-first frame of point cloud in the current subgroup is a patch that is in the patch set of the non-first frame of point cloud in the current subgroup and that has a matching relationship with the one or more matched patches in the patch set of the first frame of point cloud.

The rotation angle information includes a specific rotation angle value or a rotation angle index. For example, if a rotation angle value of a patch is 0, it indicates that the patch does not rotate. If the rotation angle value of the patch is 20, it indicates that the patch rotates by 20 degrees. For another example, if a rotation angle index of a patch is 0, it indicates that the patch does not rotate. If the rotation angle index of the patch is 1, it indicates that the patch rotates by 15 degrees. If the rotation angle index of the patch is 2, it indicates that the patch rotates by 30 degrees.

It can be learned that, in the solution of this embodiment of this application, subgroup information of N frames of point clouds obtained by grouping the N frames of point clouds in an adaptive grouping manner is written into a bitstream, and the subgroup information is obtained by decoding at a decoder side. In the adaptive grouping manner, correlation of patches among a plurality of consecutive frames of point clouds is fully considered. This fully ensures spatial consistency of patches having a matching relationship, and improves coding efficiency of point clouds. The subgroup information obtained through adaptive grouping is used to guide the decoder side in correctly decoding the point cloud data.

According to a third aspect, an embodiment of this application provides another point cloud encoding method, including obtaining rotation angle information of one or more matched patches in a patch set of the first frame of point cloud in a current subgroup, and writing the rotation angle information of the one or more matched patches in the patch set of the first frame of point cloud in the current subgroup into a bitstream.

The current subgroup is obtained by grouping the N frames of point clouds in an adaptive grouping manner.

A non-first frame of point cloud in the current subgroup is a point cloud other than the first frame in the current subgroup. The one or more matched patches in the patch set of the first frame of point cloud in the current subgroup are patches for which a matched patch is found in a patch set of a reference frame of the first frame of point cloud in the current subgroup. The reference frame of the first frame of point cloud in the current subgroup may be a point cloud in a previous subgroup of the current subgroup.

It should be noted that the rotation angle information of the one or more matched patches in the patch set of the first frame of point cloud in the current subgroup can be written into the bitstream by using a fixed-length encoding scheme or a variable-length encoding scheme. The fixed-length encoding scheme includes but is not limited to a fixed-bit encoding scheme, and the variable-length encoding scheme includes but is not limited to an arithmetic encoding scheme and an exponential Columbus encoding scheme.

The rotation angle information includes a specific rotation angle value or a rotation angle index. For example, if a rotation angle value of a patch is 0, it indicates that the patch does not rotate. If the rotation angle value of the patch is 20, it indicates that the patch rotates by 20 degrees. For another example, if a rotation angle index of a patch is 0, it indicates that the patch does not rotate. If the rotation angle index of the patch is 1, it indicates that the patch rotates by 15 degrees. If the rotation angle index of the patch is 2, it indicates that the patch rotates by 30 degrees.

According to a fourth aspect, an embodiment of this application provides another point cloud decoding method, including receiving a bitstream, parsing the bitstream to obtain rotation angle information of one or more matched patches in a patch set of the first frame of point cloud in a current subgroup, and determining rotation angle information of a matched patch in a patch set of a non-first frame of point cloud in the current subgroup based on the rotation angle information of the one or more matched patches in the patch set of the first frame of point cloud, where rotation angle information of a matched patch in a point cloud in the current subgroup is used to decode the point cloud in the current subgroup.

The one or more matched patches in the patch set of the first frame of point cloud in the current subgroup are patches for which a matched patch is found in a patch set of a reference frame of the first frame of point cloud in the current subgroup. The reference frame of the first frame of point cloud in the current subgroup may be a point cloud in a previous subgroup of the current subgroup.

A non-first frame of point cloud in the current subgroup is a point cloud other than the first frame in the current subgroup. The matched patch in the patch set of the non-first frame of point cloud in the current subgroup is a patch that is in the patch set of the non-first frame of point cloud in the current subgroup and that has a matching relationship with the one or more matched patches in the patch set of the first frame of point cloud.

It should be noted that decoding the current subgroup includes but is not limited to the rotation angle information of the matched patch in the point cloud in the current subgroup, and may further include rotation angle information of a non-matched patch in a point cloud in the current subgroup.

The rotation angle information includes a specific rotation angle value or a rotation angle index. For example, if a rotation angle value of a patch is 0, it indicates that the patch does not rotate. If the rotation angle value of the patch is 20, it indicates that the patch rotates by 20 degrees. For another example, if a rotation angle index of a patch is 0, it indicates that the patch does not rotate. If the rotation angle index of the patch is 1, it indicates that the patch rotates by 15 degrees. If the rotation angle index of the patch is 2, it indicates that the patch rotates by 30 degrees.

It should be noted that the bitstream can be decoded by using a fixed-length decoding scheme or a variable-length decoding scheme to obtain the rotation angle information of the one or more matched patches. The fixed-length decoding scheme includes but is not limited to a fixed-bit decoding scheme, and the variable-length decoding scheme includes but is not limited to an arithmetic decoding scheme and an exponential Columbus decoding scheme.

According to a fifth aspect, an embodiment of this application provides another point cloud encoding method, including determining indication information, where the indication information is used to indicate whether to encode a point cloud according to a target encoding method, and the target encoding method includes some or all steps of the point cloud encoding method according to the first aspect or the point cloud encoding method according to the third aspect, and writing the indication information into a bitstream.

According to a sixth aspect, an embodiment of this application provides another point cloud decoding method, including parsing a bitstream to obtain indication information, where the indication information is used to indicate whether to decode a point cloud according to a target decoding method, and the target decoding method includes some or all steps of the point cloud decoding method according to the second aspect or the point cloud decoding method according to the fourth aspect, and when the indication information is used to indicate to decode the point cloud according to the target decoding method, decoding the point cloud according to the target decoding method.

According to a seventh aspect, an embodiment of this application provides a point cloud encoding apparatus, including an obtaining unit, configured to obtain subgroup information of N frames of point clouds, where the subgroup information includes a quantity M of subgroups into which the N frames of point clouds are divided and/or a quantity of frames of point clouds included in each of one or more subgroups among the M subgroups, and an encoding unit, configured to write the subgroup information of the N frames of point clouds into a bitstream, where the encoding unit is further configured to encode the N frames of point clouds based on the subgroup information.

In a possible embodiment, the encoding apparatus further includes a grouping unit, configured to divide the N frames of point clouds into M subgroups, where the dividing the N frames of point clouds into M subgroups includes pre-dividing a plurality of frames of point clouds in the N frames of point clouds to obtain a pre-divided subgroup, and determining the pre-divided subgroup to be one of the M subgroups based on characteristic information of the pre-divided subgroup, where the characteristic information is used to represent a size of an occupancy map of a point cloud in the pre-divided subgroup.

In a possible embodiment, in terms of writing the subgroup information of the N frames of point clouds into a bitstream, the encoding unit is further configured to write $N_0, N_1, \ldots, N_{M-1}$, and/or M into the bitstream, where M is greater than or equal to 1, or write (M−1) values in values of $N_0, N_1, \ldots,$ and $N_{M-1}$ and M into the bitstream, where M is greater than or equal to 1, $N_m$ represents a quantity of frames of point clouds in an $m^{th}$ subgroup of the M subgroups, and m=0, 1, ... , and M−1.

In a possible embodiment, in terms of writing the subgroup information of the N frames of point clouds into a bitstream, the encoding unit is further configured to generate one or more bit strings based on a quantity of frames of point clouds in one or more subgroups among the M subgroups, where a length of an $s^{th}$ bit string in the one or more bit strings is a quantity of frames of point clouds included in an $s^{th}$ subgroup of the one or more subgroups, and write the one or more bit strings into the bitstream.

In a possible embodiment, the one or more subgroups include an $(s-1)^{th}$ subgroup and an $s^{th}$ subgroup, and a value of a bit in a bit string corresponding to the $(s-1)^{th}$ subgroup is different from a value of a bit in a bit string corresponding to the $s^{th}$ subgroup.

In a possible embodiment, values of bits in a bit string corresponding to each of the one or more subgroups are the same.

In a possible embodiment, the encoding unit is further configured to write rotation angle information of one or more matched patches in a patch set of the first frame of point cloud in a current subgroup into the bitstream.

According to an eighth aspect, an embodiment of this application provides a point cloud decoding apparatus, including a receiving unit, configured to receive a bitstream, a parsing unit, configured to parse the bitstream to obtain subgroup information, where the subgroup information includes a quantity M of subgroups into which N frames of point clouds are divided and/or a quantity of frames of point clouds included in each of one or more subgroups among the M subgroups, and a decoding unit, configured to decode the N frames of point clouds based on the subgroup information.

In a possible embodiment, the parsing unit is further configured to parse the bitstream to obtain a quantity of frames of point clouds in each of the M subgroups and/or M, where M is greater than or equal to 1, or parse the bitstream to obtain M and a quantity of frames of point clouds in each of M−1 subgroups, where M is greater than or equal to 1.

In a possible embodiment, the decoding unit is further configured to determine a quantity of frames of point clouds in a target subgroup based on N and a quantity of frames of point clouds in each of M−1 subgroups, where the target subgroup is a subgroup other than the M−1 subgroups in the M subgroups, and M is greater than or equal to 1, and decode the N frames of point clouds based on a quantity of frames of point clouds included in each of the M subgroups.

In a possible embodiment, the parsing unit is further configured to parse the bitstream to obtain one or more bit strings, where a length of an $s^{th}$ bit string in the one or more bit strings is a quantity of frames of point clouds included in an $s^{th}$ subgroup of the one or more subgroups, and one or more subgroups correspond to one or more bit strings.

In a possible embodiment, the decoding unit is further configured to obtain a quantity of frames of point clouds included in each of one or more subgroups based on a length of each of one or more bit strings, determine a quantity of frames of point clouds included in each of the M subgroups, where the M subgroups include one or more subgroups, and decode the N frames of point clouds based on the quantity of frames of point clouds included in each of the M subgroups.

In a possible embodiment, the one or more subgroups include an $(s-1)^{th}$ subgroup and an $s^{th}$ subgroup, and a value of a bit in a bit string corresponding to the $(s-1)^{th}$ subgroup is different from a value of a bit in a bit string corresponding to the $s^{th}$ subgroup.

In a possible embodiment, values of bits in a bit string corresponding to each of the one or more subgroups are the same.

In a possible embodiment, the parsing unit is further configured to parse the bitstream to obtain rotation angle information of one or more matched patches in a patch set of the first frame of point cloud in a current subgroup, and determine rotation angle information of a matched patch in a patch set of a non-first frame of point cloud in the current subgroup based on the rotation angle information of the one or more matched patches in the patch set of the first frame of point cloud.

According to a ninth aspect, an embodiment of this application provides another point cloud encoding apparatus, including an obtaining unit, configured to obtain rotation angle information of one or more matched patches in a patch set of the first frame of point cloud in a current subgroup, and an encoding unit, configured to write the rotation angle information of the one or more matched patches in the patch set of the first frame of point cloud in the current subgroup into the bitstream.

According to a tenth aspect, an embodiment of this application provides another point cloud decoding apparatus, including a receiving unit, configured to receive a bitstream, a decoding unit, configured to parse the bitstream to obtain rotation angle information of one or more matched patches in a patch set of the first frame of point cloud in a current subgroup, and a determining unit, configured to determine rotation angle information of a matched patch in a patch set of a non-first frame of point cloud in the current subgroup based on the rotation angle information of the one or more matched patches in the patch set of the first frame of point cloud, where rotation angle information of a matched patch in a point cloud in the current subgroup is used to decode the point cloud in the current subgroup.

According to an eleventh aspect, an embodiment of this application provides another point cloud encoding apparatus, including a determining unit, configured to determine indication information, where the indication information is used to indicate whether to encode a point cloud according to a target encoding method, and the target encoding method includes some or all steps of the point cloud encoding method according to the first aspect or the point cloud encoding method according to the third aspect, and an encoding unit, configured to write the indication information into a bitstream.

According to a twelfth aspect, an embodiment of this application provides another point cloud decoding apparatus, including a parsing unit, configured to parse a bitstream to obtain indication information, where the indication information is used to indicate whether to decode a point cloud according to a target decoding method, and the target decoding method includes some or all steps of the point cloud decoding method according to the second aspect or the point cloud decoding method according to the fourth aspect, and a decoding unit, configured to when the indication information is used to indicate to decode the point cloud according to the target decoding method, decode the point cloud according to the target decoding method.

According to a thirteenth aspect, a coding apparatus is provided, including a memory and a processor, where the memory is configured to store program code, the processor is configured to invoke the program code, to perform any point cloud encoding or decoding method according to the first aspect and possible designs of the first aspect, or the second aspect and possible designs of the second aspect.

According to a fourteenth aspect, an encoding apparatus is provided, including a memory and a processor, where the memory is configured to store program code, and the processor is configured to invoke the program code, to perform the point cloud encoding method according to the third aspect.

According to a fifteenth aspect, a decoding apparatus is provided, including a memory and a processor, where the memory is configured to store program code, and the processor is configured to invoke the program code, to perform the point cloud decoding method according to the fourth aspect.

This application further provides a computer-readable storage medium, where the computer-readable storage medium includes program code, and when the program code is run on a computer, the computer is enabled to perform any point cloud encoding or decoding method according to the first aspect and possible designs of the first aspect, or the second aspect and possible designs of the second aspect.

This application further provides a computer-readable storage medium, where the computer-readable storage medium includes program code, and when the program code is run on a computer, the computer is enabled to perform the point cloud encoding method according to the third aspect.

This application further provides a computer-readable storage medium, where the computer-readable storage medium includes program code, and when the program code is run on a computer, the computer is enabled to perform the point cloud decoding method according to the fourth aspect.

It may be understood that for beneficial effects of any codec, processing apparatus, codec apparatus, and computer-readable storage medium provided above, refer to beneficial effects of the method embodiments according to the foregoing corresponding aspects. Details are not described again.

These aspects or other aspects of the present disclosure are clearer and easier to understand in description of the following embodiments.

BRIEF DESCRIPTION OF DRAWINGS

To describe the technical solutions in some of the embodiments of the present disclosure more clearly, the following briefly describes the accompanying drawings used for describing the embodiments. It is clear that the accompanying drawings in the following descriptions show merely some embodiments of the present disclosure, and a person of ordinary skill in the art may derive other drawings from these accompanying drawings without creative efforts.

DESCRIPTION OF EMBODIMENTS

Figure 1:
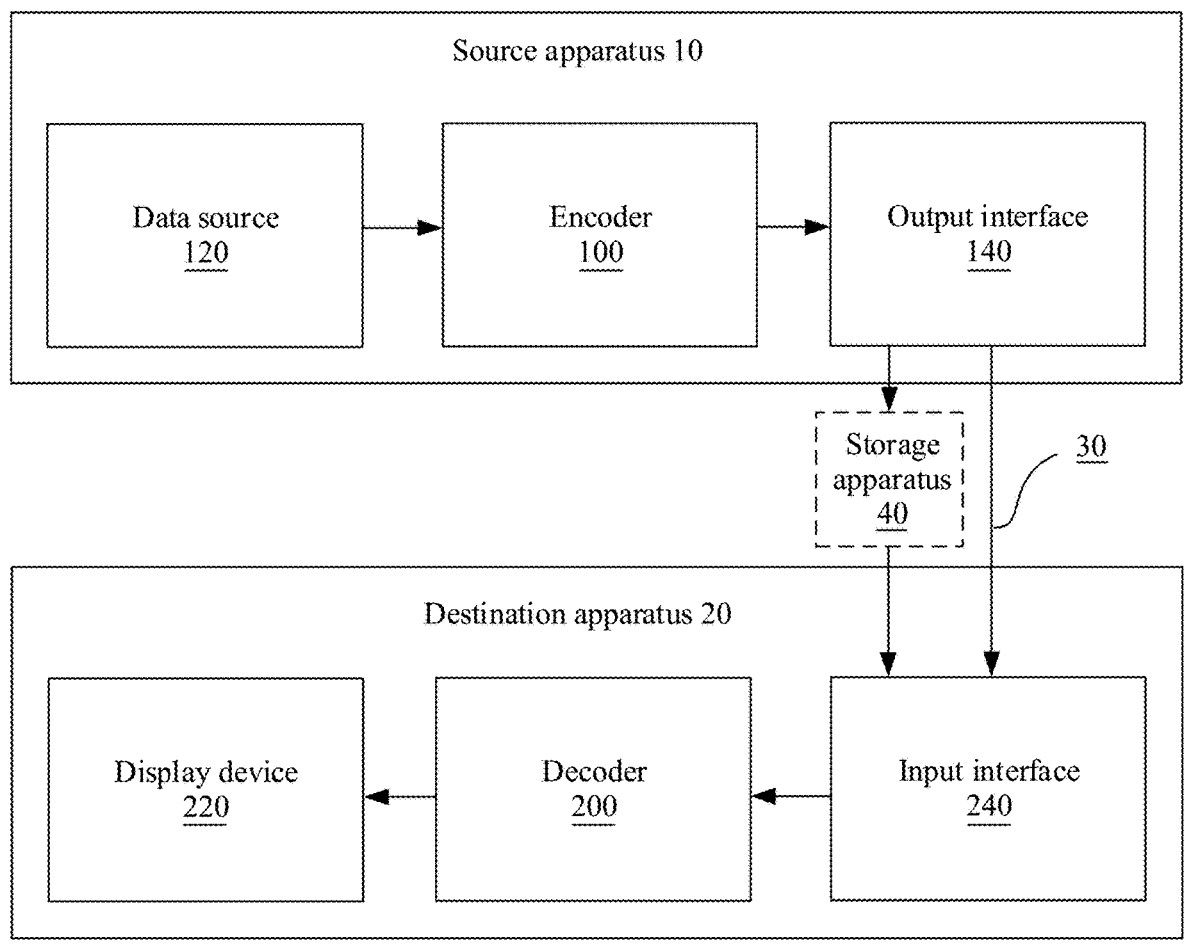
FIG. 1 is a schematic block diagram of an example point cloud coding system that is applicable to an embodiment of this application.

The term "at least one (type)" in the embodiments of this application includes one (type) or more (types). "A plurality of (types)" means two (types) or more than two (types). For example, at least one of A, B, and C includes the following cases: only A exists, only B exists, only C exists, both A and B exist, both A and C exist, both B and C exist, and A, B, and C exist. The term "and/or" in the embodiments of this application describes only an association relationship for describing associated objects and represents that three relationships may exist. For example, A and/or B may represent the following three cases: only A exists, both A and B exist, and only B exists. The term character "/" in the embodiments of this application usually represents an "or" relationship between associated objects. The character "/" in a formula represents a division operation. For example, A/B represents that A is divided by B. In the embodiments of this application, the terms "first", "second", and the like are intended to distinguish between different objects but do not indicate a particular order of the different objects FIG. 1 is a schematic block diagram of an example point cloud coding system 1 that is applicable to an embodiment of this application. The term "point cloud coding" or "coding" may usually be point cloud encoding or point cloud decoding. An encoder 100 in the point cloud coding system 1 may encode a to-be-encoded point cloud according to any point cloud encoding method provided in this application. A decoder 200 in the point cloud coding system 1 may decode a to-be-decoded point cloud according to a point cloud decoding method that is provided in this application and that corresponds to a point cloud encoding method used by the encoder.

As shown in FIG. 1, the point cloud coding system 1 includes a source apparatus 10 and a destination apparatus 20. The source apparatus 10 generates encoded point cloud data. Therefore, the source apparatus 10 may be referred to as a point cloud encoding apparatus. The destination apparatus 20 may decode the encoded point cloud data generated by the source apparatus 10. Therefore, the destination apparatus 20 may be referred to as a point cloud decoding apparatus. Various implementation solutions of the source apparatus 10, the destination apparatus 20, or both the source apparatus 10 and the destination apparatus 20 may include one or more processors and a memory coupled to the one or more processors. The memory may include but is not limited to a random-access memory (RAM), a read-only memory (ROM), an electrically erasable programmable read-only memory (EEPROM), a flash memory, or any other medium that can be used to store desired program code in a form of an instruction or a data structure that can be accessed by a computer, as described in this specification.

The source apparatus 10 and the destination apparatus 20 may include various apparatuses, including a desktop computer, a mobile computing apparatus, a notebook (for example, laptop) computer, a tablet computer, a set top box, a handheld telephone set such as a "smart" phone, a television set, a camera, a display apparatus, a digital media player, a video game console, an in-vehicle computer, and a similar apparatus.

The destination apparatus 20 may receive the encoded point cloud data from the source apparatus 10 over a link 30. The link 30 may include one or more media or apparatuses that can transfer the encoded point cloud data from the source apparatus 10 to the destination apparatus 20. In an example, the link 30 may include one or more communications media that enable the source apparatus 10 to directly send the encoded point cloud data to the destination apparatus 20 in real time. In this example, the source apparatus 10 may modulate the encoded point cloud data according to a communication standard (for example, a wireless communication protocol), and may send modulated point cloud data to the destination apparatus 20. The one or more communications media may include a wireless and/or wired communications medium, for example, a radio frequency (RF) spectrum or one or more physical transmission lines. The one or more communications media may constitute a part of a packet-based network, and the packet-based network is, for example, a local area network, a wide area network, or a global network (for example, the internet). The one or more communications media may include a router, a switch, a base station, or another device facilitating communication from the source apparatus 10 to the destination apparatus 20.

In another example, the encoded data may be output to a storage apparatus 40 through an output interface 140. Similarly, the encoded point cloud data may be accessed from the storage apparatus 40 through an input interface 240. The storage apparatus 40 may include any one of a plurality of distributed data storage media or locally accessible data storage media, for example, a hard disk drive, a BLU-RAY disc, a DIGITAL VERSATILE DISC (DVD), a compact disc (CD) ROM (CD-ROM), a flash memory, a volatile or nonvolatile memory, or any other appropriate digital storage medium configured to store the encoded point cloud data.

In another example, the storage apparatus 40 may correspond to a file server or another intermediate storage apparatus that can store the encoded point cloud data generated by the source apparatus 10. The destination apparatus 20 may access the stored point cloud data through streaming transmission or downloading from the storage apparatus 40. The file server may be any type of server that can store the encoded point cloud data and send the encoded point cloud data to the destination apparatus 20. An example of the file server includes a network server (for example, used for a website), a File Transfer Protocol (FTP) server, a network attached storage (NAS) apparatus, or a local disk drive. The destination apparatus 20 may access the encoded point cloud data through any standard data connection (including an internet connection). The standard data connection may include a radio channel (for example, a WI-FI connection), a wired connection (for example, a digital subscriber line (DSL) or a cable modem), or a combination thereof that is suitable for accessing the encoded point cloud data stored in the file server. Transmission of the encoded point cloud data from the storage apparatus 40 may be streaming transmission, downloading transmission, or a combination thereof.

The point cloud coding system 1 described in FIG. 1 is merely an example, and technologies in this application are applicable to a point cloud coding (for example, point cloud encoding or point cloud decoding) apparatus that does not necessarily include any data communication between a point cloud encoding apparatus and a point cloud decoding apparatus. In another example, data is retrieved from a local memory, is transmitted on a network in a streaming manner, and the like. The point cloud encoding apparatus may encode the data and store the data to the memory, and/or the point cloud decoding apparatus may retrieve the data from the memory and decode the data. In many examples, apparatuses that do not communicate with each other and that only encode data and store the data to the memory and/or only retrieve data from the memory and decode the data perform encoding and decoding.

In the example in FIG. 1, the source apparatus 10 includes a data source 120, the encoder 100, and the output interface 140. In some examples, the output interface 140 may include a modulator/demodulator (a modem) and/or a transmitter. The data source 120 may include a point cloud capture apparatus (for example, a camera), a point cloud archive including previously captured point cloud data, a point cloud feed-in interface configured to receive point cloud data from a point cloud content provider, a computer graphics system configured to generate point cloud data, or a combination of these sources of point cloud data.

The encoder 100 may encode the point cloud data from the data source 120. In some examples, the source apparatus 10 directly sends the encoded point cloud data to the destination apparatus 20 through the output interface 140. In another example, the encoded point cloud data may alternatively be stored in the storage apparatus 40, so that the destination apparatus 20 subsequently accesses the encoded point cloud data for decoding and/or playing.

In the example in FIG. 1, the destination apparatus 20 includes the input interface 240, the decoder 200, and a display apparatus 220. In some examples, the input interface 240 includes a receiver and/or a modem. The input interface 240 may receive the encoded point cloud data over the link 30 and/or from the storage apparatus 40. The display apparatus 220 may be integrated with the destination apparatus 20 or may be located outside the destination apparatus 20. Generally, the display apparatus 220 displays decoded point cloud data. There may be a plurality of types of display apparatuses 220. For example, the display apparatus 220 may be a liquid-crystal display (LCD), a plasma display, an organic light-emitting diode (OLED) display, or another type of display apparatus.

Although not shown in FIG. 1, in some aspects, the encoder 100 and the decoder 200 may be integrated with an audio encoder and an audio decoder respectively, and may include an appropriate multiplexer-demultiplexer (MUX-DEMUX) unit or other hardware and software, to process encoding of both audio and a video in a same data stream or separate data streams. In some examples, if appropriate, the MUX-DEMUX unit may comply with the International Telecommunication Union (ITU) H.223 multiplexer protocol or another protocol such as a User Datagram Protocol (UDP).

The encoder 100 and the decoder 200 each may be implemented as, for example, any one of a plurality of circuits one or more microprocessors, digital signal processors (DPSs), application-specific integrated circuits (ASICs), field-programmable gate arrays (FPGAs), discrete logic, hardware, or any combination thereof. If this application is implemented partially through software, the apparatus may store, in an appropriate nonvolatile computer-readable storage medium, instructions used for the software, and may use one or more processors to execute the instructions in hardware, to implement the technologies in this application. Any one of the foregoing content (including hardware, software, a combination of hardware and software, and the like) may be considered as one or more processors. The encoder 100 and the decoder 200 each may be included in one or more encoders or decoders, and the encoder or the decoder may be integrated as a part of a combined encoder/decoder (codec) in a corresponding apparatus.

In this application, the encoder 100 may be generally referred to as an apparatus that "signals" or "sends" some information to another apparatus such as the decoder 200. The term "signal" or "send" may generally refer to transmission of a syntax element and/or other data used for decoding compressed point cloud data. The transmission may occur in real time or almost in real time. Alternatively, the communication may occur after a period of time. For example, the communication may occur when a syntax element in an encoded bitstream is stored into a computer-readable storage medium during encoding, and the decoding apparatus may then retrieve the syntax element at any time after the syntax element is stored in the medium.

Figure 2:
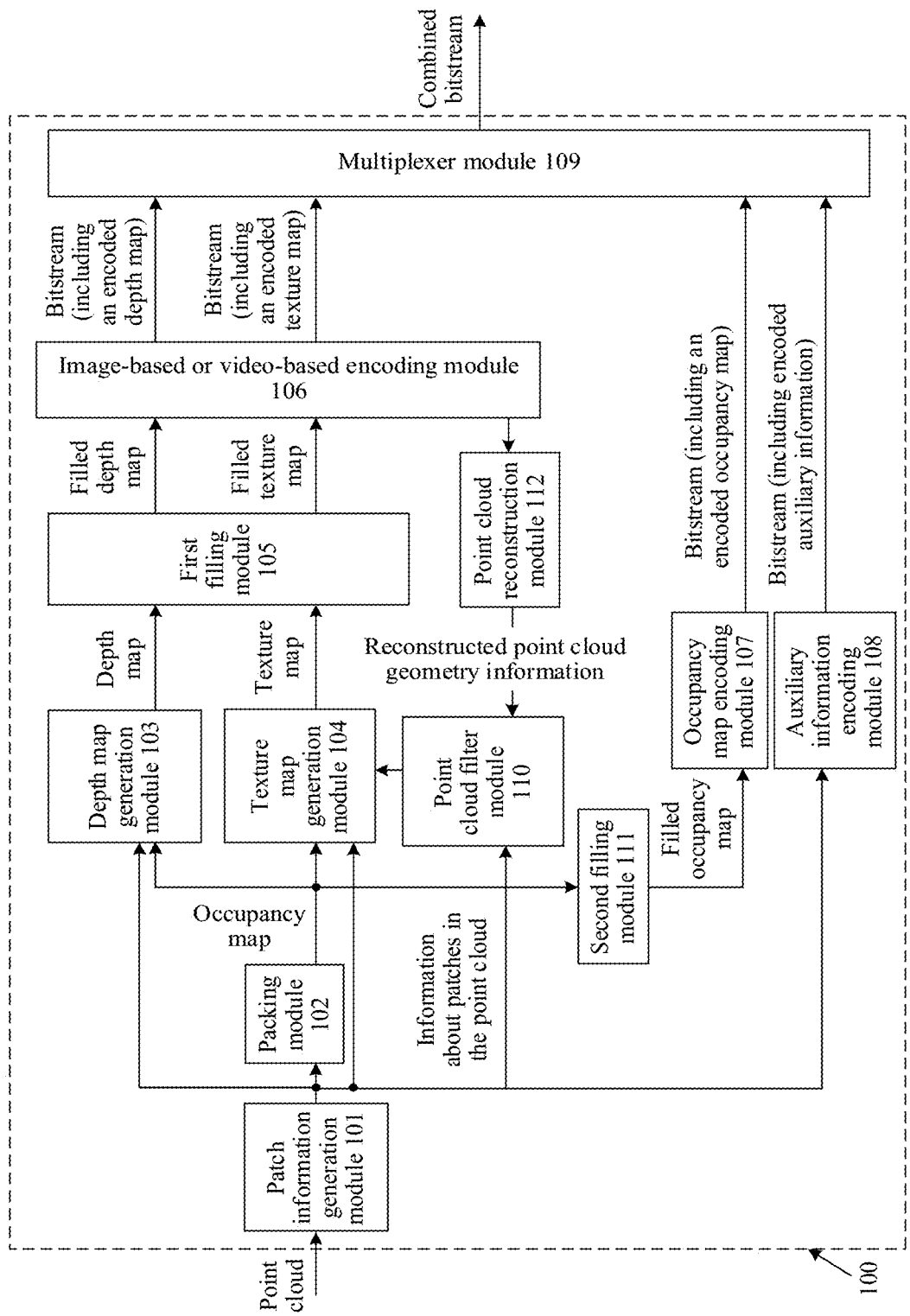
FIG. 2 is a schematic block diagram of an example encoder that is applicable to an embodiment of this application.

FIG. 2 is a schematic block diagram of an example encoder 100 that is applicable to an embodiment of this application. A Moving Picture Expert Group (MPEG) point cloud compression (PCC) encoding framework is used as an example for description in FIG. 2. In the example in FIG. 2, the encoder 100 may include a patch information generation module 101, a packing module 102, a depth map generation module 103, a texture map generation module 104, a first filling module 105, an image-based or video-based encoding module 106, an occupancy map encoding module 107, an auxiliary information encoding module 108, a multiplexer module 109, and the like. In addition, the encoder 100 may further include a point cloud filter module 110, a second filling module 111, a point cloud reconstruction module 112, and the like.

The patch information generation module 101 is configured to partition a frame of point cloud into a plurality of patches by using a method, and obtain related information and the like of the generated patches. The patch is a set of some points in a frame of point cloud, and generally one connected component region corresponds to one patch. The related information of the patches may include but is not limited to at least one of the following information a quantity of the patches obtained by partitioning the point cloud, location information of each patch in a three-dimensional space, an index of a normal coordinate axis of each patch, a depth map generated when each patch is projected from the three-dimensional space to a two-dimensional space, a size of the depth map of each patch (for example, the width and the height of the depth map), an occupancy map generated when each patch is projected from the three-dimensional space to the two-dimensional space, and the like. A part of the related information, such as the quantity of patches obtained by partitioning the point cloud, the index of the normal coordinate axis of each patch, the size of the depth map of each patch, the location information of each patch in the point cloud, and size information of the occupancy map of each patch, may be used as auxiliary information and sent to the auxiliary information encoding module 108 for encoding (that is, compression encoding). The occupancy map of each patch may be sent to the packing module 102 for packing. Further, a global matched patch in a point cloud is first obtained according to the method for obtaining a global matched patch described in this application, and during packing, a global patch in each frame of point cloud is preferentially packed, and a non-global matched patch is then packed, to obtain an occupancy map of the point cloud. In addition, information about a specific location of each patch in the occupancy map of the point cloud, the depth map of each patch, and the like may be sent to the depth map generation module 103.

After the packing module 102 obtains the occupancy map of the point cloud, the second filling module 111 may fill the occupancy map of the point cloud and then send a filled occupancy map of the point cloud to the occupancy map encoding module 107 for encoding. In addition, the occupancy map of the point cloud may be used to guide the depth map generation module 103 to generate a depth map of the point cloud and guide the texture map generation module 104 to generate a texture map of the point cloud.

Figures 3A, 3B, 3C:
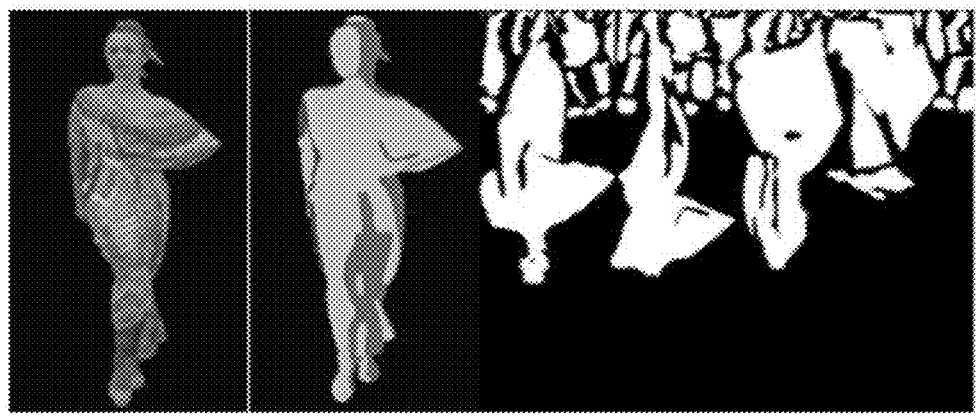
FIG. 3A, FIG. 3B, and FIG. 3C are schematic diagrams of a point cloud, a patch in the point cloud, and an occupancy map of the point cloud that are applicable to an embodiment of this application.

FIGS. 3A-3C are schematic diagrams showing a point cloud, patches in the point cloud, and an occupancy map of the point cloud that are applicable to an embodiment of this application. To be specific, FIG. 3A is a schematic diagram of a frame of point cloud, FIG. 3B is a schematic diagram of an obtained patch in the point cloud based on FIG. 3A, and FIG. 3C is a schematic diagram of an occupancy map of the point cloud, where the occupancy map of the point cloud is obtained by packing occupancy maps that are of all patches shown in FIG. 3B and that are obtained by mapping all the patches onto a two-dimensional plane.

The depth map generation module 103 is configured to generate the depth map of the point cloud based on the occupancy map of the point cloud, and the occupancy map and depth information of each patch in the point cloud, and send the generated depth map to the first filling module 105, so that the first filling module 105 fills empty pixels in the depth map, to obtain a filled depth map.

The texture map generation module 104 is configured to generate the texture map of the point cloud based on the occupancy map of the point cloud, and the occupancy map and texture information of each patch in the point cloud, and send the generated texture map to the first filling module 105, so that the first filling module 105 fills empty pixels in the texture map, to obtain a filled texture map.

The first filling module 105 sends the filled depth map and the filled texture map to the image-based or video-based encoding module 106 for image-based or video-based encoding. Subsequent processes are as follows.

On the one hand, the image-based or video-based encoding module 106, the occupancy map encoding module 107, and the auxiliary information encoding module 108 send obtained encoding results (namely, bitstreams) to the multiplexer module 109, and the multiplexer module 109 combines the encoding results into one bitstream, where the bitstream may be sent to the output interface 140.

On the other hand, the image-based or video-based encoding module 106 sends an obtained encoding result (namely, a bitstream) to the point cloud reconstruction module 112 for point cloud reconstruction, to obtain a reconstructed point cloud (namely, obtain reconstructed geometry information of the point cloud). Further, video decoding is performed on an encoded depth map obtained by the image-based or video-based encoding module 106, to obtain a decoded depth map of the point cloud, and the reconstructed geometry information of the point cloud is obtained by using the decoded depth map, the occupancy map of the point cloud, and the auxiliary information of each patch. The geometry information of the point cloud is coordinate values of a point in the point cloud (for example, each point in the point cloud) in the three-dimensional space.

Optionally, the point cloud reconstruction module 112 may further send texture information of the point cloud and the reconstructed geometry information of the point cloud to a coloring module. The coloring module is configured to color a reconstructed point cloud to obtain texture information of the reconstructed point cloud.

Optionally, the texture map generation module 104 may further generate the texture map of the point cloud based on information that is obtained by the point cloud filter module 110 by filtering the reconstructed geometry information of the point cloud.

Figure 4:
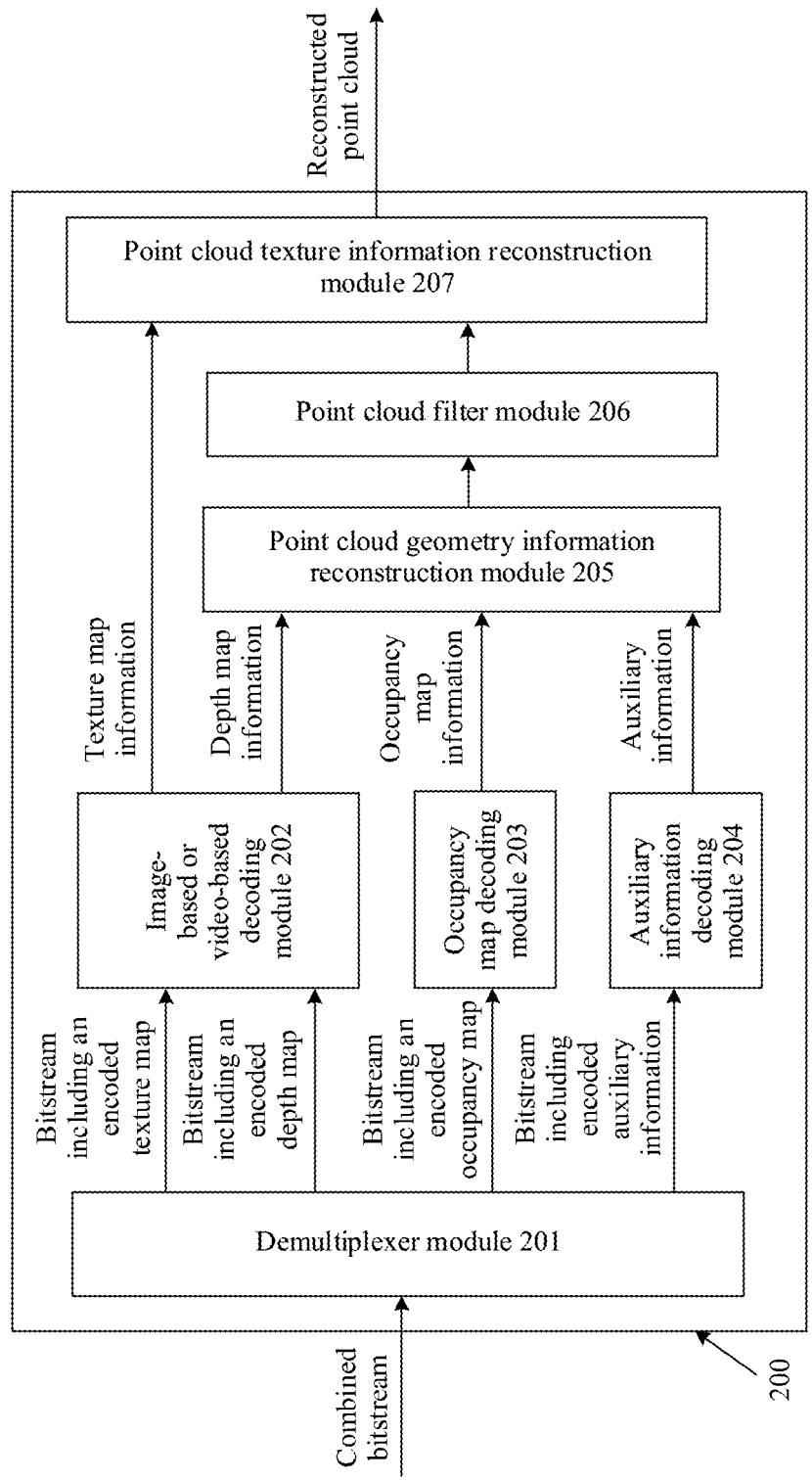
FIG. 4 is a schematic block diagram of an example decoder that is applicable to an embodiment of this application.

FIG. 4 is a schematic block diagram of an example decoder 200 that is applicable to an embodiment of this application. An MPEG PCC decoding framework is used as an example for description in FIG. 4. In the example in FIG. 4, the decoder 200 may include a demultiplexer module 201, an image-based or video-based decoding module 202, an occupancy map decoding module 203, an auxiliary information decoding module 204, a point cloud geometry information reconstruction module 205, a point cloud filter module 206, and a point cloud texture information reconstruction module 207.

The demultiplexer module 201 is configured to send an input bitstream (that is, a combined bitstream) to a corresponding decoding module. Further, a bitstream including an encoded texture map and a bitstream including an encoded depth map are sent to the image-based or video-based decoding module 202, a bitstream including an encoded occupancy map is sent to the occupancy map decoding module 203, and a bitstream including encoded auxiliary information is sent to the auxiliary information decoding module 204.

The image-based or video-based decoding module 202 is configured to decode the received encoded texture map and encoded depth map, and then send decoded texture map information to the point cloud texture information reconstruction module 207, and send decoded depth map information to the point cloud geometry information reconstruction module 205. The occupancy map decoding module 203 is configured to decode the received bitstream including the encoded occupancy map, and send decoded occupancy map information to the point cloud geometry information reconstruction module 205. The auxiliary information decoding module 204 is configured to decode the received encoded auxiliary information, and send, to the point cloud geometry information reconstruction module 205, decoded information indicating the auxiliary information.

The point cloud geometry information reconstruction module 205 is configured to reconstruct geometry information of a point cloud based on the received occupancy map information and the received auxiliary information. After being filtered by the point cloud filter module 206, reconstructed geometry information of the point cloud is sent to the point cloud texture information reconstruction module 207.

The point cloud texture information reconstruction module 207 is configured to reconstruct texture information of the point cloud, to obtain a reconstructed point cloud.

It may be understood that the decoder 200 shown in FIG. 4 is merely used as an example. In a specific implementation, the decoder 200 may include more or fewer modules than those shown in FIG. 4. This is not limited in this embodiment of this application.

For ease of understanding of the technical solutions provided in the embodiments of this application, the following describes technologies and terms used in the embodiments of this application.

In an MPEG point cloud encoding method, an encoder first partitions a to-be-encoded point cloud (that is, a current frame or a current frame of point cloud) into several patches according to a specific rule. These patches do not have an overlapping region. Then, each patch is projected from a three-dimensional space to a two-dimensional plane, to obtain a two-dimensional image (that is, an occupancy map of the patch). Next, occupancy maps of all patches (or occupancy maps that are of patches and that are obtained after resolution is reduced) are closely arranged on one two-dimensional image according to a specific rule, to obtain an occupancy map of the current frame. This method for arranging occupancy maps of patches is referred to as packing. Subsequently, a depth map of the current frame and a texture map of the current frame are generated according to a packing sequence. To be specific, the depth map of the current frame is a two-dimensional image that is generated by packing, according to the packing sequence, depth maps obtained by projecting all the patches, and the texture map of the current frame is a two-dimensional image that is generated by packing, according to the packing sequence, texture maps obtained by projecting all the patches. The occupancy map of the current frame is a two-dimensional binary image, and used to indicate whether a location of each pixel of the two-dimensional image is occupied by a point in the point cloud. Generally, to reduce a quantity of coded bits, resolution of the occupancy map of the current frame is lower than resolution of the depth map of the current frame and resolution of the texture map of the current frame.

For ease of understanding of the technical solutions provided in the embodiments of this application, the following describes technologies and terms used in the embodiments of this application.

Figure 5:
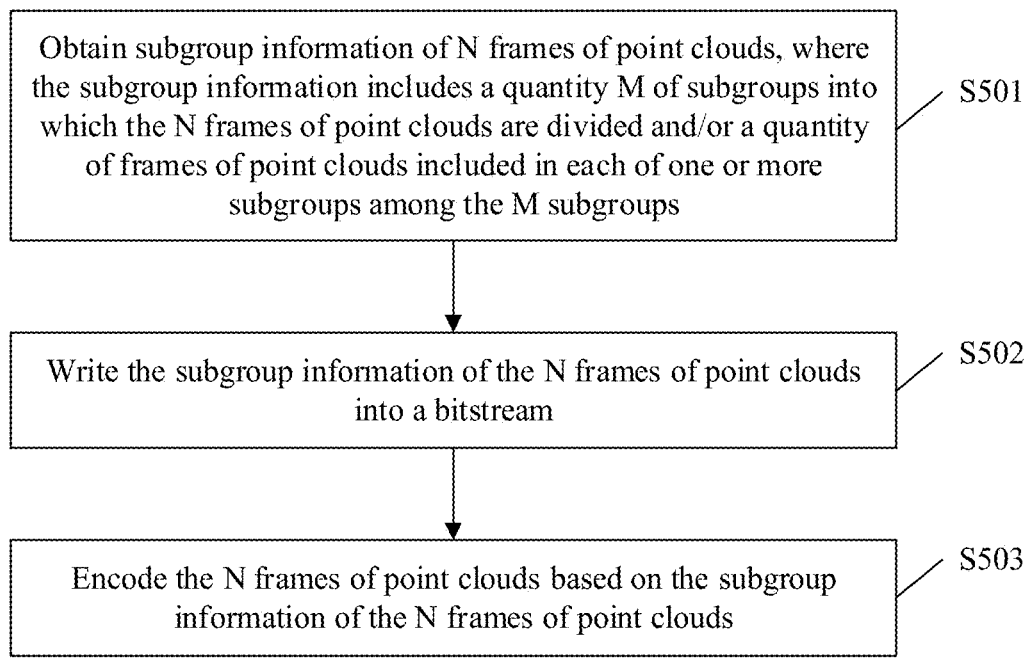
FIG. 5 is a schematic flowchart of a point cloud encoding method according to this application.

FIG. 5 is a schematic flowchart of a point cloud encoding method according to an embodiment of this application. As shown in FIG. 5, the method includes the following steps.

S501: Obtain subgroup information of N frames of point clouds, where the subgroup information includes a quantity M of subgroups into which the N frames of point clouds are divided and/or a quantity of frames of point clouds included in each of one or more subgroups among the M subgroups.

The M subgroups are obtained by grouping the N frames of point clouds, and a grouping manner may be an adaptive grouping manner.

Further, a plurality of frames of point clouds in the N frames of point clouds are pre-divided to obtain a pre-divided subgroup, and the pre-divided subgroup is determined to be one of the M subgroups based on characteristic information of the pre-divided subgroup, where the characteristic information is used to represent a size of an occupancy map of a point cloud in the pre-divided subgroup.

Size information of an occupancy map of a point cloud may be an area, the height, the width, or the like of the occupancy map of the point cloud. In the following, that the size information of the occupancy map of the point cloud is the area of the occupancy map is used as an example for description. A unified description is provided herein, and details are not described below again.

Any subgroup into which the N frames of point clouds are divided may include one or more frames of point clouds. Quantities of frames of point clouds included in different subgroups may be the same or different.

A pre-division method is not limited in this embodiment of this application. For example, the N frames of point clouds can be pre-divided by using a sliding window method or a dichotomy method.

A size of an occupancy map of a point cloud in the pre-divided subgroup may be determined based on a global matching packing algorithm or based on another packing algorithm, such as an anchor packing algorithm.

Characteristic information of the pre-divided subgroup may be information directly or indirectly used to represent a size of an occupancy map of a point cloud in the pre-divided subgroup. For example, the characteristic information may include at least one of the following information 1 to information 3.

Information 1: a size of a global occupancy map for the pre-divided subgroup. Optionally, the size of the global occupancy map for the pre-divided subgroup may be represented by a product (that is, an area) of the height and the width of the global occupancy map for the pre-divided subgroup. Optionally, if widths of obtained global occupancy maps for different pre-divided subgroups are the same in a process of determining a subgroup, the size of the global occupancy map for the pre-divided subgroup may be represented by the height of the global occupancy map for the pre-divided subgroup. Similarly, if heights of obtained global occupancy maps for different pre-divided subgroups are the same in a process of determining a subgroup, the size of the global occupancy map for the pre-divided subgroup may be represented by the width of the global occupancy map for the pre-divided subgroup. Because the size of the global occupancy map for the pre-divided subgroup defines a minimum size of an occupancy map of each frame of point cloud in the pre-divided subgroup, the size of the global occupancy map for the pre-divided subgroup can be used to indirectly represent a size of an occupancy map of a point cloud in the pre-divided subgroup.

Information 2: a size of an occupancy map of a point cloud in the pre-divided subgroup, for example, a size or sizes of one or more occupancy maps of one or more (for example, all) frames of point clouds in the pre-divided subgroup. Optionally, the size of the occupancy map of the point cloud in the pre-divided subgroup may be represented by a product (that is, an area) of the height and the width of the occupancy map of the point cloud in the pre-divided subgroup. Optionally, if widths of obtained occupancy maps of different point clouds are the same in a process of determining a subgroup, the size of the occupancy map of the point cloud in the pre-divided subgroup may be represented by the height of the occupancy map of the point cloud in the pre-divided subgroup. Similarly, if heights of obtained occupancy maps of different point clouds are the same in a process of determining a subgroup, the size of the occupancy map of the point cloud in the pre-divided subgroup may be represented by the width of the occupancy map of the point cloud in the pre-divided subgroup. The information 2 is information directly used to represent the size of the occupancy map of the point cloud in the pre-divided subgroup.

Information 3: an area of a union patch occupancy map for the pre-divided subgroup. It can be learned from the foregoing descriptions that there may be a plurality of union patch occupancy maps for the pre-divided subgroup. The area of the union patch occupancy map for the pre-divided subgroup may be an area of one or more (for example, all) of union patch occupancy maps for the pre-divided subgroup. Because the area (for example, a total area) of the union patch occupancy map for the pre-divided subgroup may reflect an area of an occupancy map of a point cloud in the pre-divided subgroup to some extent, the area (for example, the total area) of the union patch occupancy map for the pre-divided subgroup can be used to indirectly represent a size of an occupancy map of a point cloud in the pre-divided subgroup.

Optionally, the pre-dividing a plurality of frames of point clouds in the N frames of point clouds to obtain a pre-divided subgroup, and determining the pre-divided subgroup to be one of the M subgroups based on characteristic information of the pre-divided subgroup may include the following steps S101-1 and S101-2.

S101-1: Pre-divide point clouds, that have not been grouped, in a to-be-encoded point cloud group for an ith time by using a jth frame of point cloud as a start point, to obtain an ith pre-divided subgroup. The jth frame of point cloud is the first frame of point cloud in the point clouds that have not been grouped, $i \geq 1$, where i is an integer, $j \geq 1$, where j is an integer, the $i^{th}$ pre-divided subgroup includes one or more frames of point clouds starting from the $j^{th}$ frame of point cloud.

S101-2: Determine the $i^{th}$ pre-divided subgroup to be one subgroup based on characteristic information of the $i^{th}$ pre-divided subgroup.

It can be learned from this optional manner that this embodiment of this application supports a technical solution of determining a next subgroup based on a sequence of point clouds in the to-be-encoded point cloud group when one subgroup included in the to-be-encoded point cloud group is determined. In a process of determining a subgroup, pre-division usually needs to be performed for one or more times (such as sliding a window one or more times, or performing dichotomy one or more times), and one pre-divided subgroup can be determined each time pre-division is performed.

S101-1 is a specific implementation of "pre-dividing the plurality of frames of point clouds in the to-be-encoded point cloud group to obtain a pre-divided subgroup" in S101. S101-2 is a specific implementation of "determining the pre-divided subgroup to be one of the plurality of subgroups based on characteristic information of the pre-divided subgroup" in S101.

The following briefly describes some terms in a process of implementing pre-division by using a sliding window, to facilitate understanding by a reader.

Sliding the window for one time can delimit one or more frames of point clouds. In this embodiment of this application, "in a process of determining a subgroup, when i=1, a quantity of frames of point clouds delimited by sliding the window for the $i^{th}$ time is equal to a step size used for sliding the window for the $i^{th}$ time plus 1, and when $i \geq 2$, a quantity of frames of point clouds delimited by sliding the window for the $i^{th}$ time is equal to a step size used for sliding the window for the $i^{th}$ time" is used as an example for description. In this embodiment of this application, a case in which "when $i \geq 1$, a quantity of frames of point clouds delimited by sliding the window for the $i^{th}$ time is equal to a step size used for sliding the window for the $i^{th}$ time" is not excluded. In this case, a person of ordinary skill in the art can properly infer, based on the following description of terms, corresponding terms applicable to this case without creative efforts.

Step sizes used for sliding the window for different times may be the same or different.

Sliding the window for the $i^{th}$ time is a process of sliding i step sizes starting from the first frame of point cloud in the point clouds, that have not been grouped, in the to-be-encoded point cloud group, where a $t^{th}$ step size in the i step sizes is a step size used for sliding the window for the $t^{th}$ time, $1 \leq t \leq i$, and t is an integer. It may be understood that, generally, when i≥2, sliding the window for the $i^{th}$ time may be considered as sliding by one step size starting from the last delimited frame of point cloud in the to-be-encoded point cloud group. This step size is a step size used for sliding the window for the $i^{th}$ time.

The $i^{th}$ pre-divided subgroup is a set of point clouds delimited by sliding the window for the first time to the $i^{th}$ time. Generally, a quantity of frames of point clouds included in the $i^{th}$ pre-divided subgroup is equal to a sum of step sizes used for sliding the window for the first time to the $i^{th}$ time plus 1.

Figure 6:
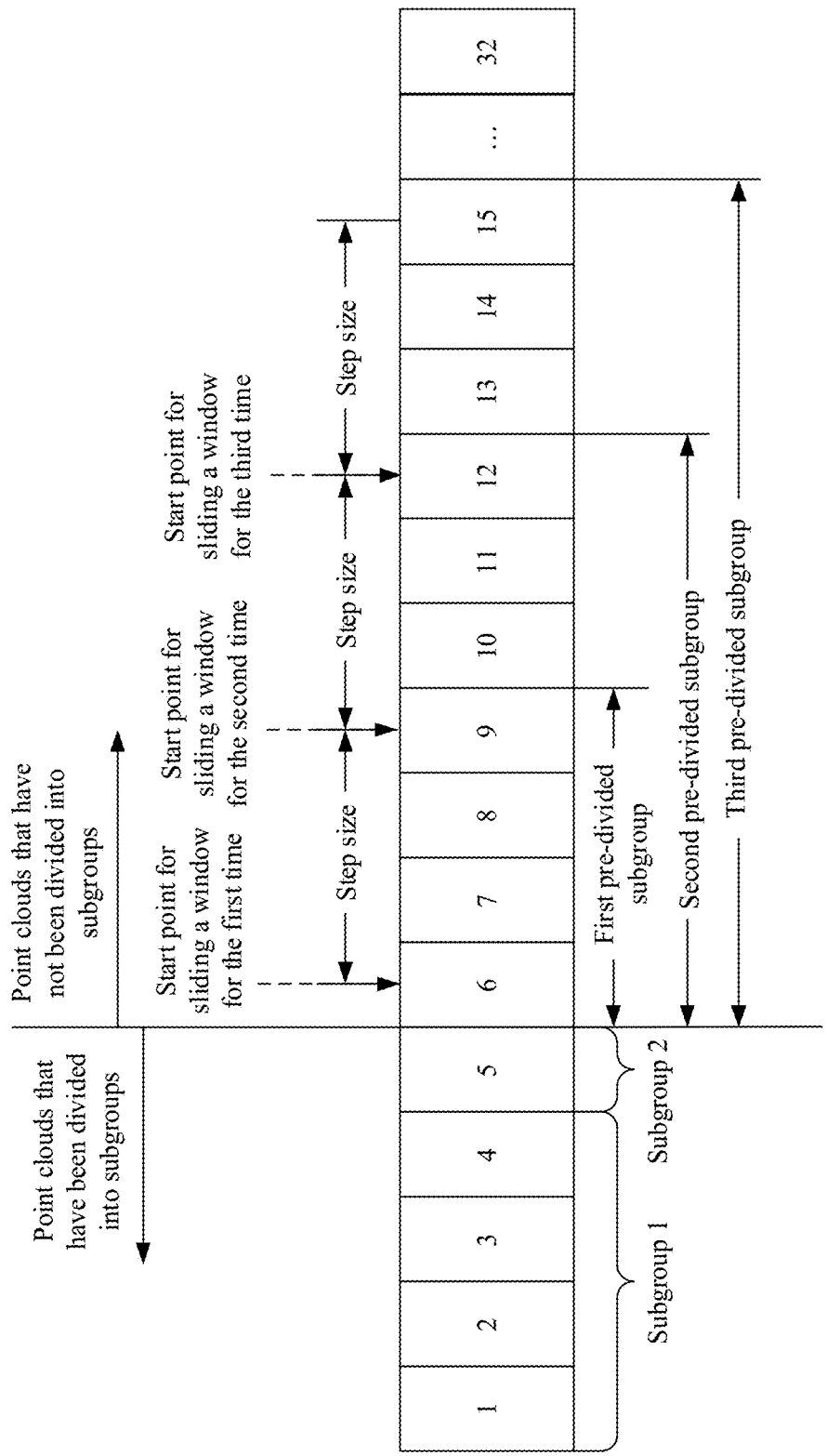
FIG. 6 is a schematic diagram of a correspondence between a sliding window, a step size, and a pre-divided subgroup according to an embodiment of this application.

FIG. 6 is a schematic diagram of a correspondence between a sliding window, a step size, and a pre-divided subgroup according to an embodiment of this application. In FIG. 6, the to-be-encoded point cloud group includes point clouds 1 to 32. One rectangular box in FIG. 6 represents one frame of point cloud, and a number in a rectangular box represents a number of a point cloud. A step size used for sliding the window each time is 3, that is, three frames of point clouds can be delimited by sliding the window once. In addition, subgroups that have been obtained through division are subgroup 1 and subgroup 2, subgroup 1 is a set of point clouds 1 to 4, and subgroup 2 is a set of point cloud 5. Based on this, in a process of determining subgroup 3, point clouds that are delimited after the window is slid for the first time by using point cloud 6 as a start point are point clouds 6 to 9. In this case, the obtained first pre-divided subgroup is a set of point clouds 6 to 9. Sliding the window for the second time by using point cloud 6 as a start point means sliding by one step size starting from the last frame of point cloud (that is, point cloud 9) that is delimited by sliding the window for the first time. Therefore, point clouds delimited after the window is slid for the second time are point clouds 10 to 12. In this case, the obtained second pre-divided subgroup is a set of point clouds 6 to 12.

In a process of determining different subgroups, an initial value of i is all 1. Unless otherwise stated, sliding the window for the $i^{th}$ time described in this embodiment of this application all means sliding the window for the $i^{th}$ time in a process of determining one subgroup. Similarly, the $i^{th}$ pre-divided subgroup is an $i^{th}$ pre-divided subgroup in a process of determining one subgroup. A unified description is provided herein, and details are not described below again.

The following describes, by using a specific example, a method for determining a subgroup in a to-be-encoded point cloud group when pre-division is implemented by using a sliding window method provided in this embodiment of this application. For details, refer to the following Embodiment 1 or Embodiment 2.

Embodiment 1

Figure 7:
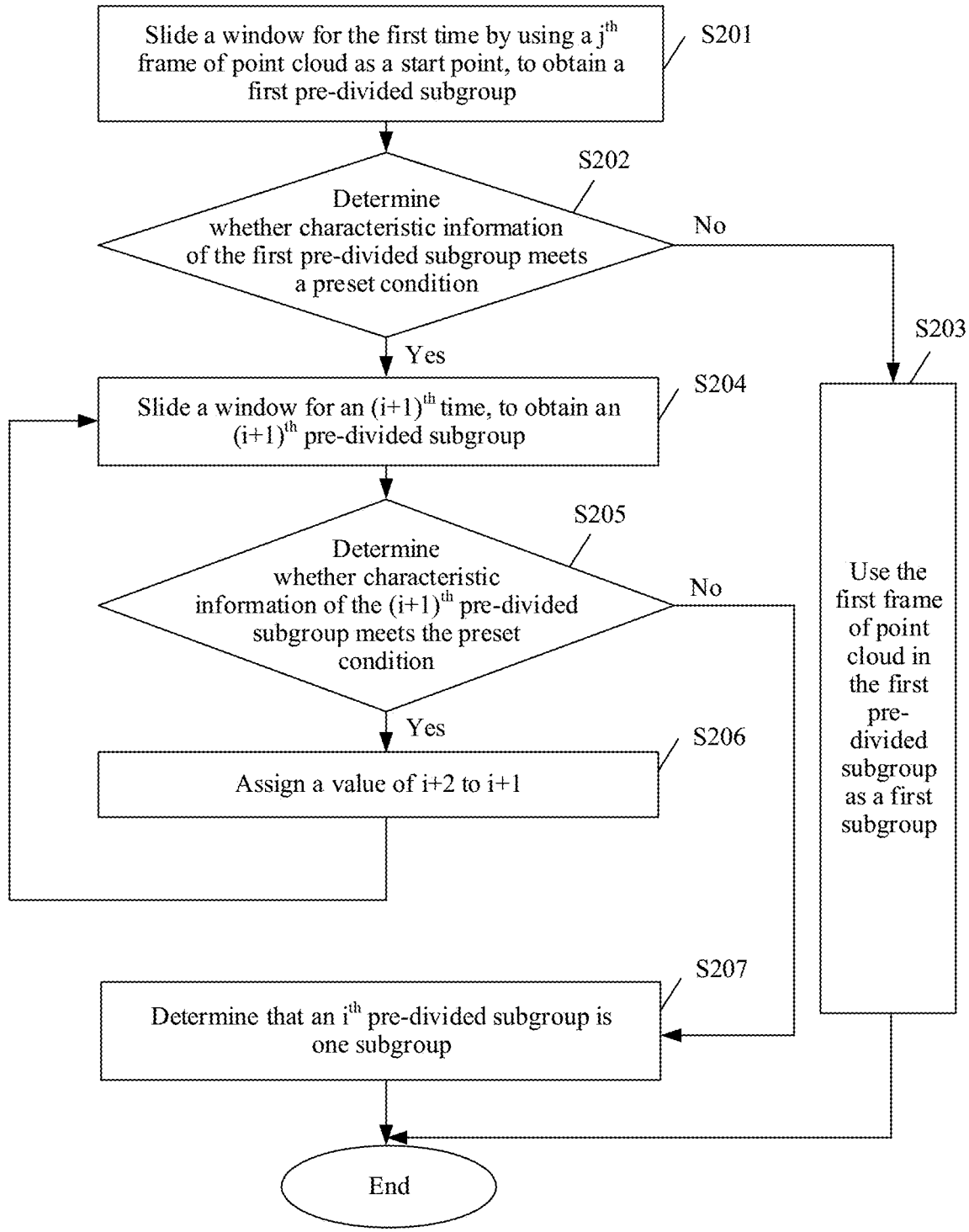
FIG. 7 is a schematic flowchart of a method for determining a subgroup according to an embodiment of this application.

FIG. 7 is a schematic flowchart of a method for determining a subgroup according to an embodiment of this application. The method shown in FIG. 7 includes the following steps.

S201: Slide a window for the first time by using a $j^{th}$ frame of point cloud as a start point, to obtain a first pre-divided subgroup. Further, a set of point clouds delimited by sliding the window for the first time is used as the first pre-divided group. The $j^{th}$ frame of point cloud is the first frame of point cloud in point clouds, that have not been grouped, in a to-be-encoded point cloud group.

1≤j≤J, and J represents a quantity of frames of point clouds included in the to-be-encoded point cloud group. When the method shown in FIG. 7 is used to determine the first subgroup of to-be-encoded point clouds, j is equal to 1. When the method shown in FIG. 7 is used to determine the second subgroup of the to-be-encoded point clouds or any subgroup following the second subgroup, j is equal to a sum of frames of point clouds included in the first to $(i-1)^{th}$ subgroups plus 1.

S202: Determine whether characteristic information of the first pre-divided subgroup meets a preset condition.

If the characteristic information of the first pre-divided subgroup does not meet the preset condition, S203 is performed. If the characteristic information of the first pre-divided subgroup meets the preset condition, S204 is performed.

S203: Use the first frame of point cloud in the first pre-divided subgroup as a first subgroup.

After S203 is performed, the process ends.

For example, referring to FIG. 6, it can be learned from the fact that subgroup 2 is a set of one frame of point cloud that, in a process of determining subgroup 2, the obtained first pre-divided subgroup (that is, a set of point clouds 5 to 8) does not meet the preset condition.

S204: Slide a window for an $(i+1)^{th}$ time, to obtain an $(i+1)^{th}$ pre-divided subgroup. Further, a set of point clouds delimited by sliding the window for the first time to the $(i+1)^{th}$ time is used as the $(i+1)^{th}$ pre-divided group. i≥1, i is an integer, and an initial value of i is 1.

S205: Determine whether characteristic information of the $(i+1)^{th}$ pre-divided subgroup meets the preset condition.

If the characteristic information of the $(i+1)^{th}$ pre-divided subgroup meets the preset condition, S206 is performed. If the characteristic information of the $(i+1)^{th}$ pre-divided subgroup does not meet the preset condition, S207 is performed.

S206: Assign a value of i+2 to i+1. After S206 is performed, the process returns to S204.

S207: Determine an $i^{th}$ pre-divided subgroup to be one subgroup.

It should be noted that S204 in this embodiment may be replaced with a step of sliding the window for an $i^{th}$ time to obtain an $i^{th}$ pre-divided subgroup, where i≥2, i is an integer, and an initial value of i is 2. In this case, S205 may be replaced with a step of determining whether characteristic information of the $i^{th}$ pre-divided subgroup meets the preset condition, S206 may be replaced with a step of assigning a value of i+1 to i, and S207 may be replaced with a step of determining an $(i-1)^{th}$ pre-divided subgroup to be one subgroup.

For example, referring to FIG. 6, in a process of determining subgroup 3, the $j^{th}$ frame of point cloud is further point cloud 6. If characteristic information of the second pre-divided subgroup meets the preset condition, the window is slid for the third time to obtain a third pre-divided subgroup. If characteristic information of the third pre-divided subgroup does not meet the preset condition, the second pre-divided subgroup (that is, the set of point clouds 6 to 12) is used as subgroup 3.

For another example, referring to FIG. 6, assuming that a step size used for sliding the window each time is 3, it can be learned from the fact that subgroup 1 is a set of four frames of point clouds that, in a process of determining subgroup 1, the obtained first pre-divided subgroup (that is, the set of point clouds 1 to 4) meets the preset condition, and the obtained second pre-divided subgroup (that is, a set of point clouds 1 to 7) does not meet the preset condition.

In Embodiment 1, step sizes used for sliding the window for different times may be the same or different.

Optionally, a step size used for sliding the window for an (i1)th time is greater than or equal to a step size used for sliding the window for an (i2)th time, where 1≤i1≤i2≤i, and both i1 and i2 are integers. In other words, this embodiment of this application supports a technical solution in which, in a process of determining a subgroup, a step size used for sliding the window later is greater than or equal to a step size used for sliding the window earlier. Details are as follows In some implementations, a same step size is used for sliding the window every time, that is, the window is slid at a fixed step size. Optionally, the fixed step size may be 1, so that the to-be-encoded point cloud groups are grouped based on a point cloud granularity, which helps make a grouping result more accurate. Optionally, the fixed step size may alternatively be a value greater than 1. Because characteristic similarity of a plurality of consecutive frames of point clouds in a to-be-encoded point cloud group such as a GOF is relatively high, when the step size is relatively large, computation complexity in a grouping process can be reduced.

In some other implementations, step sizes used for sliding the window for at least two times are different, and a step size used for sliding the window later is greater than or equal to a step size used for sliding the window earlier. In other words, the window is slid at an unfixed step size. In this way, a proper step size is selected to help balance the computation complexity in the grouping process and the accuracy of the grouping result, help improve overall grouping performance, and further help improve coding performance. Optionally, the step size $N[i+1]$ used for sliding the window for the $(i+1)^{th}$ time is obtained according to a formula $N[i+1]=N[i]*c$, where $N[i]$ represents a step size used for sliding the window for an $i^{th}$ time, and c is determined based on a quantity of large-sized frames of point clouds in an $i^{th}$ pre-divided subgroup. In other words, in a process of sliding the window for two consecutive times, a step size used for sliding the window later is determined by using a step size used for sliding the window earlier. Further optionally, $c=(a-b)/a$, where a represents a first preset quantity, and b represents a quantity of large-sized frames of point clouds in the $i^{th}$ pre-divided subgroup. Certainly, this embodiment of this application is not limited thereto.

It may be understood that, during specific implementation, whether step sizes used for sliding the window for different times are fixed step sizes, a method for determining a step size when the step size is not a fixed step size, and the like may be predefined.

S201 to S207 are performed for a plurality of times, to obtain a plurality of subgroups into which the to-be-encoded point cloud group is divided. S201 to S207 may be considered as a common method for determining a subgroup in a to-be-encoded point cloud. During actual implementation, the following special cases may exist.

Case 1: It can be learned from descriptions in S201 to S207 that when the characteristic information of the ith pre-divided subgroup meets the condition, the window needs to be slid for an (i+1)th time. However, in this case, there may be a case in which there is no remaining point cloud that is not delimited in the to-be-encoded point cloud group, that is, the last frame of point cloud included in the ith pre-divided subgroup is the last frame of point cloud in the to-be-encoded point cloud group. In this case, it can be determined that the ith pre-divided subgroup is the last subgroup of the to-be-encoded point clouds.

Figure 8A:
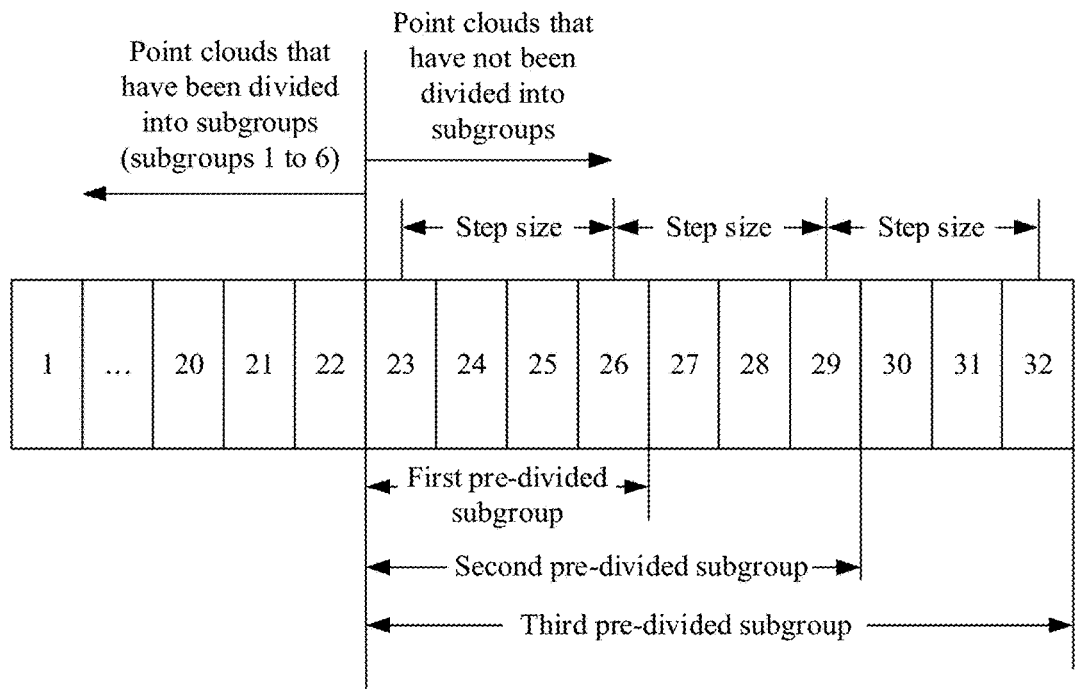
FIG. 8A is a schematic diagram of a process of determining a subgroup according to an embodiment of this application.

For example, referring to FIG. 8A, it is assumed that the to-be-encoded point cloud group includes point clouds 1 to 32, and the subgroups that have been obtained through division are subgroups 1 to 6. In a process of determining subgroup 7, if the characteristic information of the third pre-divided subgroup meets the preset condition, a fourth pre-divided subgroup needs to be obtained based on the descriptions in S201 to S207. In this case, because there is no remaining point cloud that is not delimited in the to-be-encoded point cloud group, the third pre-divided subgroup (that is, a set of point clouds 23 to 32) may be used as subgroup 7.

Case 2: In a process of sliding the window for an $(i+1)^{th}$ time, a step size used for sliding the window for the $(i+1)^{th}$ time may be greater than a quantity of frames of point clouds that have not been delimited in the to-be-encoded point cloud group. In this case, the quantity of frames of point clouds included in the $i^{th}$ pre-divided subgroup and the point clouds that have not been delimited in the to-be-encoded point cloud group may be used as an $(i+1)^{th}$ pre-divided subgroup.

Figure 8B:
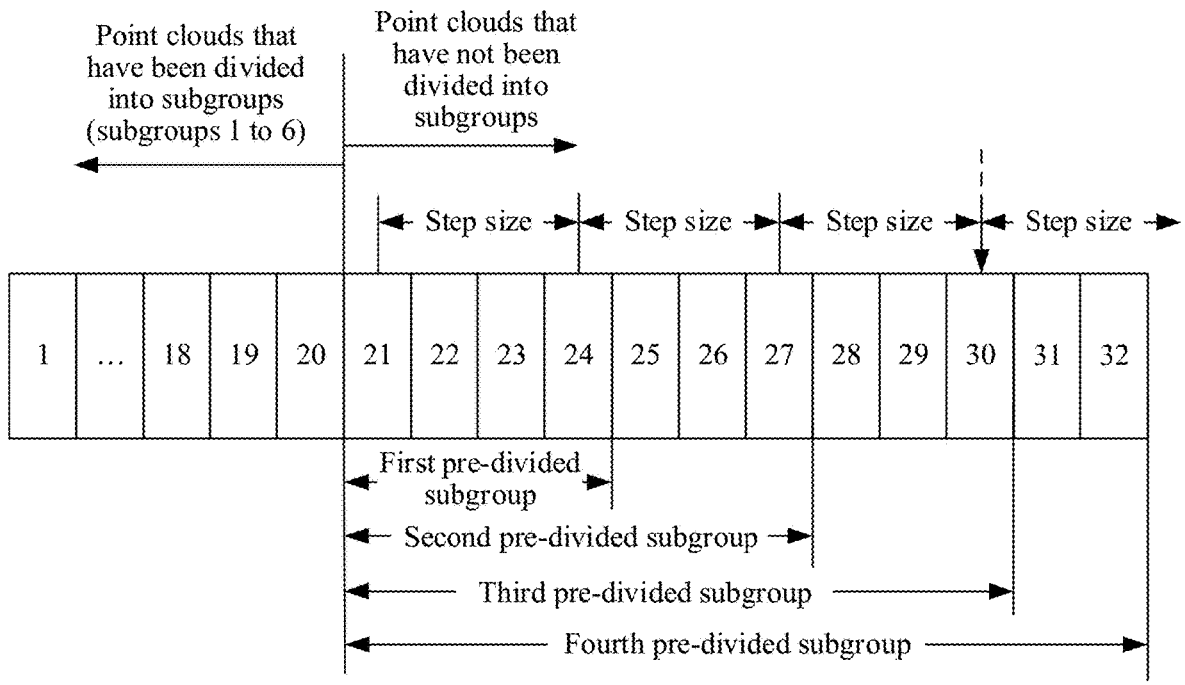
FIG. 8B is a schematic diagram of another process of determining a subgroup according to an embodiment of this application.

For example, referring to FIG. 8B, it is assumed that the to-be-encoded point cloud group includes point clouds 1 to 32, and the subgroups that have been obtained through division are subgroups 1 to 6. In a process of determining subgroup 7, if the characteristic information of the third pre-divided subgroup meets the preset condition, a fourth pre-divided subgroup needs to be obtained based on the descriptions in S201 to S207. In this case, because a step size (that is, 3) used for sliding the window for the fourth time is greater than the quantity (that is, 2) of frames of point clouds (that is, point clouds 31 and 32) that have not been delimited in the to-be-encoded point cloud group, the point clouds 21 to 33 may be used as the fourth pre-divided subgroup.

Embodiment 2

Figure 9A:
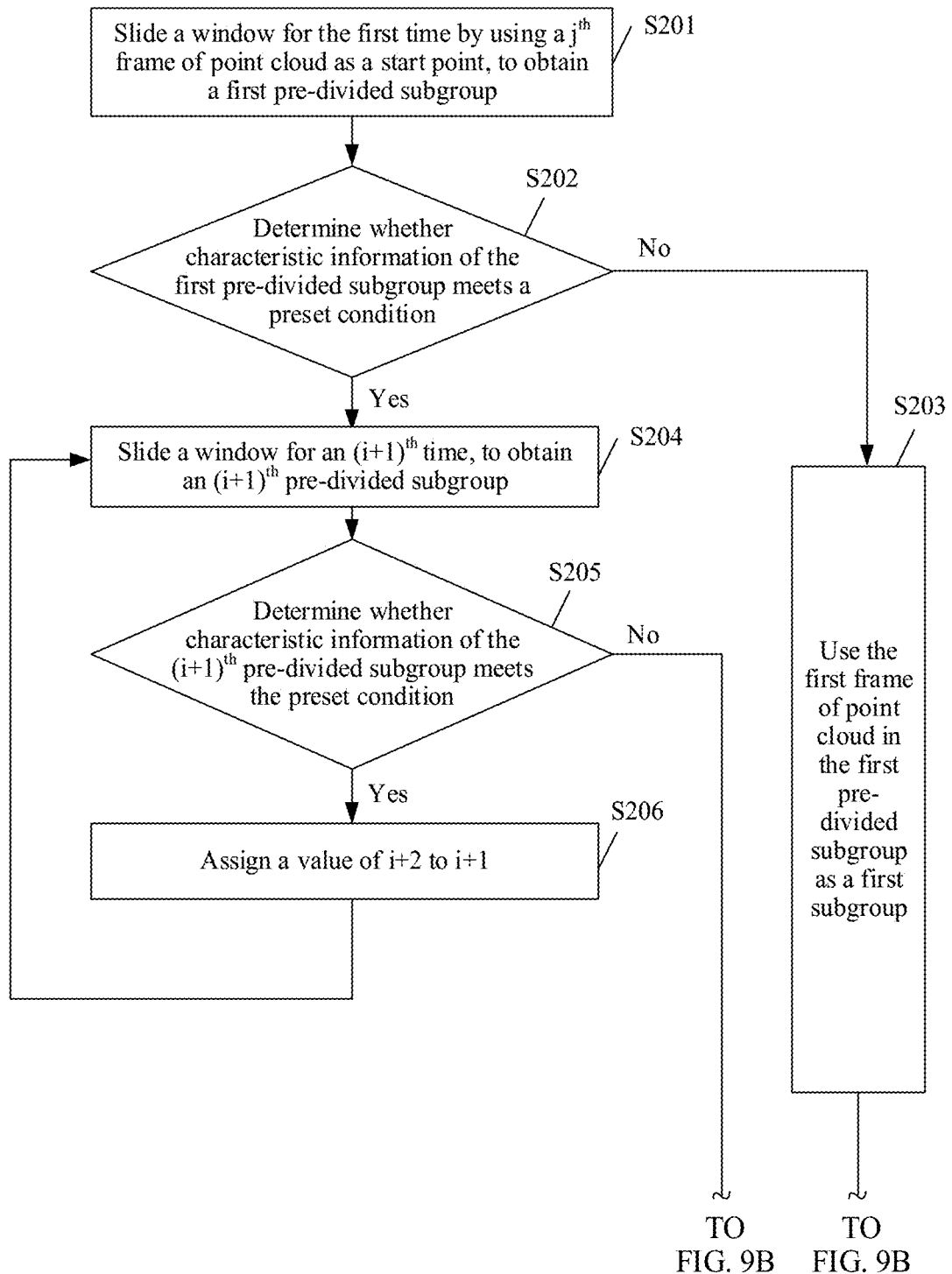
FIG. 9A and FIG. 9B are a schematic flowchart of another method for determining a subgroup according to an embodiment of this application.
Figure 9B:
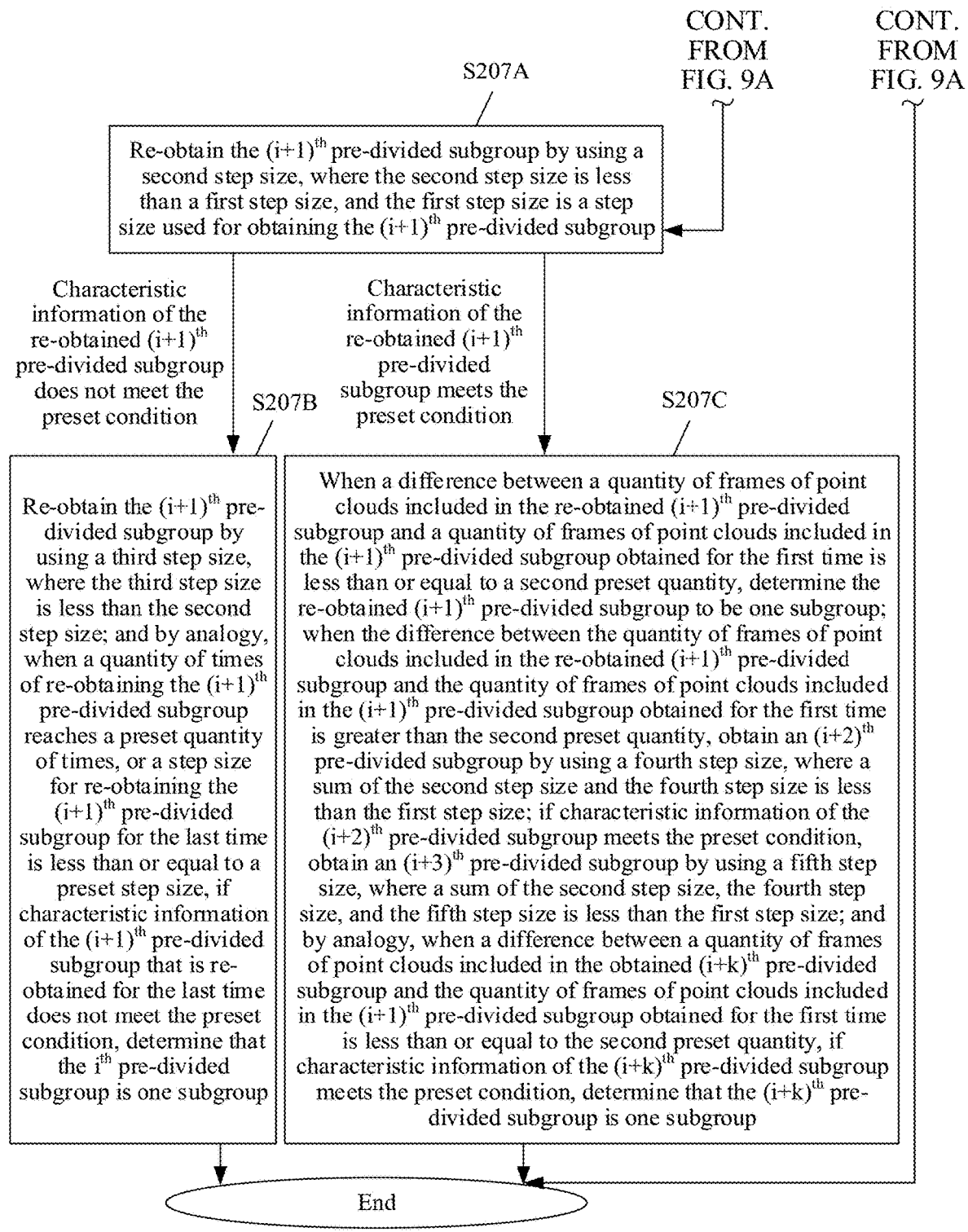

Embodiment 2 differs from Embodiment 1 in that, when i≥2, if the characteristic information of the $i^{th}$ pre-divided subgroup meets the preset condition, and the characteristic information of the $(i+1)^{th}$ pre-divided subgroup does not meet the preset condition, the $(i+1)^{th}$ pre-divided group is re-obtained at a smaller step size. This embodiment is applied to a scenario in which the step size used for obtaining the $(i+1)^{th}$ pre-divided subgroup is greater than 1. A flowchart of the method provided in this embodiment may be shown in FIG. 9A and FIG. 9B. Further, S207 in Embodiment 1 may be replaced with the following steps S207A to S207C.

S207A: Re-obtain the $(i+1)^{th}$ pre-divided subgroup by using a second step size, where the second step size is less than the first step size, and the first step size is a step size used for obtaining the $(i+1)^{th}$ pre-divided subgroup.

The process of re-obtaining the $(i+1)^{th}$ pre-divided subgroup may be understood as a process of returning (or rolling back) to a last frame of point cloud in the $i^{th}$ pre-divided subgroup, and sliding by the second step size by using the last frame as a start point.

S207B: If characteristic information of the $(i+1)^{th}$ pre-divided subgroup re-obtained by using the second step size does not meet the preset condition, re-obtain the $(i+1)^{th}$ pre-divided subgroup by using a third step size, where the third step size is less than the second step size. In other words, a step size for re-obtaining the $i^{th}$ pre-divided subgroup each time is less than a step size for re-obtaining the $i^{th}$ pre-divided subgroup last time, and by analogy, when a quantity of times of re-obtaining the $(i+1)^{th}$ pre-divided subgroup reaches a preset quantity of times, or a step size for re-obtaining the $(i+1)^{th}$ pre-divided subgroup for the last time is less than or equal to a preset step size (for example, 1), if characteristic information of the $(i+1)^{th}$ pre-divided subgroup that is re-obtained for the last time does not meet the preset condition, determine that the $i^{th}$ pre-divided subgroup is to be one subgroup.

Figure 10:
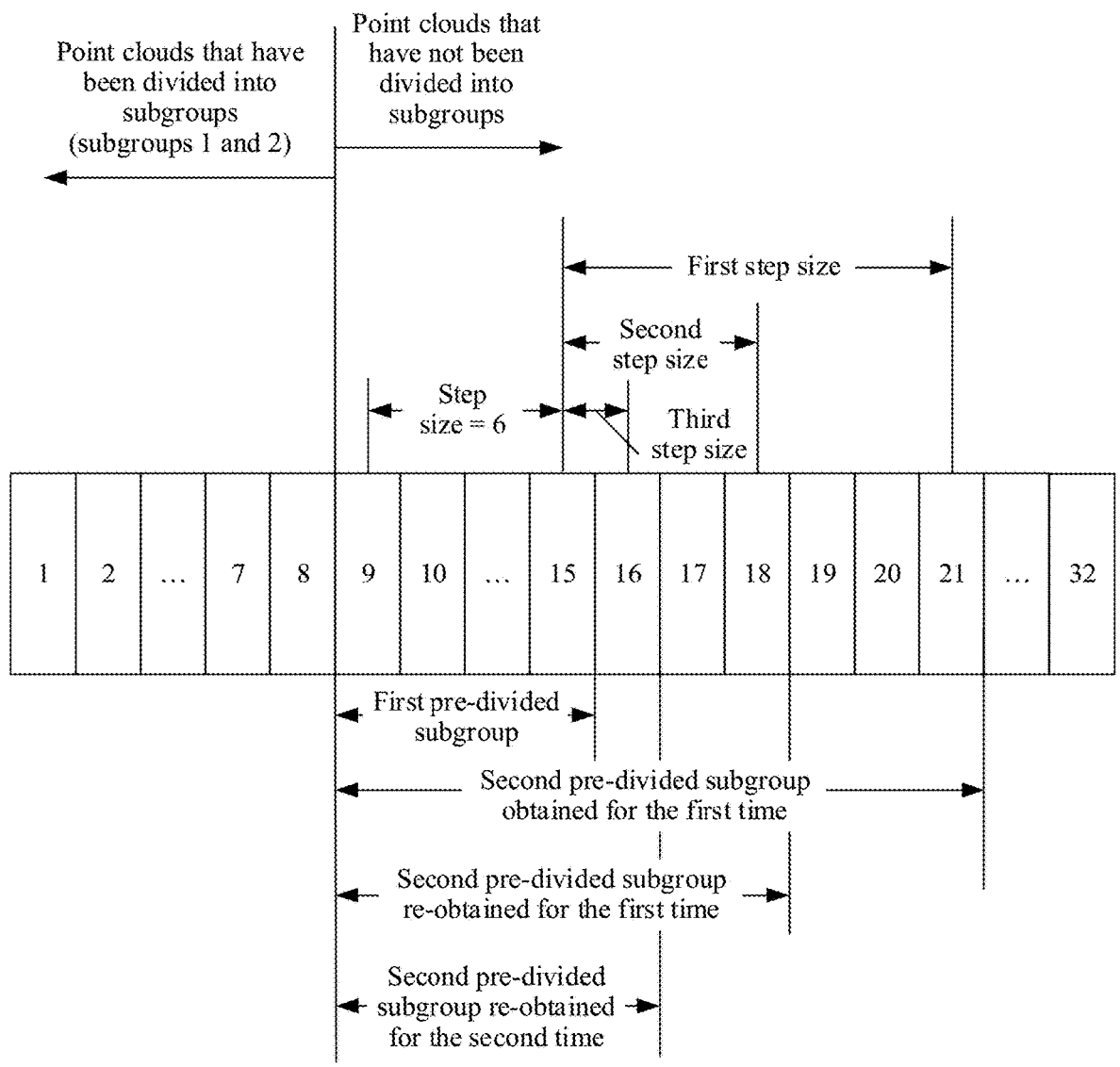
FIG. 10 is a schematic diagram of a process of a method for determining a subgroup according to an embodiment of this application.

For example, referring to FIG. 10, it is assumed that in a process of determining subgroup 3, characteristic information of the first pre-divided subgroup (that is, a set of point clouds 9 to 15) meets the preset condition, characteristic information of the second pre-divided subgroup (that is, a set of point clouds 9 to 21) does not meet the preset condition, and the first step size is 6. In this case, characteristic information of a pre-divided subgroup that includes point clouds 9 to p may meet the condition, where 15<p<21, and p is an integer. Therefore, the second pre-divided subgroup (that is, a set of point clouds 9 to 18) is re-obtained by using the second step size (for example, 3). If characteristic information of the re-obtained second pre-divided subgroup does not meet the preset condition, characteristic information of a subgroup that includes point clouds 9 to q may meet the preset condition, where 15<q<18, and q is an integer. Therefore, the second pre-divided subgroup (that is, a set of point clouds 9 to 16) is re-obtained again by using the third step size (for example, 1). It is assumed that characteristic information of the re-obtained second pre-divided subgroup does not meet the preset condition, and a quantity of times of re-obtaining the second pre-divided subgroup reaches a preset quantity of times, or a step size for re-obtaining the second pre-divided subgroup for the last time is less than or equal to a preset step size. In this case, the first pre-divided subgroup (that is, the set of point clouds 9 to 15) is used as subgroup 3.

It may be understood that if characteristic information of the $(i+1)^{th}$ pre-divided subgroup that is re-obtained at a specific time meets the preset condition, the following step S207C may be performed.

S207C: If characteristic information of the re-obtained $(i+1)^{th}$ pre-divided subgroup meets the preset condition, the following operations are performed.

When a difference between a quantity of frames of point clouds included in the re-obtained $(i+1)^{th}$ pre-divided subgroup and a quantity of frames of point clouds included in the $(i+1)^{th}$ pre-divided subgroup obtained for the first time is less than or equal to a second preset quantity, the re-obtained $(i+1)^{th}$ pre-divided subgroup is determined to be one subgroup.

Figure 11A:
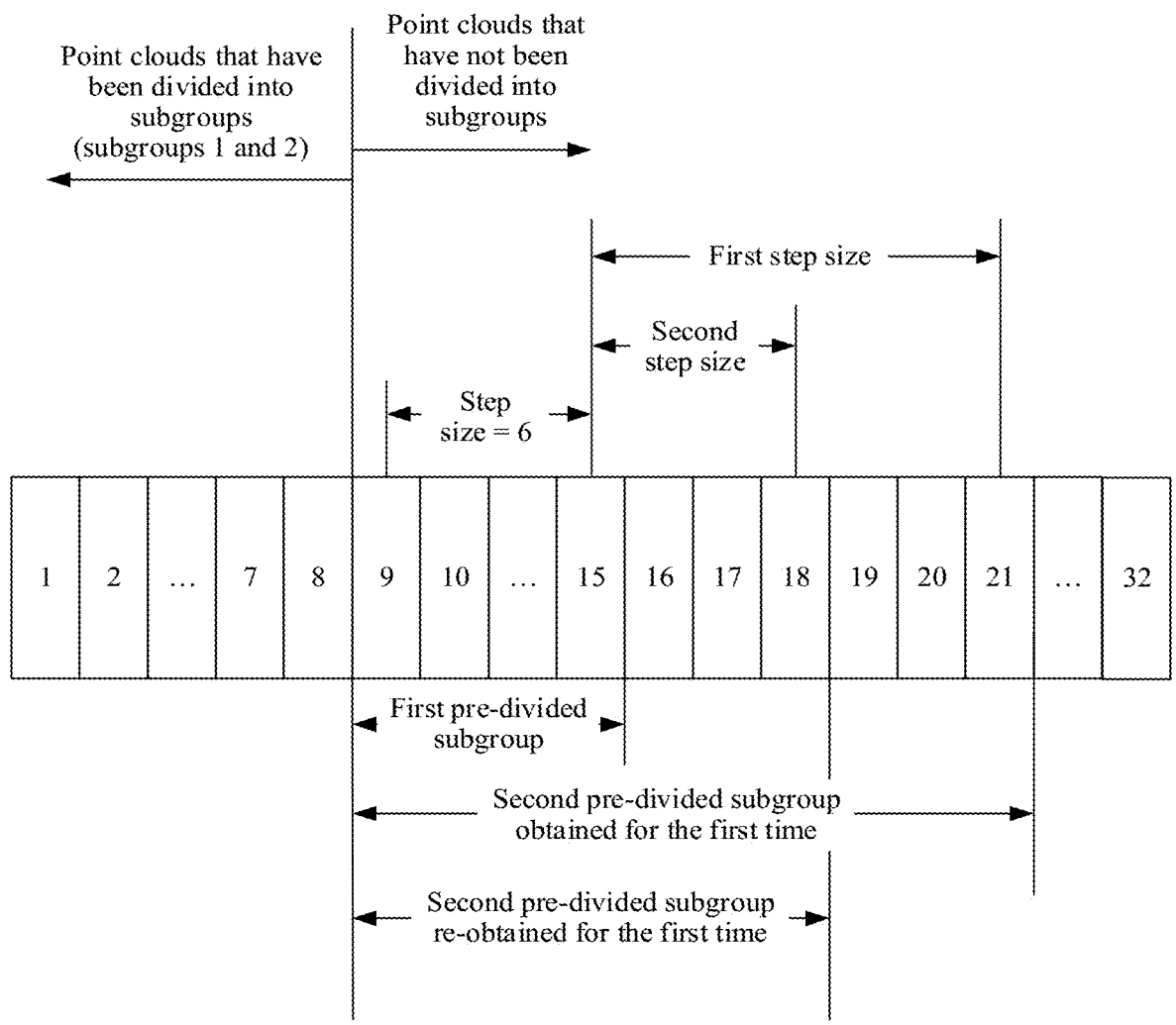
FIG. 11A is a schematic diagram of a process of a method for determining a subgroup based on FIG. 10 according to an embodiment of this application.

For example, referring to FIG. 11A, it is assumed that in the process of determining subgroup 3, if characteristic information of the re-obtained second pre-divided subgroup (that is, a set of point clouds 9 to 18) meets the preset condition, characteristic information of a subgroup that includes point clouds 9 to d may meet the preset condition, where 18<d<21, and d is an integer. In this case, it is assumed that the second preset quantity is 3. Because a difference (that is, 3) between the quantity of frames of point clouds included in the re-obtained second pre-divided subgroup and the quantity of frames of point clouds included in the second pre-divided subgroup obtained for the first time is equal to the second preset quantity, the re-obtained second pre-divided subgroup (that is, a set of point clouds 9 to 18) is used as one subgroup.

When the difference between the quantity of frames of point clouds included in the re-obtained $(i+1)^{th}$ pre-divided subgroup and the quantity of frames of point clouds included in the $(i+1)^{th}$ pre-divided subgroup obtained for the first time is greater than the second preset quantity, an $(i+2)^{th}$ pre-divided subgroup is obtained by using a fourth step size, where a sum of the second step size and the fourth step size is less than the first step size. If characteristic information of the $(i+2)^{th}$ pre-divided subgroup meets the preset condition, an $(i+3)^{th}$ pre-divided subgroup is obtained by using a fifth step size, where a sum of the second step size, the fourth step size, and the fifth step size is less than the first step size. In other words, a sum of a step size used for obtaining an $(i+k)^{th}$ pre-divided subgroup, a step size used for obtaining an $(i+k-1)^{th}$ pre-divided subgroup, a step size used for obtaining an $(i+k-2)^{th}$ pre-divided subgroup, . . . , the step size used for obtaining the $(i+2)^{th}$ pre-divided subgroups, and the step size used for re-obtaining the $(i+1)^{th}$ pre-divided subgroup is less than the step size used for obtaining the $(i+1)^{th}$ pre-divided subgroup for the first time. By analogy, when a difference between a quantity of frames of point clouds included in the obtained $(i+k)^{th}$ pre-divided subgroup and the quantity of frames of point clouds included in the $(i+1)^{th}$ pre-divided subgroup obtained for the first time is less than or equal to the second preset quantity, if characteristic information of the $(i+k)^{th}$ pre-divided subgroup meets the preset condition, the $(i+k)^{th}$ pre-divided subgroup is determined to be one subgroup, where k≥2, and k is an integer.

Figure 11B:
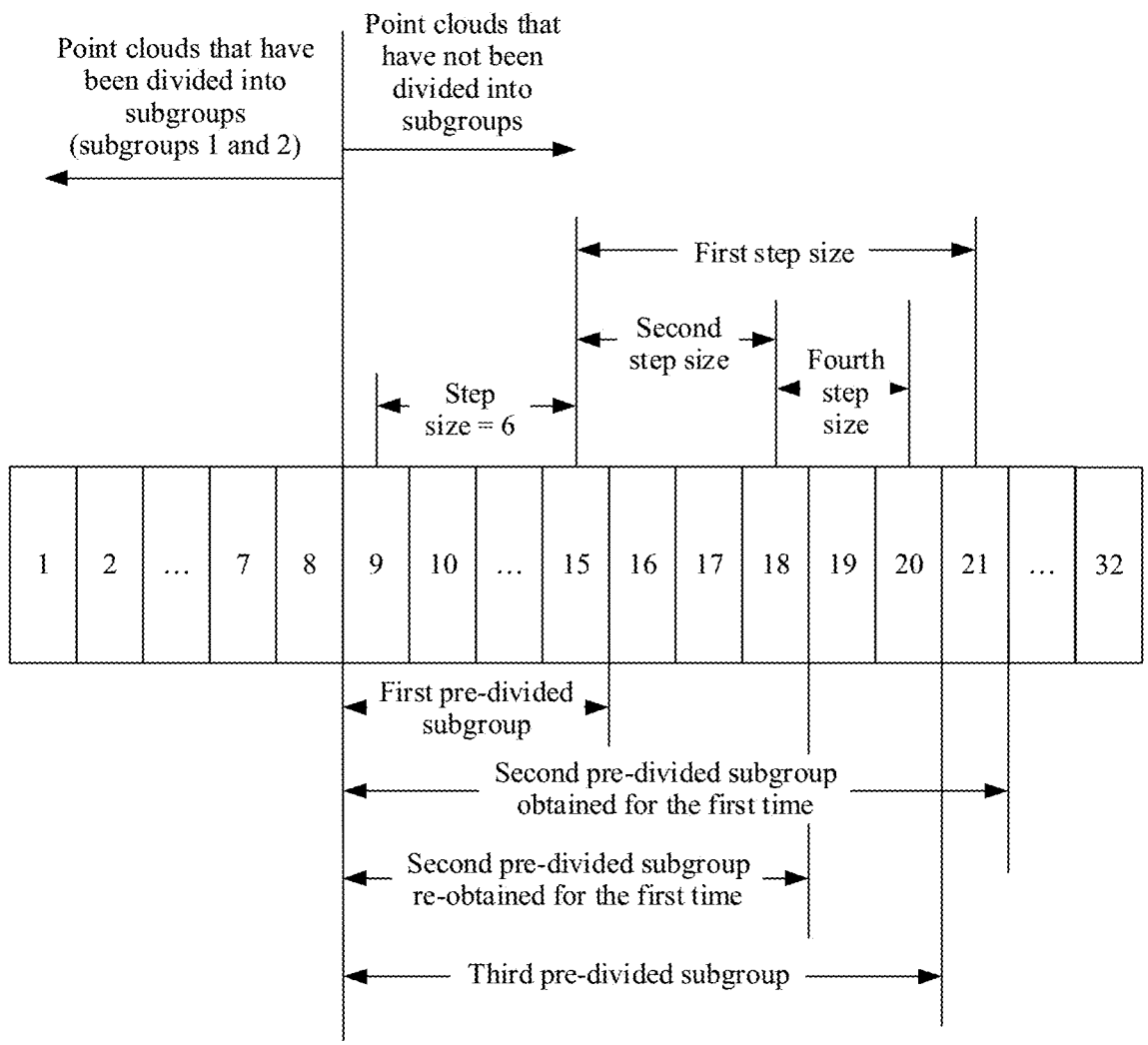
FIG. 11B is a schematic diagram of another process of a method for determining a subgroup based on FIG. 10 according to an embodiment of this application.

For example, referring to FIG. 11B, it is assumed that in the process of determining subgroup 3, if characteristic information of the re-obtained second pre-divided subgroup (that is, a set of point clouds 9 to 18) meets the preset condition, characteristic information of a subgroup that includes point clouds 9 to d may meet the preset condition, where 18<d<21, and d is an integer. In this case, it is assumed that the second preset quantity is 1. Because a difference (that is, 1) between the quantity of frames of point clouds included in the third pre-divided subgroup and the quantity of frames of point clouds included in the second pre-divided subgroup obtained for the first time is equal to the second preset quantity, the third pre-divided subgroup (that is, a set of point clouds 9 to 21) is used as one subgroup.

It may be understood that if the characteristic information of the $(i+k)^{th}$ pre-divided subgroup does not meet the preset condition, the $(i+k)^{th}$ pre-divided subgroup is re-obtained. For subsequent steps to be performed, refer to S207B and/or S207C.

It may be understood that, in a case of no conflict, the explanation of related content in Embodiment 1 may also be applied to Embodiment 2. For example, the processing manners in case 1 and case 2 in Embodiment 1 may be applied to Embodiment 2. For another example, the method for determining a step size in Embodiment 1 may be applied to Embodiment 2.

The method for determining a subgroup provided in this embodiment helps enable as many point clouds in the to-be-encoded point cloud group as possible to form one subgroup that meets a preset condition when a step size of the sliding window is greater than 1. When one subgroup includes at least two frames of point clouds, an occupancy map that is of patches having a matching relationship in each point cloud and that is obtained by using the global matching packing algorithm corresponds to a location in an occupancy map of the point cloud in which the patches are located, so that coding performance can be improved. Therefore, according to the solution provided in this embodiment, as many point clouds as possible form one subgroup that meets the preset condition, and when point clouds in the subgroup are packed by using the global matching packing algorithm, coding efficiency is improved.

The following briefly describes some terms in a process of implementing pre-divided by using a dichotomy, to facilitate understanding by a reader.

A subgroup segmentation point is a segmentation point of two adjacent subgroups. It may be understood that an essence of dividing the to-be-encoded point cloud group is searching for a subgroup segmentation point in the to-be-encoded point cloud group.

An intermediate point of the dichotomy is an intermediate object among a plurality of objects in a sequence on which the dichotomy is performed. For example, assuming that numbers of objects included in one sequence are respectively x to y, where $1 \leq x < y$, and both x and y are integers, a middle point of the dichotomy is an object numbered $\lfloor (y-x)/2 \rfloor$, or an object numbered $\lceil (y-x)/2 \rceil$. Herein, $\lfloor \ \rfloor$ represents rounding down and $\lceil \ \rceil$ represents rounding up. Among the objects on which the current dichotomy is performed, the objects before the middle point are referred to as the first half of the objects obtained by performing the current dichotomy, and the objects after the middle point are referred to as the second half of the objects obtained by performing the current dichotomy.

For an $i^{th}$ pre-divided subgroup, a dichotomy is performed on point clouds, that have not been grouped, in a to-be-encoded point cloud group for an $i^{th}$ time by using a $j^{th}$ frame of point cloud as a start point, to obtain the $i^{th}$ pre-divided subgroup. For example, the first half of point clouds obtained by performing the dichotomy may be used as the $i^{th}$ pre-divided subgroup. This is used as an example for description in this embodiment of this application. Certainly, this embodiment of this application is not limited thereto. The $j^{th}$ frame of point cloud is the first frame of point cloud in point clouds, that have not been grouped, in a to-be-encoded point cloud group.

If the characteristic information of the $i^{th}$ pre-divided subgroup meets the preset condition, the $(i+1)^{th}$ pre-divided subgroup is a set of the $i^{th}$ pre-divided subgroup and the first half of point clouds that are obtained by performing a dichotomy for the $(i+1)^{th}$ time.

If the characteristic information of the $i^{th}$ pre-divided subgroup does not meet the preset condition, the $(i+1)^{th}$ pre-divided subgroup is a set of the first half of point clouds in the $i^{th}$ pre-divided subgroup.

Figure 12A:
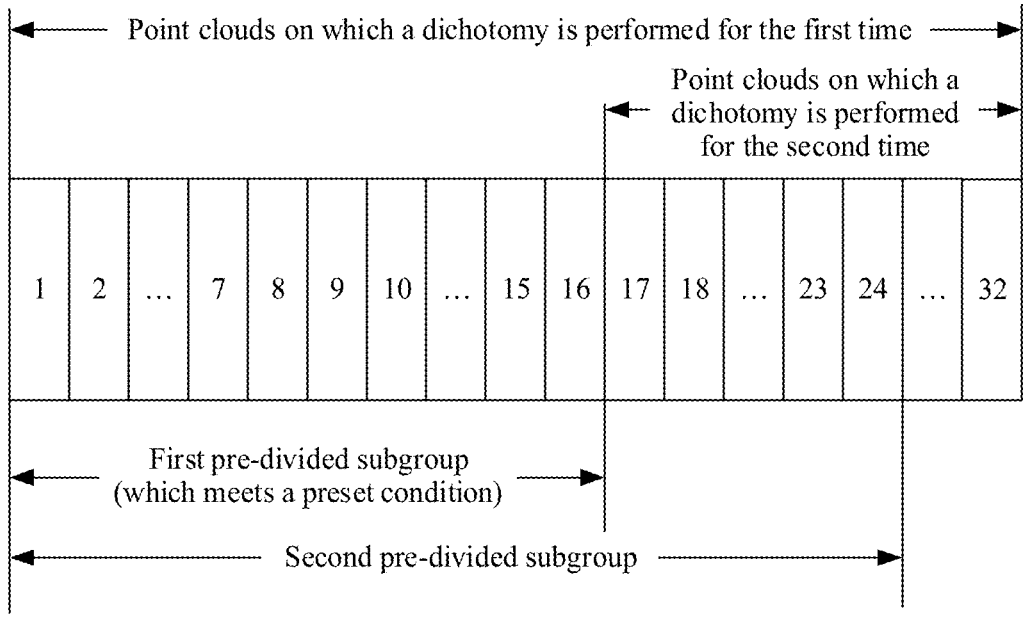
FIG. 12A and FIG. 12B are schematic diagrams of a relationship between a dichotomy and a pre-divided subgroup according to an embodiment of this application.
Figure 12B:
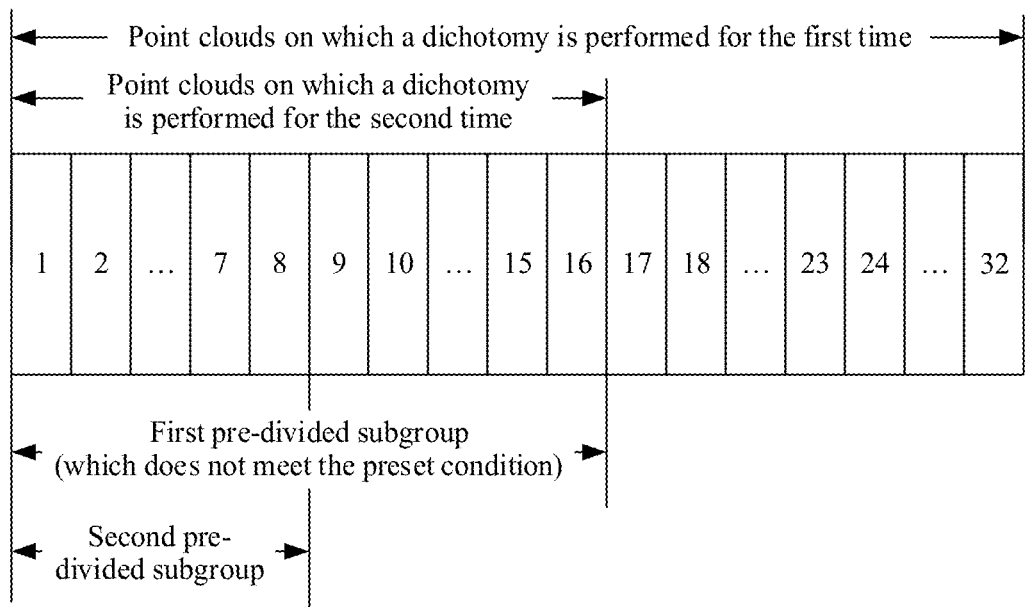

FIGS. 12A and 12B are schematic diagrams of a relationship between a dichotomy and a pre-divided subgroup according to an embodiment of this application. FIGS. 12A and 12B are described by using an example in which the to-be-encoded point cloud group includes point clouds 1 to 32. Further, a dichotomy is performed on the point clouds 1 to 32 to obtain the first pre-divided subgroup (that is, a set of point clouds 1 to 16). If the characteristic information of the first pre-divided subgroup meets the preset condition, a dichotomy is performed on point clouds 16 to 32 to obtain the second pre-divided subgroup (that is, a set of point clouds 1 to 24), as shown in FIG. 12A. If the characteristic information of the first pre-divided subgroup does not meet the preset condition, a dichotomy is performed on point clouds 1 to 16, to obtain the second pre-divided subgroup (that is, a set of point clouds 1 to 7), as shown in FIG. 12B.

The following describes, by using a specific example, a method for determining a subgroup in a to-be-encoded point cloud group when pre-division is implemented by using a dichotomy provided in this embodiment of this application. For details, refer to the following Embodiment 3 or Embodiment 4.

Embodiment 3

Figure 13:
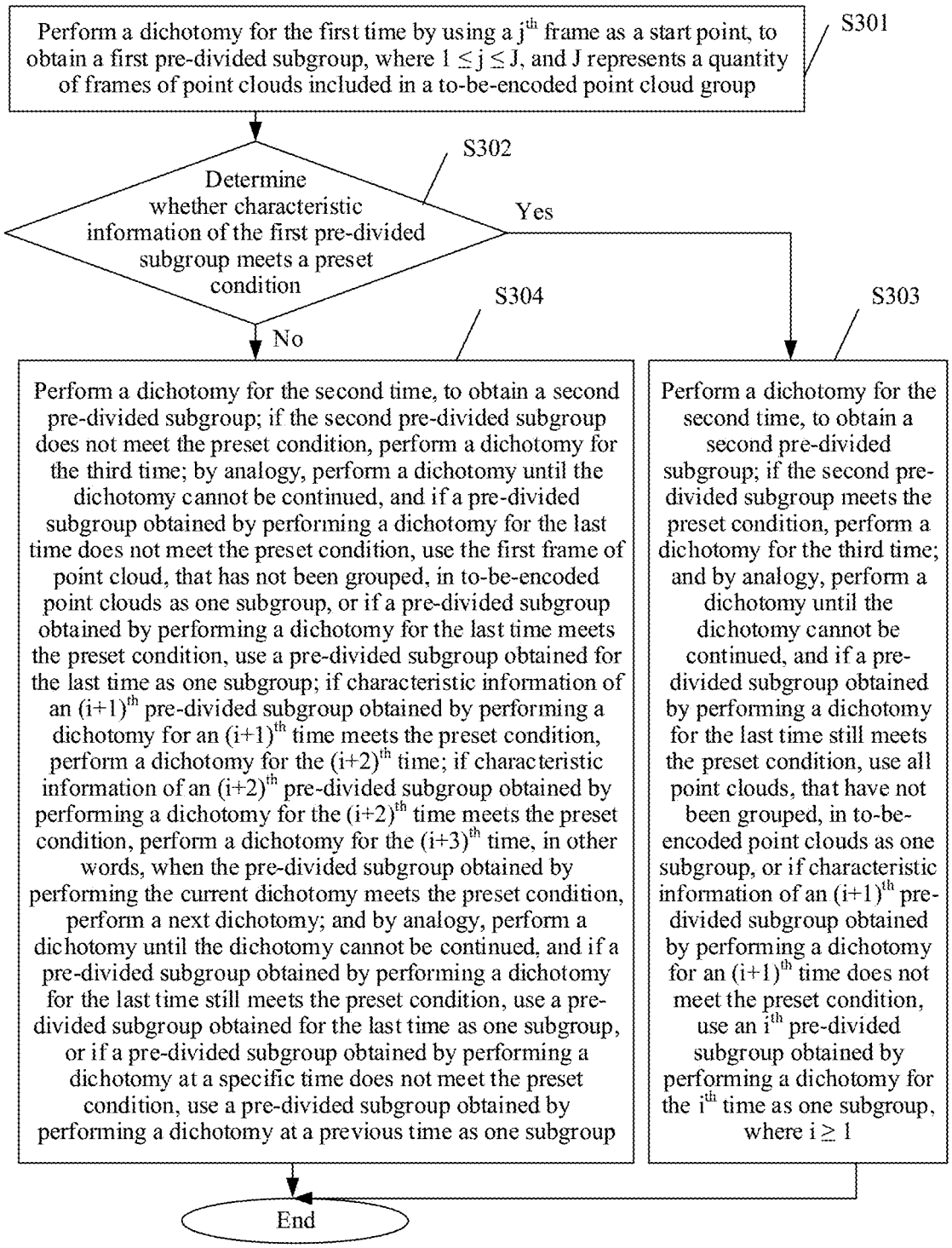
FIG. 13 is a schematic flowchart of another method for determining a subgroup according to an embodiment of this application.

FIG. 13 is a schematic flowchart of a method for determining a subgroup according to an embodiment of this application. The method shown in FIG. 13 includes the following steps.

S301: Perform a dichotomy for the first time by using a $j^{th}$ frame as a start point, to obtain a first pre-divided subgroup, where $1 \leq j \leq J$, and J represents a quantity of frames of point clouds included in the to-be-encoded point cloud group.

S302: Determine whether characteristic information of the first pre-divided subgroup meets a preset condition.

If the characteristic information of the first pre-divided subgroup meets the preset condition, it indicates that a to-be-determined segmentation point is in the second half of point clouds obtained by performing the current dichotomy, and S303 is performed.

If the characteristic information of the first pre-divided subgroup does not meet the preset condition, it indicates that the to-be-determined segmentation point is in the first half of point clouds obtained by performing the current dichotomy, and S304 is performed.

S303: Perform a dichotomy for the second time, to obtain a second pre-divided subgroup, if the second pre-divided subgroup meets the preset condition, perform a dichotomy for the third time, in other words, when the pre-divided subgroup obtained by performing the current dichotomy meets the preset condition, perform a next dichotomy, and by analogy, perform a dichotomy. There may be the following subsequent implementations Implementation 1: If the pre-divided subgroup obtained by performing the most recent dichotomy still meets the preset condition until the dichotomy cannot be continued, all point clouds, that have not been grouped, in to-be-encoded point clouds are used as one subgroup.

Implementation 2: If characteristic information of an $(i+1)^{th}$ pre-divided subgroup obtained by performing a dichotomy for an $(i+1)^{th}$ time does not meet the preset condition, an $i^{th}$ pre-divided subgroup obtained by performing a dichotomy for the $i^{th}$ time is used as one subgroup, where $i \geq 1$, and i is an integer.

S304: Perform a dichotomy for the second time, to obtain a second pre-divided subgroup, if the second pre-divided subgroup does not meet the preset condition, perform a dichotomy for the third time, in other words, when the pre-divided subgroup obtained by performing the current dichotomy does not meet the preset condition, perform a next dichotomy, and by analogy, perform a dichotomy. There may be the following subsequent implementations.

Implementation 1: If the pre-divided subgroup obtained by performing the most recent dichotomy still does not meet the preset condition until the dichotomy cannot be continued, the first frame of point cloud, that has not been grouped, in to-be-encoded point clouds is used as one subgroup.

Implementation 2: If the pre-divided subgroup obtained by performing the most recent dichotomy meets the preset condition until the dichotomy cannot be continued, a pre-divided subgroup obtained most recently is used as one subgroup.

Implementation 3: If characteristic information of an $(i+1)^{th}$ pre-divided subgroup obtained by performing a dichotomy for an $(i+1)^{th}$ time meets the preset condition, a dichotomy is performed for the $(i+2)^{th}$ time. If characteristic information of an $(i+2)^{th}$ pre-divided subgroup obtained by performing a dichotomy for the $(i+2)^{th}$ time meets the preset condition, a dichotomy is performed for the $(i+3)^{th}$ time. In other words, when the pre-divided subgroup obtained by performing the current dichotomy meets the preset condition, a next dichotomy is performed. By analogy, a dichotomy is performed. If the pre-divided subgroup obtained by performing the most recent dichotomy still meets the preset condition until the dichotomy cannot be continued, a pre-divided subgroup obtained most recently is used as one subgroup. If a pre-divided subgroup obtained by performing a dichotomy at a specific time does not meet the preset condition, a pre-divided subgroup obtained by performing a dichotomy at a previous time is used as one subgroup.

The method for determining a subgroup provided in this embodiment helps enable as many point clouds in the to-be-encoded point cloud group as possible to form one subgroup that meets the preset condition, and when point clouds in the subgroup are packed by using the global matching packing algorithm, coding efficiency is improved.

Embodiment 4

Figure 14:
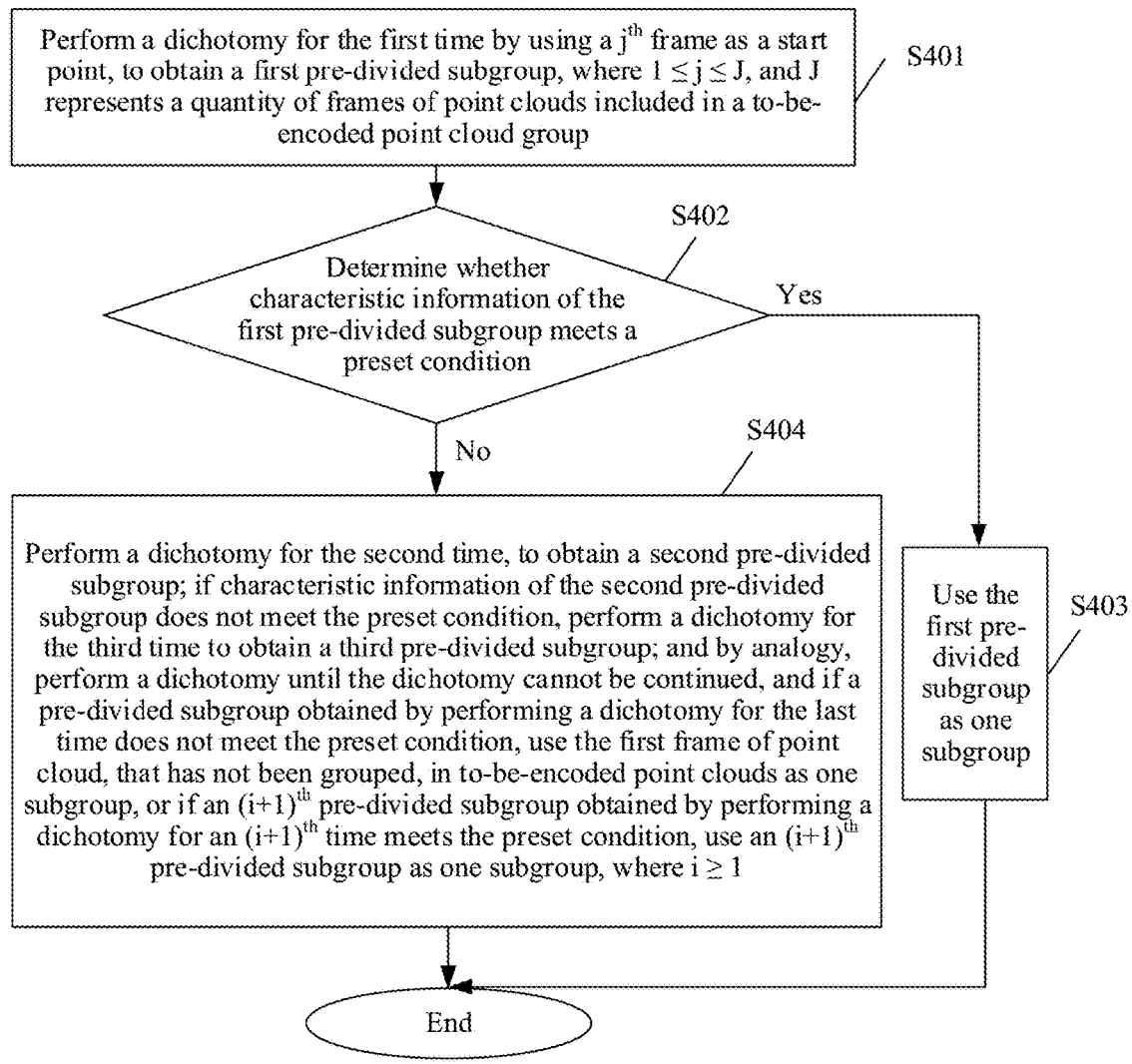
FIG. 14 is a schematic flowchart of another method for determining a subgroup according to an embodiment of this application.

FIG. 14 is a schematic flowchart of a method for determining a subgroup according to an embodiment of this application. The method shown in FIG. 14 includes the following steps.

S401: Perform a dichotomy for the first time by using a $j^{th}$ frame as a start point, to obtain a first pre-divided subgroup, where 1≤j≤J, and J represents a quantity of frames of point clouds included in the to-be-encoded point cloud group.

S402: Determine whether characteristic information of the first pre-divided subgroup meets a preset condition.

If the characteristic information of the first pre-divided subgroup meets the preset condition, S403 is performed. If the characteristic information of the first pre-divided subgroup does not meet the preset condition, S404 is performed.

S403: Use the first pre-divided subgroup as one subgroup.

S404: Perform a dichotomy for the second time, to obtain a second pre-divided subgroup, if characteristic information of the second pre-divided subgroup does not meet the preset condition, perform a dichotomy for the third time to obtain a third pre-divided subgroup, in other words, when the pre-divided subgroup obtained by performing the current dichotomy does not meet the preset condition, perform a next dichotomy, and by analogy, perform a dichotomy. There may be the following subsequent implementations.

Implementation 1: If the pre-divided subgroup obtained by performing the most recent dichotomy still does not meet the preset condition until the dichotomy cannot be continued, the first frame of point cloud, that has not been grouped, in to-be-encoded point clouds is used as one subgroup.

Implementation 2: If an $(i+1)^{th}$ pre-divided subgroup obtained by performing a dichotomy for an $(i+1)^{th}$ time meets the preset condition, an $(i+1)^{th}$ pre-divided subgroup is used as one subgroup, where i≥1, and i is an integer.

According to the method for determining a subgroup provided in this embodiment, a first pre-divided subgroup that meets a preset condition in a plurality of pre-divided subgroups that are obtained by performing a dichotomy a plurality of times is used as one subgroup. Unlike the pre-divided method by using a sliding window method, if a pre-divided subgroup obtained through pre-division by using a dichotomy meets a preset condition, it may be considered that the pre-divided subgroup obtained by performing the current dichotomy already includes a relatively large number of point clouds. Therefore, when the global matching packing algorithm is used to pack point clouds in the subgroup, coding efficiency is improved.

It should be noted that, any one of "the dichotomy cannot be continued" described in Embodiment 3 and Embodiment 4 may include, when a quantity of objects (point clouds) on which the dichotomy is performed is 1, the dichotomy cannot be performed, or when a quantity of times of performing a dichotomy reaches a preset threshold, the dichotomy cannot be continued. When the quantity of objects on which the dichotomy is performed is 1, the dichotomy cannot be performed, which may be extended as follows When the quantity of objects (point clouds) on which the dichotomy is performed is less than or equal to a preset threshold, the dichotomy cannot be continued.

For details about whether any pre-divided subgroup described in Embodiment 1 to Embodiment 4 meets the preset condition, refer to the following description. The following provides description by using an example in which when the characteristic information of the $i^{th}$ pre-divided subgroup meets the preset condition, and the characteristic information of the $(i+1)^{th}$ pre-divided subgroup does not meet the preset condition, the $i^{th}$ pre-divided subgroup is determined to be one of the plurality of subgroups. In addition, it may be understood that the "pre-divided subgroup" used in the following description of whether a pre-divided subgroup meets a preset condition may be obtained, for example without limitation, by using a sliding window method or a dichotomy method.

Optionally, when the characteristic information of the $i^{th}$ pre-divided subgroup meets the preset condition, and the characteristic information of the $(i+1)^{th}$ pre-divided subgroup does not meet the preset condition, the $i^{th}$ pre-divided subgroup is determined to be one of the plurality of subgroups. This can be implemented in at least one of the following manners.

Manner 1: If the characteristic information of the $i^{th}$ pre-divided subgroup includes a size of a global occupancy map for the $i^{th}$ pre-divided subgroup, when the size of the global occupancy map for the $i^{th}$ pre-divided subgroup is less than or equal to a first threshold, and when a size of a global occupancy map for the $(i+1)^{th}$ pre-divided subgroup is greater than the first threshold, the $i^{th}$ pre-divided subgroup is determined to be one subgroup.

A global occupancy map is obtained by packing one or more union patch occupancy maps, and a union patch occupancy map is a union of a group of global matched patches in a pre-divided subgroup. Therefore, as a quantity of frames of point clouds in the pre-divided subgroup increases, a quantity of patches in a group of global matched patches increases, and further an area of a union patch occupancy map corresponding to the group of global matched patches increases, and a size of a global occupancy map increases. In consideration of this reason, this manner is provided. Based on this manner, a global occupancy map for a subgroup is limited within the first threshold, which may indirectly reflect a size of an occupancy map of a point cloud in the subgroup. Therefore, coding efficiency is improved.

It may be understood that when different parameters are used to represent the size of the global occupancy map, meanings of the first threshold are different. For example, when the size of the global occupancy map is represented by a product of the height and the width of the global occupancy map, the first threshold represents an allowable maximum value of an area of a global occupancy map for a subgroup. For another example, when the size of the global occupancy map is represented by the height of the global occupancy map, the first threshold represents an allowable maximum value of the height of a global occupancy map for a subgroup.

In an implementation, the first threshold is a predefined value, for example, a predefined empirical value. For example, when the first threshold represents an allowable maximum value of the height of a global occupancy map for a subgroup, the first threshold may be 1280 pixels.

In another implementation, the first threshold is determined based on a maximum size of an occupancy map that is of a point cloud (for example, each point cloud) in the to-be-encoded point cloud group and that is obtained based on a candidate packing algorithm. The candidate packing algorithm may be another packing algorithm other than the global matching packing algorithm, for example, an anchor packing algorithm. For example, the first threshold is H*w1, where H represents a maximum value of the height of an occupancy map that is of a point cloud in the to-be-encoded point cloud group and that is obtained based on the candidate algorithm such as the anchor packing algorithm, and w1 is a constant, and w1 may be determined based on impact of the global matching packing algorithm and the candidate packing algorithm on efficiency of video encoding and decoding. Optionally, w1∈(0.5, 1.5), which is certainly not limited.

Manner 2: If the characteristic information of the $i^{th}$ pre-divided subgroup includes a size of an occupancy map of a point cloud in the $i^{th}$ pre-divided subgroup, the following manner 2-1 and/or manner 2-2 are/is performed.

Manner 2-1: When a quantity of large-sized frames of point clouds in the $i^{th}$ pre-divided subgroup is less than or equal to a first preset quantity, and a quantity of large-sized frames of point clouds in the $(i+1)^{th}$ pre-divided subgroup is greater than the first preset quantity, the $i^{th}$ pre-divided subgroup is determined to be one subgroup. The large-sized point cloud is a point cloud with an occupancy map whose size is greater than or equal to a second threshold. The occupancy map herein may be an occupancy map that is of a point cloud and that is obtained by packing a frame of point cloud based on any packing algorithm.

The first preset quantity may be a predefined value, for example, a predefined empirical value such as 4. It may be understood that if the first preset quantity is 1, manner 2-1 may be replaced as follows: when the $i^{th}$ pre-divided subgroup does not include a large-sized point cloud, and the $(i+1)^{th}$ pre-divided subgroup includes a large-sized point cloud, the $i^{th}$ pre-divided subgroup is determined to be one subgroup.

It may be understood that when different parameters are used to represent the size of the occupancy map of the point cloud, meanings of the second threshold are different. For example, when the size of the occupancy map of the point cloud is represented by a product of the height and the width of the occupancy map of the point cloud, the second threshold represents an allowable maximum value of an area of an occupancy map of a point cloud in a subgroup. For another example, when the size of the occupancy map of the point cloud is represented by the height of the occupancy map of the point cloud, the second threshold represents an allowable maximum value of the height of an occupancy map of a point cloud in a subgroup.

In an implementation, the second threshold is a predefined value, for example, a predefined empirical value. For example, when the size of the occupancy map of the point cloud is represented by a product of the height and the width of the occupancy map of the point cloud, the second threshold may be 1280 pixels.

In another implementation, the large-sized point cloud is a point cloud with an occupancy map whose size is obtained based on the global matching packing algorithm and is greater than or equal to the second threshold.

Optionally, the second threshold may be determined based on a maximum size of an occupancy map that is of a point cloud in the to-be-encoded point cloud group and that is obtained based on a candidate packing algorithm. The candidate packing algorithm is another packing algorithm other than the global matching packing algorithm, for example, an anchor packing algorithm. For example, when $NH_{i,u} > H_{max}*w2$, it is considered that a $u^{th}$ frame of point cloud in the $i^{th}$ pre-divided subgroup is a large-sized point cloud, where u≥1, and u is an integer, NH represents the height of an occupancy map that is of the $u^{th}$ frame of point cloud in the $i^{th}$ pre-divided subgroup and that is obtained based on the global matching packing algorithm, $NH_{i,u}$ represents a maximum value of the height of an occupancy map that is of a point cloud in the to-be-encoded point cloud group and that is obtained based on the candidate packing algorithm such as the anchor packing algorithm, and w2 represents a constant. Optionally, w2∈(0.5, 1.5), which is certainly not limited herein. A size of an occupancy map of a frame of point cloud is greater than or equal to a global occupancy map for a subgroup in which the frame of point cloud is located. Further optionally, w1<w2. For example, w1 is slightly less than w2.

Optionally, the second threshold may be determined based on a size of an occupancy map that is of the local point cloud and that is obtained based on the candidate packing algorithm. The candidate packing algorithm is another packing algorithm other than the global matching packing algorithm, for example, an anchor algorithm. For example, $NH_{i,u} \geq H_{i,u}*w3$, where $NH_{i,u}$ represents the height of an occupancy map that is of the $u^{th}$ frame of point cloud in the $i^{th}$ pre-divided subgroup and that is obtained based on the global matching packing algorithm, $H_{i,u}$ represents the height of an occupancy map that is of the $u^{th}$ frame of point cloud in the $i^{th}$ pre-divided subgroup and that is obtained based on the candidate packing algorithm such as the anchor packing algorithm, and w3 represents a constant. Optionally, w3∈(0.5, 3.0). Further optionally, w3 is greater than w2.

Manner 2-2: When an average value of ratios of sizes of occupancy maps obtained based on the global matching packing algorithm to sizes of occupancy maps obtained based on the candidate packing algorithm for frames of point clouds in the $i^{th}$ pre-divided subgroup is less than or equal to a third threshold, and an average value of ratios of sizes of occupancy maps obtained based on the global matching packing algorithm to sizes of occupancy maps obtained based on the candidate packing algorithm for frames of point clouds in the $(i+1)^{th}$ pre-divided subgroup is greater than the third threshold, the $i^{th}$ pre-divided subgroup is determined to be one subgroup.

The candidate packing algorithm may be another packing algorithm other than the global matching packing algorithm, for example, an anchor packing algorithm. For example, $sum(NH_{i,u}/H_{i,u})/frameCnt_i \leq$ third threshold, and $sum(NH_{i+1,v}/H_{i+1,v})/frameCnt_{i+1} >$ third threshold, where sum( ) indicates a summation operation, NH represents the height of an occupancy map that is of the $u^{th}$ frame of point cloud in the $i^{th}$ pre-divided subgroup and that is obtained based on the global matching packing algorithm, represents the height of an occupancy map that is of the $u^{th}$ frame of point cloud in the $i^{th}$ pre-divided subgroup and that is obtained based on the global matching packing algorithm, $frameCnt_i$ represents a quantity of frames of point clouds included in the $i^{th}$ pre-divided subgroup, u≥1, and u is an integer, $NH_{i+1,v}$ represents the height of an occupancy map that is of a with frame of point cloud in the $(i+1)^{th}$ pre-divided subgroup and that is obtained based on the global matching packing algorithm, $H_{i+1,v}$ represents the height of an occupancy map that is of a with frame of point cloud in the $(i+1)^{th}$ pre-divided subgroup and that is obtained based on the global matching packing algorithm, $frameCnt_{i+1}$ represents a quantity of frames of point clouds included in the $(i+1)^{th}$ pre-divided subgroup, and v≥1, and v is an integer.

Optionally, the third threshold is a predefined value. Optionally, the third threshold is a value greater than 1, for example, 1.2.

In addition, optionally, the determining the $i^{th}$ pre-divided subgroup to be one subgroup based on characteristic information of the $i^{th}$ pre-divided subgroup may include the following manner A or manner B.

Manner A: When a decrease in the size of the global occupancy map for the $(i+1)^{th}$ pre-divided subgroup compared with the size of the global occupancy map for the $i^{th}$ pre-divided subgroup is greater than or equal to a fifth threshold, it indicates that compared with using the $i^{th}$ pre-divided subgroup as one subgroup, when the $(i+1)^{th}$ pre-divided subgroup is used as one subgroup, point cloud coding efficiency decreases significantly when the global matching packing algorithm is used for packing. Therefore, the $i^{th}$ pre-divided subgroup is determined to be one of a plurality of subgroups.

It may be understood that, it is assumed that a global matched patch in the $i^{th}$ pre-divided subgroup is still a global matched patch in the $(i+1)^{th}$ subgroup, in this case, a size of the global occupancy map for the $(i+1)^{th}$ pre-divided subgroup is greater than or equal to a size of the global occupancy map for the $i^{th}$ pre-divided subgroup. However, there may be a case in which a group of global matched patches in the $i^{th}$ pre-divided subgroup are not global matched patches in the $(i+1)^{th}$ pre-divided subgroup. In this case, a size of the global occupancy map for the $(i+1)^{th}$ pre-divided subgroup may be less than a size of the global occupancy map for the $i^{th}$ pre-divided subgroup. In consideration of this reason, this manner is provided.

Manner B: The characteristic information of the $i^{th}$ pre-divided subgroup includes an area of a union patch occupancy map for the $i^{th}$ pre-divided subgroup. Correspondingly, when a decrease in a total area of the union patch occupancy map for the $(i+1)^{th}$ pre-divided subgroup compared with a total area of the union patch occupancy map for the $i^{th}$ pre-divided subgroup is greater than or equal to a fourth threshold, it indicates that compared with using the $i^{th}$ pre-divided subgroup as one subgroup, when the $(i+1)^{th}$ pre-divided subgroup is used as one subgroup, point cloud coding efficiency decreases significantly when the global matching packing algorithm is used for packing. Therefore, the $i^{th}$ pre-divided subgroup is determined to be one subgroup. For related description of this manner, refer to the foregoing related description of manner A. Details are not described herein again.

S502: Write the subgroup information of the N frames of point clouds into a bitstream.

In a possible embodiment, writing the subgroup information of the N frames of point clouds into a bitstream includes writing $N_0, N_1, \ldots, N_{M-1}$, and/or M into the bitstream, where M is greater than or equal to 1, or writing (M−1) values in values of $N_0, N_1, \ldots,$ and $N_{M-1}$ and M into the bitstream, where M is greater than or equal to 1, $N_m$ represents a quantity of frames of point clouds in an $m^{th}$ subgroup of the M subgroups, and m=0, 1, ..., and M−1.

The writing $N_0, N_1, \ldots, N_{M-1}$, and/or M into the bitstream includes writing only M into the bitstream, where M=1 in this case, that is, N frames of point clouds are divided into one group, writing $N_0, N_1, \ldots,$ and $N_{M-1}$ into the bitstream, where M is greater than or equal to 1, or writing $N_0, N_1, N_{M-1}$, and M into the bitstream, where M is greater than or equal to 1.

It should be noted that, writing only M into the bitstream is performed when M=1. M=1 means that N frames of point clouds are divided into one group. (M−1) values in values of $N_0, N_1, \ldots,$ and $N_{M-1}$ means any (M−1) values in values of $N_0, N_1, \ldots,$ and $N_{M-1}$.

In a possible embodiment, some of the N frames of point clouds are grouped adaptively, and the other frames of point clouds are grouped based on a fixed frame length. Therefore, the subgroup information of the N frames of point clouds can be written into a bitstream, which includes writing T frames in $N_0, N_1, \ldots,$ and $N_{M-1}$ and/or T into the bitstream.

T frames in $N_0, N_1, \ldots,$ and $N_{M-1}$ may each mean a quantity of frames of point clouds included in each of T consecutive subgroups in terms of a division order among the M subgroups.

It should be noted herein that one or more of $N_0, N_1, \ldots,$ and $N_{M-1}$ can be written into the bitstream by using a fixed-length encoding scheme or a variable-length encoding scheme. The fixed-length encoding scheme means that encoding is performed by using a fixed quantity of bits. The variable-length encoding scheme includes but is not limited to an arithmetic encoding scheme and an exponential Columbus encoding scheme.

For example, it is assumed that N=32, M=5, $N_0$=5, $N_1$=7, $N_2$=6, $N_3$=6, and $N_4$=8, that is, 32 frames of point clouds are divided into five subgroups. A quantity of frames of point clouds in a zeroth subgroup is 5, a quantity of frames of point clouds in a first subgroup is 7, a quantity of frames of point clouds in a second subgroup is 6, a quantity of frames of point clouds in a third subgroup is 6, and a quantity of frames of point clouds in a fourth subgroup is 8. If five bits are used for encoding, the quantity 5 of frames of point clouds in the zeroth subgroup may be encoded as 00101, the quantity 7 of frames of point clouds in the first subgroup may be encoded as 00111, the quantity 6 of frames of point clouds in the second subgroup may be encoded as 00110, the quantity 6 of frames of point clouds in the third subgroup may be encoded as 00110, and the quantity 8 of frames of point clouds in the fourth subgroup may be encoded as 01000. In this case, a quantity of frames of point clouds in the five subgroups may be encoded as 0010100111001100011001000, which includes 25 bits in total. Arithmetic encoding can be further performed on the 25 bits, thereby further improving compression efficiency of the bitstream. Certainly, encoding may alternatively be performed by using another quantity of bits. This is not limited in this application.

To save a bitstream, if a variable-length encoding scheme is used, the quantity 5 of frames of point clouds in the zeroth subgroup may be represented as 101, the quantity 7 of frames of point clouds in the first subgroup may be represented as 111, the quantity 6 of frames of point clouds in the second subgroup may be represented as 110, the quantity 6 of frames of point clouds in the third subgroup may be represented as 110, and the quantity 8 of frames of point clouds in the fourth subgroup may be represented as 1000. In this case, a quantity of frames of point clouds in the five subgroups may be encoded as 1011111101101000, which includes 16 bits in total.

In a possible embodiment, writing the subgroup information of the N frames of point clouds into a bitstream includes generating one or more bit strings based on a quantity of frames of point clouds in one or more subgroups among the M subgroups, where a length of an $s^{th}$ bit string in the one or more bit strings is a quantity of frames of point clouds included in an $s^{th}$ subgroup of the one or more subgroups, and writing one or more bit strings into the bitstream. In this manner, for the N frames of point clouds, a bit string (that is, M bit strings) including N bits may be finally obtained, and the N bits can be encoded by using N bits, or encoded by using an arithmetic encoding scheme.

In a possible embodiment, the one or more subgroups include an $(s-1)^{th}$ subgroup and an $s^{th}$ subgroup, and a value of a bit in a bit string corresponding to the $(s-1)^{th}$ subgroup is different from a value of a bit in a bit string corresponding to the $s^{th}$ subgroup. For example, the value of the bit in the bit string corresponding to the $(s-1)^{th}$ subgroup is a first identifier, and the value of the bit in the bit string corresponding to the $s^{th}$ subgroup is a second identifier. A value of a bit in a bit string corresponding to an $(s+1)^{th}$ subgroup may be a first identifier or a third identifier, and the third identifier is different from both the first identifier and the second identifier.

Optionally, the first identifier may be 0 or 1. The second identifier may be 0 or 1, and the first identifier is different from the second identifier.

In a possible embodiment, values of bits in a bit string corresponding to each of the one or more subgroups are the same. It should be noted that, that values of bits in a bit string corresponding to each subgroup are the same means that values of all bits in the bit string corresponding to each subgroup are the same.

It should be noted herein that one subgroup corresponds to one bit string, and one bit of the bit string represents a frame of point cloud in one subgroup. Therefore, a quantity of frames of point clouds included in the subgroup corresponding to the bit string can be determined based on a quantity of bits in the bit string (that is, a length of the bit string). For a bit string corresponding to one subgroup, values of all bits in the bit string are the same, and values of bits in two bit strings respectively corresponding to two adjacent subgroups in terms of a division order are different. Therefore, quantities of frames of point clouds respectively included in two adjacent subgroups in terms of a division order can be distinguished.

For example, it is assumed that N=32, M=5, $N_0$=5, $N_1$=7, $N_2$=6, $N_3$=6, $N_4$=8, a first identifier is 0, and a second identifier is 1, that is, 32 frames of point clouds are divided into five subgroups. A quantity of frames of point clouds in a zeroth subgroup is 5, a quantity of frames of point clouds in a first subgroup is 7, a quantity of frames of point clouds in a second subgroup is 6, a quantity of frames of point clouds in a third subgroup is 6, and a quantity of frames of point clouds in a fourth subgroup is 8. A bit string corresponding to the zeroth subgroup is 00000, a bit string corresponding to the first subgroup is 1111111, a bit string corresponding to the second subgroup is 000000, a bit string corresponding to the third subgroup is 111111, and a bit string corresponding to the fourth subgroup is 00000000. The five bit strings include 32 bits in total, and the 32 bits can be used for encoding, or the five bit strings can be encoded in an arithmetic encoding scheme.

In a possible embodiment, the encoding method further includes writing rotation angle information of one or more matched patches in a patch set of the first frame of point cloud in a current subgroup into the bitstream.

The rotation angle information includes a specific rotation angle value or a rotation angle index. For example, if a rotation angle value of a patch is 0, it indicates that the patch does not rotate. If the rotation angle value of the patch is 20, it indicates that the patch rotates by 20 degrees. For another example, if a rotation angle index of a patch is 0, it indicates that the patch does not rotate. If the rotation angle index of the patch is 1, it indicates that the patch rotates by 15 degrees. If the rotation angle index of the patch is 2, it indicates that the patch rotates by 30 degrees.

The rotation angle information can be written into the bitstream by using a fixed-length encoding scheme or a variable-length encoding scheme. The fixed-length encoding scheme means that encoding is performed by using a fixed quantity of bits. For example, an angle value of a patch is encoded by using 5 bits. A rotation angle value 0 of the patch may be encoded as 00000, and a rotation angle value 20 of the patch may be encoded as 10100. Alternatively, a rotation angle index 0 of the patch may be encoded as 00000, a rotation angle index 1 of the patch may be encoded as 00001, and a rotation angle index 2 of the patch may be encoded as 00010.

The variable-length encoding scheme includes but is not limited to an arithmetic encoding scheme and an exponential Columbus encoding scheme. When the variable-length encoding scheme is used, for example, a rotation angle value 0 of the patch may be encoded as 0, and a rotation angle value 10 of the patch may be encoded as 1010, or a rotation angle index 0 of the patch may be encoded as 0, a rotation angle index 1 of the patch may be encoded as 1, and a rotation angle index 2 of the patch may be encoded as 10.

It should be noted that the one or more matched patches in the patch set of the first frame of point cloud in the current subgroup are patches for which a matched patch is found in a patch set of a reference frame of the first frame of point cloud in the current subgroup. The reference frame of the first frame of point cloud in the current subgroup may be a point cloud in a previous subgroup of the current subgroup.

For example, patch A in the patch set of the first frame of point cloud in the current subgroup. If there is a patch that matches patch A in the patch set of the reference frame of the first frame of point cloud, patch A may be referred to as a matched patch.

S503: Encode the N frames of point clouds based on the subgroup information of the N frames of point clouds.

Further, encoding the N frames of point clouds based on the subgroup information of the N frames of point clouds includes performing decoding based on the subgroup information of the N frames of point clouds to obtain auxiliary information of the patch in the N frames of point clouds, and then encoding the N frames of point clouds based on the auxiliary information of the patch in the N frames of point clouds.

It can be learned that, in the solution of this embodiment of this application, subgroup information of N frames of point clouds obtained by grouping the N frames of point clouds in an adaptive grouping manner is written into a bitstream. In addition, in the adaptive grouping manner, correlation of patches among a plurality of consecutive frames of point clouds is fully considered. This fully ensures spatial consistency of patches having a matching relationship, and improves coding efficiency of point clouds. The subgroup information obtained through adaptive grouping is used to guide the decoder side in correctly decoding the point cloud data.

Figure 15:
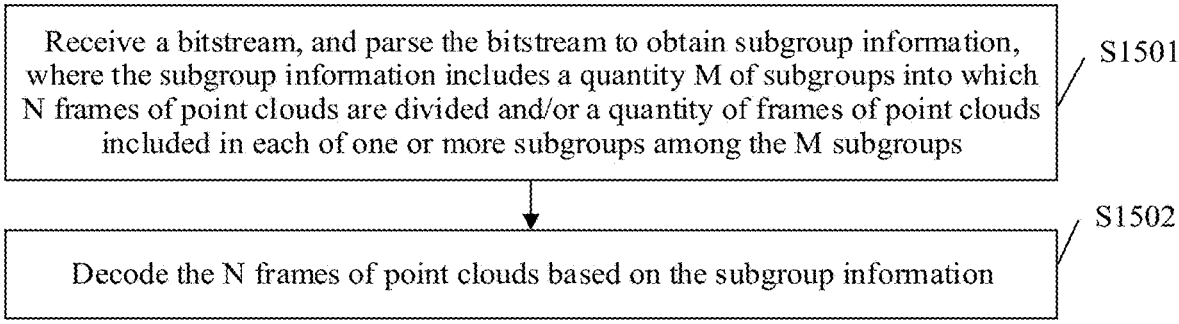
FIG. 15 is a schematic flowchart of a point cloud decoding method according to this application.

FIG. 15 is a schematic flowchart of a point cloud decoding method according to an embodiment of this application. As shown in FIG. 15, the method includes the following steps.

S1501: Receive a bitstream, and parse the bitstream to obtain subgroup information, where the subgroup information includes a quantity M of subgroups into which N frames of point clouds are divided and/or a quantity of frames of point clouds included in each of one or more subgroups among the M subgroups.

It should be noted that the M subgroups are obtained by grouping the N frames of point clouds in an adaptive grouping manner.

In a possible embodiment, parsing the bitstream to obtain subgroup information includes parsing the bitstream to obtain a quantity of frames of point clouds in each of the M subgroups and/or M, where M is greater than or equal to 1, or parsing the bitstream to obtain M and a quantity of frames of point clouds in each of M−1 subgroups, where M is greater than or equal to 1.

Parsing the bitstream to obtain a quantity of frames of point clouds in each of the M subgroups and/or M includes parsing the bitstream to obtain only M, where M=1 in this case, parsing the bitstream to obtain only $N_0, N_1, \ldots$, and $N_{M-1}$, where M is greater than or equal to 1, or parsing the bitstream to first obtain M, and then obtain $N_0, N_1, \ldots$, and $N_{M-1}$ based on M, where M is greater than or equal to 1 in this case, $N_m$ represents a quantity of frames of point clouds in an $m^{th}$ subgroup of the M subgroups, and m=0, 1, . . . , and M−1.

It should be noted that a decoder side can deduce, according to M=1, that an encoder side divides the N frames of point clouds into one subgroup, where the subgroup includes the N frames of point clouds. Further, the decoder side can decode the N frames of point clouds based on M and N.

It should be noted that the bitstream can be decoded by using a fixed-length decoding scheme or a variable-length decoding scheme to obtain all or a part of $N_0, N_1, \ldots$, and $N_{M-1}$. The fixed-length decoding scheme includes but is not limited to a fixed-bit decoding scheme, and the variable-length decoding scheme includes but is not limited to an arithmetic decoding scheme and an exponential Columbus decoding scheme.

In a possible embodiment, decoding the N frames of point clouds based on the subgroup information includes determining a quantity of frames of point clouds in a target subgroup based on N and a quantity of frames of point clouds in each of M−1 subgroups, where the target subgroup is a subgroup other than the M−1 subgroups in the M subgroups, and M is greater than or equal to 1, and decoding the N frames of point clouds based on a quantity of frames of point clouds included in each of the M subgroups.

For example, N=32, M=5, $N_0$=5, $N_1$=7, $N_3$=6, and $N_4$=8. Then, $N_2$=32−5−7−6−8=6, that is, a quantity of frames of point clouds in the second subgroup of the five subgroups may be determined to be 6.

In a possible embodiment, some of the N frames of point clouds are grouped adaptively, and the other frames of point clouds are grouped based on a fixed frame length. Therefore, the bitstream can be parsed to obtain T frames in $N_0$, $N_1, \ldots$, and $N_{M-1}$ and/or T. T frames in $N_0, N_1, \ldots$, and $N_{M-1}$ each mean a quantity of frames of point clouds included in each of T consecutive subgroups in terms of a division order among the M subgroups. After the bitstream is parsed to obtain T frames in $N_0, N_1, \ldots$, and $N_{M-1}$ and/or T, a quantity P of frames of point clouds other than point clouds included in the T subgroups in the M subgroups is obtained based on N and T frames in $N_0, N_1, \ldots$, and $N_{M-1}$. Because the P frames of point clouds are grouped based on a fixed frame length, a quantity of subgroups into which the P frames of point clouds are divided is determined based on P and the fixed frame length, that is, P/fixed frame length. Further, M and a quantity of frames of point clouds included in each of the M subgroups are determined, where M=T+P/fixed frame length.

For example, it is assumed that N=32, $N_0$=5, $N_1$=9, and a fixed frame length is 6. After the bitstream is parsed to obtain $N_0$ and $N_1$, a quantity of subgroups obtained through adaptive grouping can be determined to be 2. Then, a quantity of subgroups obtained through fixed frame length grouping can be obtained according to (32−5−9)/6=3, and it is further determined that 32 frames of point clouds are divided into five subgroups in total. A quantity of frames of point clouds in a zeroth subgroup is 5 (that is, $N_0$=5), a quantity of frames of point clouds in a first subgroup is 9 (that is, $N_1$=9), a quantity of frames of point clouds in a second subgroup is 6 (that is, $N_2$=6), a quantity of frames of point clouds in a third subgroup is 5 (that is, $N_3$=6), and a quantity of frames of point clouds in a fourth subgroup is 6 (that is, $N_4$=6).

In a possible embodiment, parsing the bitstream to obtain subgroup information includes parsing the bitstream to obtain one or more bit strings, where a length of an $s^{th}$ bit string in the one or more bit strings is a quantity of frames of point clouds included in an $s^{th}$ subgroup of the one or more subgroups, and one or more subgroups correspond to one or more bit strings.

In a possible embodiment, decoding the N frames of point clouds based on the subgroup information includes obtaining a quantity of frames of point clouds included in each of one or more subgroups based on a length of each of one or more bit strings, determining a quantity of frames of point clouds included in each of the M subgroups, where the M subgroups include one or more subgroups, and decoding the N frames of point clouds based on the quantity of frames of point clouds included in each of the M subgroups.

When a plurality of bit strings are M bit strings, the quantity of frames of point clouds included in each of the M subgroups can be determined based on a length of each of the plurality of bit strings (that is, the M bit strings).

When the plurality of bit strings are M−1 bit strings, a quantity of frames of point clouds included in each of the M−1 subgroups can be determined based on a length of each of the M−1 bit strings. Then, a quantity of frames of point clouds included in the target subgroup is determined based on N and the quantity of frames of point clouds included in each of the M−1 subgroups, where the M−1 subgroups correspond to the M−1 bit strings, and the target subgroup is a subgroup other than the M−1 subgroups in the M subgroups.

When one or more bit strings are T bit strings, where T is greater than 0 and less than M−1, a quantity of frames of point clouds included in each of the T subgroups can be determined based on a length of each of the T bit strings, and the T bit strings correspond to the T subgroups. Then, a quantity P of frames of point clouds grouped based on a fixed frame length can be determined based on N and a quantity of frames of point clouds included in each of the T subgroups, and then a quantity P of subgroups obtained through grouping in a fixed frame length grouping manner or a fixed frame length is determined based on the quantity P of frames. Further, M and a quantity of frames of point clouds included in each of the M subgroups are determined, where M=T+P/fixed frame length.

In a possible embodiment, the one or more subgroups include an $(s-1)^{th}$ subgroup and an $s^{th}$ subgroup, and a value of a bit in a bit string corresponding to the $(s-1)^{th}$ subgroup is different from a value of a bit in a bit string corresponding to the $s^{th}$ subgroup.

In a possible embodiment, values of bits in a bit string corresponding to each of the one or more subgroups are the same. That values of bits in a bit string corresponding to each subgroup are the same means that values of all bits in the bit string corresponding to each subgroup are the same.

It should be noted that, a value of a bit in a bit string corresponding to an $m^{th}$ subgroup is a first identifier, when a zeroth bit in the $m^{th}$ subgroup is a first identifier, a value of an $n^{th}$ bit is a first identifier, and a value of an $(n+1)^{th}$ bit is not a first identifier, a quantity of frames in the $m^{th}$ subgroup is determined to be n+1. The first identifier is, for example, 0 or 1.

For example, the first identifier is 0 or 1, the second identifier is 1 or 0, and the first identifier is different from the second identifier. It is assumed that a bit string obtained by parsing a bitstream is 00000111111000000011111110000000, which includes 32 bits in total, respectively corresponding to 32 frames of point clouds. Because values of all bits in one bit string are the same, and values of bits of two bit strings respectively corresponding to two adjacent subgroups in terms of a division order are different, five bit strings can be determined and 32 point clouds are divided into five subgroups, that is, M=5. A zeroth bit string is 00000, a first bit string is 111111, a second bit string is 0000000, a third bit string is 1111111, and a fourth bit string is 0000000. Because a length of a bit string is a quantity of frames of point cloud in a subgroup corresponding to the bit string, a quantity of frames of point clouds in a zeroth subgroup is 5, a quantity of frames of point clouds in a first subgroup is 6, a quantity of frames of point clouds in a second subgroup is 7, a quantity of frames of point clouds in a third subgroup is 7, and a quantity of frames of point clouds in a fourth subgroup is 7. Further, 32 frames of point clouds are decoded based on 5 and a quantity of frames of point clouds in each of the five subgroups.

For another example, the first identifier is 0 or 1, the second identifier is 1 or 0, and the first identifier is different from the second identifier. It is assumed that N=32, and a bit string obtained by parsing a bitstream is 0000011111100000001111111, which includes 25 bits in total, respectively corresponding to 25 frames of point clouds. Because values of all bits in one bit string are the same, and values of bits of two bit strings respectively corresponding to two adjacent subgroups in terms of a division order are different, four bit strings can be determined. A zeroth bit string is 00000, a first bit string is 111111, a second bit string is 0000000, and a third bit string is 1111111. Because a length of a bit string is a quantity of frames of point clouds in a subgroup corresponding to the bit string, a quantity of frames of point clouds in a zeroth subgroup is 5, a quantity of frames of point clouds in a first subgroup is 6, a quantity of frames of point clouds in a second subgroup is 7, and a quantity of frames of point clouds in a third subgroup is 7. Then, based on 32 and the quantity of point clouds in each of the foregoing four subgroups, it is determined that the quantity of frames of point clouds in the fourth subgroup is 32−5−6−7−7=7. Further, 32 frames of point clouds are decoded based on 5 (that is, the quantity of subgroups) and the quantity of frames of point clouds in each of the five subgroups.

For another example, the first identifier is 0 or 1, the second identifier is 1 or 0, and the first identifier is different from the second identifier. It is assumed that N=32, a fixed frame length is 7, and a bit string obtained by parsing a bitstream is 00000111111, which includes 11 bits in total. Because values of all bits in one bit string are the same, and values of bits of two bit strings respectively corresponding to two adjacent subgroups in terms of a division order are different, two bit strings can be determined, that is, T=2. A zeroth bit string is 00000 and a first bit string is 111111. Because a length of a bit string is a quantity of frames of point clouds in a subgroup corresponding to the bit string, a quantity of frames of point clouds in a zeroth subgroup is 5, and a quantity of frames of point clouds in a first subgroup is 6. Then, based on the fixed frame length 7 and the quantity P=21 (that is, P=32−5−6) of frames of point clouds grouped based on the fixed frame length, a quantity of subgroups obtained through grouping based on the fixed frame length is determined to be 3 (that is, 21/7). A quantity of frames of point clouds in each of the three subgroups is 7. Further, 32 frames of point clouds are decoded based on 5 (that is, the quantity of subgroups) and the quantity of frames of point clouds in each of the five subgroups.

In a possible embodiment, the bitstream is parsed to obtain rotation angle information of one or more matched patches in a patch set of the first frame of point cloud in a current subgroup, and rotation angle information of a matched patch in a patch set of a non-first frame of point cloud in the current subgroup is determined based on the rotation angle information of the one or more matched patches in the patch set of the first frame of point cloud.

The one or more matched patches in the patch set of the first frame of point cloud in the current subgroup are patches for which a matched patch is found in a patch set of a reference frame of the first frame of point cloud in the current subgroup. The reference frame of the first frame of point cloud in the current subgroup may be a point cloud in a previous subgroup of the current subgroup.

The non-first frame of point cloud in the current subgroup is a point cloud other than the first frame in the current subgroup. The matched patch in the patch set of the non-first frame of point cloud in the current subgroup is a patch that is in the patch set of the non-first frame of point cloud in the current subgroup and that has a matching relationship with the one or more matched patches in the patch set of the first frame of point cloud.

It should be noted that the bitstream can be decoded by using a fixed-length decoding scheme or a variable-length decoding scheme to obtain the rotation angle information of the one or more matched patches. The fixed-length decoding scheme includes but is not limited to a fixed-bit decoding scheme, and the variable-length decoding scheme includes but is not limited to an arithmetic decoding scheme and an exponential Columbus decoding scheme.

For example, it is assumed that the current subgroup includes four frames of point clouds, which are respectively point cloud 0, point cloud 1, point cloud 2, and point cloud 3. Point cloud 0 is the first frame of point cloud in the current subgroup, patch A is a matched patch in point cloud 0, and patch A has matching relationships with patch B in point cloud 1, patch C in point cloud 2, and patch D in point cloud 3. Rotation angle information of patch B in point cloud 1, rotation angle information of patch C in point cloud 2, and rotation angle information of patch D in point cloud 3 can be determined based on rotation angle information of patch A.

The rotation angle information includes a specific rotation angle value or a rotation angle index. For example, if a rotation angle value of a patch is 0, it indicates that the patch does not rotate. If the rotation angle value of the patch is 20, it indicates that the patch rotates by 20 degrees. For another example, if a rotation angle index of a patch is 0, it indicates that the patch does not rotate. If the rotation angle index of the patch is 1, it indicates that the patch rotates by 15 degrees. If the rotation angle index of the patch is 2, it indicates that the patch rotates by 30 degrees.

S1502: Decode the N frames of point clouds based on the subgroup information. Decoding the N frames of point clouds based on the subgroup information includes obtaining auxiliary information of a patch in the N frames of point clouds based on the subgroup information, and reconstructing the N frames of point clouds based on the auxiliary information of the patch in the N frames of point clouds.

It can be learned that, in the solution of this embodiment of this application, subgroup information of N frames of point clouds obtained by grouping the N frames of point clouds in an adaptive grouping manner is written into a bitstream. In this way, a decoder side can correctly decode the data of the N frames of point clouds based on the subgroup information of the N frames of point clouds, and encoding and decoding efficiency is improved.

In a possible embodiment, an embodiment of this application further provides a point cloud encoding method, including obtaining rotation angle information of one or more matched patches in a patch set of the first frame of point cloud in a current subgroup, and writing the rotation angle information of the one or more matched patches in the patch set of the first frame of point cloud in the current subgroup into a bitstream.

The current subgroup is obtained by grouping the N frames of point clouds in an adaptive grouping manner.

The one or more matched patches in the patch set of the first frame of point cloud in the current subgroup are patches for which a matched patch is found in a patch set of a reference frame of the first frame of point cloud in the current subgroup. The reference frame of the first frame of point cloud in the current subgroup may be a point cloud in a previous subgroup of the current subgroup.

The rotation angle information includes a specific rotation angle value or a rotation angle index. For example, if a rotation angle value of a patch is 0, it indicates that the patch does not rotate. If the rotation angle value of the patch is 20, it indicates that the patch rotates by 20 degrees. For another example, if a rotation angle index of a patch is 0, it indicates that the patch does not rotate. If the rotation angle index of the patch is 1, it indicates that the patch rotates by 15 degrees. If the rotation angle index of the patch is 2, it indicates that the patch rotates by 30 degrees.

The rotation angle information can be written into the bitstream by using a fixed-length encoding scheme or a variable-length encoding scheme. The fixed-length encoding scheme means that encoding is performed by using a fixed quantity of bits. For example, an angle value of a patch is encoded by using 5 bits. A rotation angle value 0 of the patch may be encoded as 00000, and a rotation angle value 20 of the patch may be encoded as 10100. Alternatively, a rotation angle index 0 of the patch may be encoded as 00000, a rotation angle index 1 of the patch may be encoded as 00001, and a rotation angle index 2 of the patch may be encoded as 00010.

The variable-length encoding scheme includes but is not limited to an arithmetic encoding scheme and an exponential Columbus encoding scheme. When the variable-length encoding scheme is used, for example, a rotation angle value 0 of the patch may be encoded as 0, and a rotation angle value 10 of the patch may be encoded as 1010, or a rotation angle index 0 of the patch may be encoded as 0, a rotation angle index 1 of the patch may be encoded as 1, and a rotation angle index 2 of the patch may be encoded as 10.

In a possible embodiment, an embodiment of this application further provides a point cloud decoding method, including receiving a bitstream, parsing the bitstream to obtain rotation angle information of one or more matched patches in a patch set of the first frame of point cloud in a current subgroup, and determining rotation angle information of a matched patch in a patch set of a non-first frame of point cloud in the current subgroup based on the rotation angle information of the one or more matched patches in the patch set of the first frame of point cloud, where rotation angle information of a matched patch in a point cloud in the current subgroup is used to decode the point cloud in the current subgroup.

The one or more matched patches in the patch set of the first frame of point cloud in the current subgroup are patches for which a matched patch is found in a patch set of a reference frame of the first frame of point cloud in the current subgroup. The reference frame of the first frame of point cloud in the current subgroup may be a point cloud in a previous subgroup of the current subgroup.

A non-first frame of point cloud in the current subgroup is a point cloud other than the first frame in the current subgroup. The matched patch in the patch set of the non-first frame of point cloud in the current subgroup is a patch that is in the patch set of the non-first frame of point cloud in the current subgroup and that has a matching relationship with the one or more matched patches in the patch set of the first frame of point cloud.

For example, it is assumed that the current subgroup includes four frames of point clouds, which are respectively point cloud 0, point cloud 1, point cloud 2, and point cloud 3. Point cloud 0 is the first frame of point cloud in the current subgroup, patch A is a matched patch in point cloud 0, and patch A has matching relationships with patch B in point cloud 1, patch C in point cloud 2, and patch D in point cloud 3. Rotation angle information of patch B in point cloud 1, rotation angle information of patch C in point cloud 2, and rotation angle information of patch D in point cloud 3 can be determined based on rotation angle information of patch A.

It should be noted that decoding the current subgroup includes but is not limited to the rotation angle information of the matched patch in the point cloud in the current subgroup, and may further include rotation angle information of a non-matched patch in a point cloud in the current subgroup.

The rotation angle information includes a specific rotation angle value or a rotation angle index. For example, if a rotation angle value of a patch is 0, it indicates that the patch does not rotate. If the rotation angle value of the patch is 20, it indicates that the patch rotates by 20 degrees. For another example, if a rotation angle index of a patch is 0, it indicates that the patch does not rotate. If the rotation angle index of the patch is 1, it indicates that the patch rotates by 15 degrees. If the rotation angle index of the patch is 2, it indicates that the patch rotates by 30 degrees.

It should be noted that the bitstream can be decoded by using a fixed-length decoding scheme or a variable-length decoding scheme to obtain the rotation angle information of the one or more matched patches. The fixed-length decoding scheme includes but is not limited to a fixed-bit decoding scheme, and the variable-length decoding scheme includes but is not limited to an arithmetic decoding scheme and an exponential Columbus decoding scheme.

In a possible embodiment, an embodiment of this application provides another point cloud encoding method, including determining indication information, where the indication information is used to indicate whether to encode a point cloud according to a target encoding method, and the target encoding method includes all or some of the point cloud encoding methods included in this application, and writing the indication information into a bitstream.

In a possible embodiment, an embodiment of this application provides another point cloud decoding method, including parsing a bitstream to obtain indication information, where the indication information is used to indicate whether to decode a point cloud according to a target decoding method, and the target decoding method includes all or some of the point cloud decoding methods included in this application, and when the indication information is used to indicate to decode the point cloud according to the target decoding method, decoding the point cloud according to the target decoding method.

It can be learned that, in the solution of this embodiment of this application, the bitstream is parsed to obtain subgroup information of the N frames of point clouds, and the subgroup information is obtained by grouping the N frames of point clouds in an adaptive grouping manner. In the adaptive grouping manner, correlation of patches among a plurality of consecutive frames of point clouds is fully considered. This fully ensures spatial consistency of patches having a matching relationship, and improves coding efficiency of point clouds. The subgroup information obtained through adaptive grouping is used to guide the decoder side in decoding the point cloud data.

Figure 16:
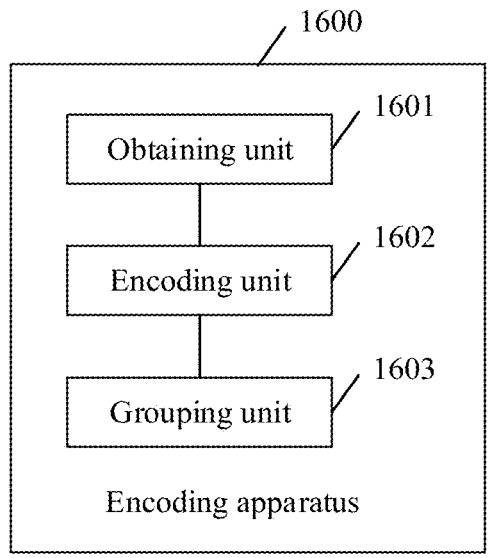
FIG. 16 is a schematic structural diagram of a point cloud encoding apparatus according to this application.

FIG. 16 is a schematic structural diagram of a point cloud encoding apparatus according to an embodiment of this application. As shown in FIG. 7, the encoding apparatus 1600 includes an obtaining unit 1601, configured to obtain subgroup information of N frames of point clouds, where the subgroup information includes a quantity M of subgroups into which the N frames of point clouds are divided and/or a quantity of frames of point clouds included in each of one or more subgroups among the M subgroups, and an encoding unit 1602, configured to write the subgroup information of the N frames of point clouds into a bitstream.

The encoding unit 1602 is further configured to encode the N frames of point clouds based on the subgroup information.

In a possible embodiment, the encoding apparatus 1600 further includes a grouping unit 1603, configured to divide the N frames of point clouds into M subgroups, where the dividing the N frames of point clouds into M subgroups includes pre-dividing a plurality of frames of point clouds in the N frames of point clouds to obtain a pre-divided subgroup, and determining the pre-divided subgroup to be one of the M subgroups based on characteristic information of the pre-divided subgroup, where the characteristic information is used to represent a size of an occupancy map of a point cloud in the pre-divided subgroup.

In a possible embodiment, in terms of writing the subgroup information of the N frames of point clouds into a bitstream, the encoding unit is further configured to write $N_0, N_1, \ldots, N_{M-1}$, and/or M into the bitstream, where M is greater than or equal to 1, or write (M−1) values in values of $N_0, N_1, \ldots,$ and $N_{M-1}$ and M into the bitstream, where M is greater than or equal to 1, $N_m$ represents a quantity of frames of point clouds in an $m^{th}$ subgroup of the M subgroups, and m=0, 1, . . . , and M−1.

In a possible embodiment, in terms of writing the subgroup information of the N frames of point clouds into a bitstream, the encoding unit 1602 is further configured to generate one or more bit strings based on a quantity of frames of point clouds in one or more subgroups among the M subgroups, where a length of an $s^{th}$ bit string in the one or more bit strings is a quantity of frames of point clouds included in an $s^{th}$ subgroup of the one or more subgroups, and write the one or more bit strings into the bitstream.

In a possible embodiment, the one or more subgroups include an $(s-1)^{th}$ subgroup and an $s^{th}$ subgroup, and a value of a bit in a bit string corresponding to the $(s-1)^{th}$ subgroup is different from a value of a bit in a bit string corresponding to the $s^{th}$ subgroup.

In a possible embodiment, values of bits in a bit string corresponding to each of the one or more subgroups are the same.

In a possible embodiment, the encoding unit 1602 is further configured to write rotation angle information of one or more matched patches in a patch set of the first frame of point cloud in a current subgroup into the bitstream.

It should be noted that the obtaining unit 1601 and the grouping unit 1603 are configured to perform related content of step S501 in the embodiment shown in FIG. 5, and the encoding unit 1602 is configured to perform related content of steps S502 and S503 in the embodiment shown in FIG. 5. In an example, a location of the encoding apparatus 1600 corresponds to the auxiliary information encoding module 108 in FIG. 2. In other words, functions of the obtaining unit 1601, the encoding unit 1602, and the grouping unit 1603 can be implemented by the auxiliary information encoding module 108 in FIG. 2. Certainly, this application is not limited thereto.

Figure 17:
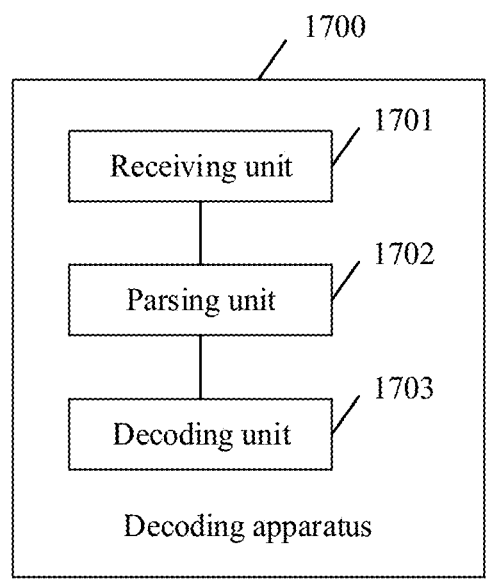
FIG. 17 is a schematic structural diagram of a point cloud decoding apparatus according to this application.

FIG. 17 is a schematic structural diagram of a point cloud decoding apparatus according to an embodiment of this application. As shown in FIG. 17, the decoding apparatus 1700 includes a receiving unit 1701, configured to receive a bitstream, a parsing unit 1702, configured to parse the bitstream to obtain subgroup information, where the subgroup information includes a quantity M of subgroups into which N frames of point clouds are divided and/or a quantity of frames of point clouds included in each of one or more subgroups among the M subgroups, and a decoding unit 1703, configured to decode the N frames of point clouds based on the subgroup information.

In a possible embodiment, the parsing unit 1702 is further configured to parse the bitstream to obtain a quantity of frames of point clouds in each of the M subgroups and/or M, where M is greater than or equal to 1, or parse the bitstream to obtain M and a quantity of frames of point clouds in each of M−1 subgroups, where M is greater than or equal to 1.

In a possible embodiment, the decoding unit 1703 is further configured to determine a quantity of frames of point clouds in a target subgroup based on N and a quantity of frames of point clouds in each of M−1 subgroups, where the target subgroup is a subgroup other than the M−1 subgroups in the M subgroups, and M is greater than or equal to 1, and decode the N frames of point clouds based on a quantity of frames of point clouds included in each of the M subgroups.

In a possible embodiment, the parsing unit 1702 is further configured to parse the bitstream to obtain one or more bit strings, where a length of an $s^{th}$ bit string in the one or more bit strings is a quantity of frames of point clouds included in an $s^{th}$ subgroup of the one or more subgroups, and one or more subgroups correspond to one or more bit strings.

In a possible embodiment, the decoding unit 1703 is further configured to obtain a quantity of frames of point clouds included in each of one or more subgroups based on a length of each of one or more bit strings, determine a quantity of frames of point clouds included in each of the M subgroups, where the M subgroups include one or more subgroups, and decode the N frames of point clouds based on the quantity of frames of point clouds included in each of the M subgroups.

In a possible embodiment, the one or more subgroups include an $(s-1)^{th}$ subgroup and an $s^{th}$ subgroup, and a value of a bit in a bit string corresponding to the $(s-1)^{th}$ subgroup is different from a value of a bit in a bit string corresponding to the $s^{th}$ subgroup.

In a possible embodiment, values of bits in a bit string corresponding to each of the one or more subgroups are the same.

In a possible embodiment, the parsing unit 1702 is further configured to parse the bitstream to obtain rotation angle information of one or more matched patches in a patch set of the first frame of point cloud in a current subgroup, and determine rotation angle information of a matched patch in a patch set of a non-first frame of point cloud in the current subgroup based on the rotation angle information of the one or more matched patches in the patch set of the first frame of point cloud.

It should be noted that the receiving unit 1701 and the parsing unit 1702 are configured to perform related content of step S1501 in the embodiment shown in FIG. 15, and the decoding unit 1703 is configured to perform related content of step S1502 in the embodiment shown in FIG. 15. In an example, a location of the decoding apparatus 1700 corresponds to the auxiliary information decoding module 204 in FIG. 4. In other words, functions of the receiving unit 1701, the parsing unit 1702, and the decoding unit 1703 can be implemented by the auxiliary information decoding module 204 in FIG. 4. Certainly, this application is not limited thereto.

Figure 18:
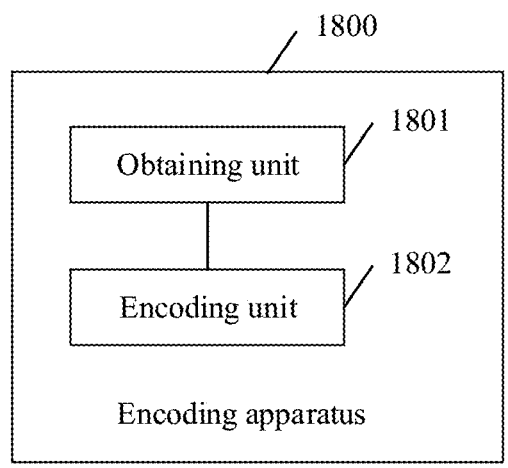
FIG. 18 is a schematic structural diagram of a point cloud encoding apparatus according to this application.

FIG. 18 is a schematic structural diagram of a point cloud encoding apparatus according to an embodiment of this application. As shown in FIG. 18, the encoding apparatus 1800 includes an obtaining unit 1801, configured to obtain rotation angle information of one or more matched patches in a patch set of the first frame of point cloud in a current subgroup, and an encoding unit 1802, configured to write the rotation angle information of the one or more matched patches in the patch set of the first frame of point cloud in the current subgroup into the bitstream.

It should be noted that, in an example, a location of the encoding apparatus 1800 corresponds to the auxiliary information encoding module 108 in FIG. 2. In other words, functions of the obtaining unit 1801 and the encoding unit 1802 can be implemented by the auxiliary information encoding module 108 in FIG. 2. Certainly, this application is not limited thereto.

Figure 19:
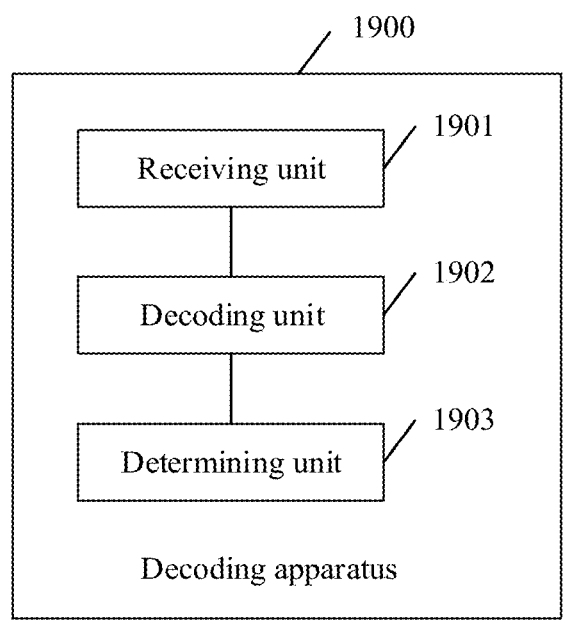
FIG. 19 is a schematic structural diagram of a point cloud decoding apparatus according to this application.

FIG. 19 is a schematic structural diagram of another point cloud decoding apparatus according to an embodiment of this application. As shown in FIG. 19, the decoding apparatus 1900 includes a receiving unit 1901, configured to receive a bitstream, a decoding unit 1902, configured to parse the bitstream to obtain rotation angle information of one or more matched patches in a patch set of the first frame of point cloud in a current subgroup, and a determining unit 1903, configured to determine rotation angle information of a matched patch in a patch set of a non-first frame of point cloud in the current subgroup based on the rotation angle information of the one or more matched patches in the patch set of the first frame of point cloud, where rotation angle information of a matched patch in a point cloud in the current subgroup is used to decode the point cloud in the current subgroup.

It should be noted that, in an example, a location of the decoding apparatus 1900 corresponds to the auxiliary information decoding module 204 in FIG. 4. In other words, functions of the receiving unit 1901, the decoding unit 1902, and the determining unit 1903 can be implemented by the auxiliary information decoding module 204 in FIG. 4. Certainly, this application is not limited thereto.

Figure 20:
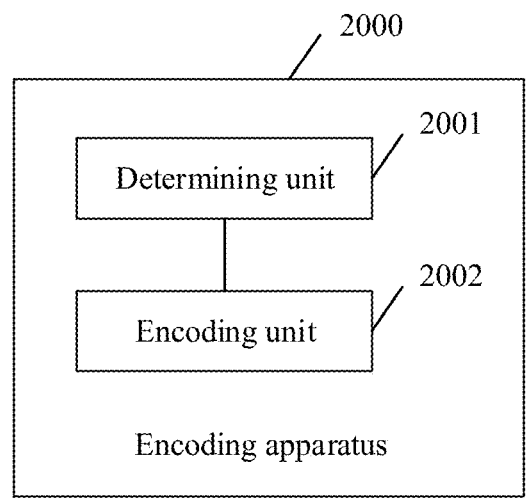
FIG. 20 is a schematic structural diagram of a point cloud encoding apparatus according to this application.

FIG. 20 is a schematic structural diagram of a point cloud encoding apparatus according to an embodiment of this application. As shown in FIG. 20, the encoding apparatus 2000 includes a determining unit 2001, configured to determine indication information, where the indication information is used to indicate whether to encode a point cloud according to a target encoding method, and the target encoding method includes some or all steps of the point cloud encoding method according to the first aspect or the point cloud encoding method according to the third aspect, and an encoding unit 2002, configured to write the indication information into a bitstream.

It should be noted that, in an example, a location of the encoding apparatus 2000 corresponds to the auxiliary information encoding module 108 in FIG. 2. In other words, functions of the determining unit 2001 and the encoding unit 2002 can be implemented by the auxiliary information encoding module 108 in FIG. 2. Certainly, this application is not limited thereto.

Figure 21:
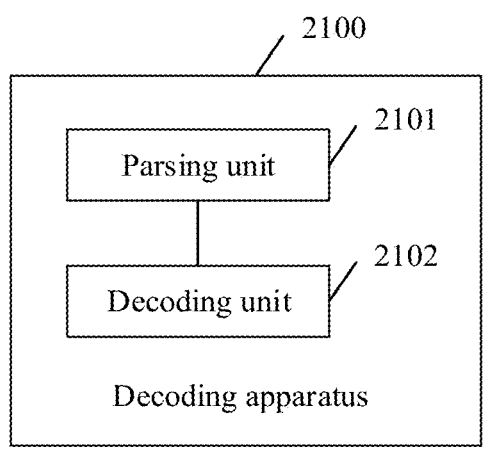
FIG. 21 is a schematic structural diagram of a point cloud decoding apparatus according to this application.

FIG. 21 is a schematic structural diagram of another point cloud decoding apparatus according to an embodiment of this application. As shown in FIG. 21, the decoding apparatus 2100 includes a parsing unit 2101, configured to parse a bitstream to obtain indication information, where the indication information is used to indicate whether to decode a point cloud according to a target decoding method, and the target decoding method includes some or all steps of the point cloud decoding method in the embodiment shown in FIG. 15, or the point cloud decoding method according to the fourth aspect, and a decoding unit 2102, configured to when the indication information is used to indicate to decode the point cloud according to the target decoding method, decode the point cloud according to the target decoding method.

It should be noted that, in an example, a location of the decoding apparatus 2100 corresponds to the auxiliary information decoding module 204 in FIG. 4. In other words, functions of the parsing unit 2101 and the decoding unit 2102 can be implemented by the auxiliary information decoding module 204 in FIG. 4. Certainly, this is not limited in this application.

Figure 22:
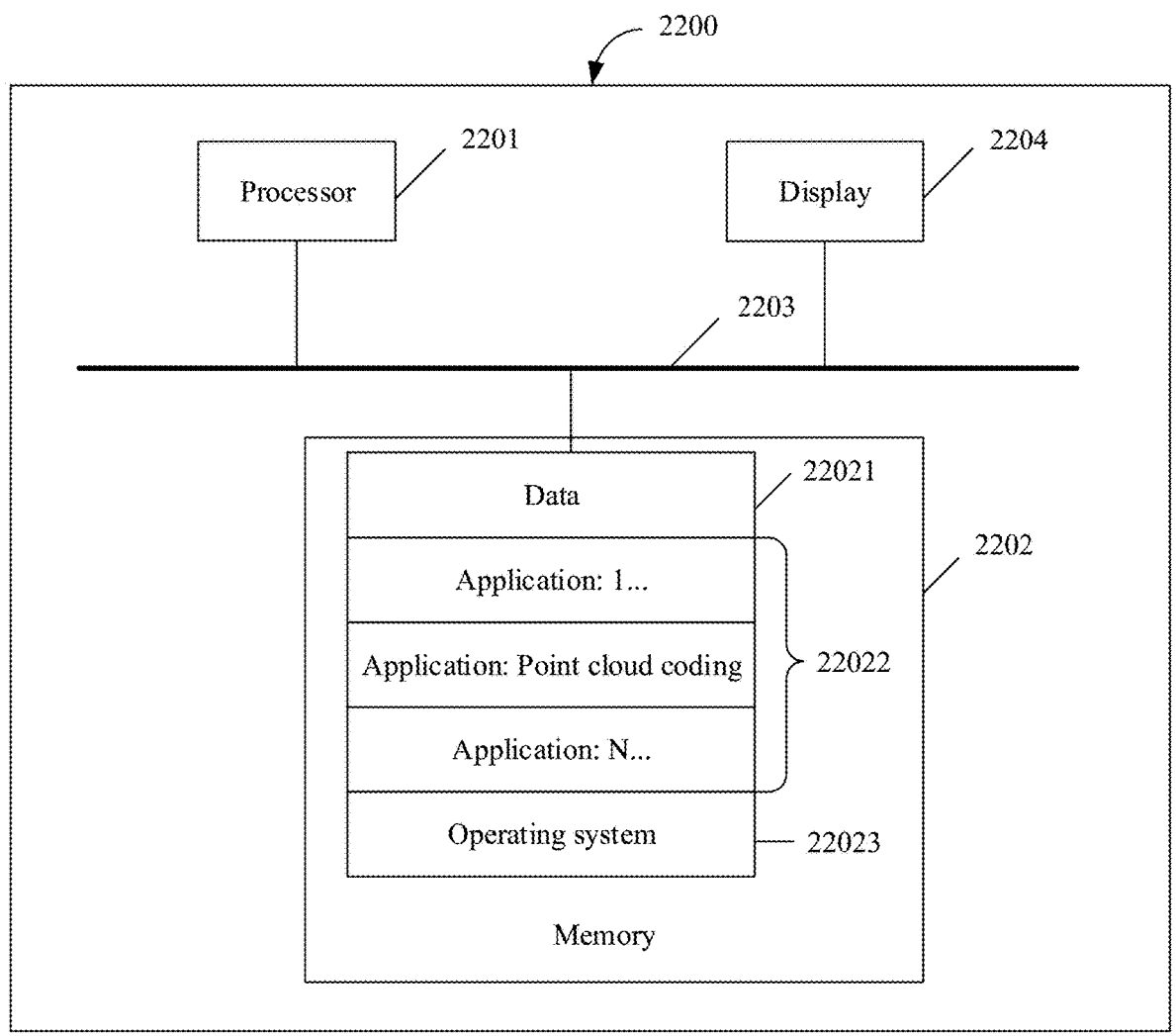
FIG. 22 is a schematic block diagram of an implementation of a coding apparatus according to an embodiment of this application.

FIG. 22 is a schematic block diagram of a coding apparatus 2200 according to an embodiment of this application. The coding apparatus 2200 may include a processor 2201, a memory 2202, and a bus system 2203. The processor 2201 and the memory 2202 are connected to each other through the bus system 2203. The memory 2202 is configured to store instructions, and the processor 2201 is configured to execute the instructions stored in the memory 2202, to perform various point cloud encoding or decoding methods described in this application, and particularly perform a method for performing filtering on a current image block based on a block size of the current image block. To avoid repetition, details are not described herein again.

In this embodiment of this application, the processor 2201 may be a central processing unit (CPU), or the processor 2201 may be another general-purpose processor, a DSP, an ASIC, an FPGA, another programmable logic device, a discrete gate, a transistor logic device, a discrete hardware component, or the like.

The memory 2202 may include a ROM device or a RAM device. Any other storage device of an appropriate type may also be used as the memory 2202. The memory 2202 may include code and data 22021 that are accessed by the processor 2201 through the bus 2203. The memory 2202 may further include an operating system 22023 and an application program 22022. The application program 22022 includes at least one program that allows the processor 2201 to perform the point cloud encoding or decoding method described in this application (especially a point cloud subgroup information encoding and decoding method described in this application). For example, the application program 22022 may include applications 1 to N, and further include a point cloud encoding or decoding application (or a point cloud coding application) for performing the point cloud encoding or decoding method described in this application.

In addition to a data bus, the bus system 2203 may further include a power bus, a control bus, a status signal bus, and the like. However, for clear description, various types of buses in the figure are marked as the bus system 2203.

Optionally, the coding apparatus 2200 may further include one or more output devices, for example, a display 2204. In an example, the display 2204 may be a touch sensitive display that combines a display and a touch sensitive unit that is operable to sense a touch input. The display 2204 may be connected to the processor 2201 through the bus 2203.

It should be noted that the coding apparatus 2200 may perform the point cloud encoding method in this application, or may perform the point cloud decoding method in this application.

A person skilled in the art can understand that, the functions described with reference to various illustrative logical blocks, modules, and algorithm steps disclosed and described in this specification can be implemented by hardware, software, firmware, or any combination thereof. If the functions are implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communication protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of instructions or data structures and that can be accessed by a computer. In addition, any connection is properly termed a computer-readable medium. For example, if the instructions are transmitted from a website, a server, or another remote source through a coaxial cable, an optical fiber, a twisted pair, a DSL, or wireless technologies such as infrared, radio, and microwave, the coaxial cable, the optical fiber, the twisted pair, the DSL, or the wireless technologies such as infrared, radio, and microwave are included in a definition of the medium. However, it may be understood that the computer-readable storage medium and the data storage medium do not include connections, carriers, signals, or other transitory media, but actually mean non-transitory tangible storage media. Disks and discs used in this specification include a CD, a laser disc, an optical disc, a DVD, and a BLU-RAY disc. The disks usually reproduce data magnetically, whereas the discs reproduce data optically by using lasers. Combinations of the foregoing should also be included in the scope of the computer-readable medium.

The instructions may be executed by one or more processors such as one or DSPs, general-purpose microprocessors, ASICs, FPGAs, or other equivalent integrated circuits or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules used for encoding and decoding, or may be incorporated into a combined codec. In addition, the technologies may be all implemented in one or more circuits or logic elements. In an example, various illustrative logical blocks, units, and modules in the encoder 100 and the decoder 200 may be understood as corresponding circuit devices or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A point cloud encoding apparatus comprising:
  a memory configured to store instructions; and
  a processor coupled to the memory and configured to execute the instructions, to cause the apparatus to be configured to:
    obtain subgroup information of N frames of point clouds, wherein the subgroup information comprises a quantity M of subgroups into which the N frames of point clouds are divided or a quantity of frames of point clouds comprised in each of one or more subgroups among the M subgroups;
    write the subgroup information into a bitstream; and
    encode the N frames of point clouds into the bitstream based on the subgroup information.

2. The point cloud encoding apparatus of claim 1, wherein before obtaining the subgroup information, the instructions further cause the apparatus to be configured to divide the N frames of point clouds into the M subgroups, and wherein when dividing the N frames of point clouds into the M subgroups, the instructions further cause the apparatus to be configured to:

pre-divide a plurality of frames of point clouds in the N frames of point clouds to obtain a pre-divided subgroup; and determine the pre-divided subgroup to be one of the M subgroups based on characteristic information of the pre-divided subgroup, wherein the characteristic information represents a size of an occupancy map of a point cloud in the pre-divided subgroup.

3. The point cloud encoding apparatus of claim 1, wherein the instructions further cause the apparatus to be configured to write $N_0, N_1, \ldots, N_{M-1}$, and M into the bitstream, wherein M is greater than or equal to 1, wherein $N_m$ represents a quantity of frames of point clouds in an $m^{th}$ subgroup of the M subgroups, and wherein m=0, 1, ..., and M−1.

4. The point cloud encoding apparatus of claim 1, wherein the instructions further cause the apparatus to be configured to:

generate one or more bit strings based on a quantity of frames of point clouds in one or more subgroups among the M subgroups, wherein a length of an $s^{th}$ bit string in the one or more bit strings is a quantity of frames of point clouds comprised in an $s^{th}$ subgroup of the one or more subgroups; and write the one or more bit strings into the bitstream.

5. The point cloud encoding apparatus of claim 4, wherein the one or more subgroups comprise an $(s-1)^{th}$ subgroup and an $s^{th}$ subgroup, and wherein a value of a bit in a bit string corresponding to the $(s-1)^{th}$ subgroup is different from a value of a bit in a bit string corresponding to the $s^{th}$ subgroup.

6. The point cloud encoding apparatus of claim 4, wherein values of bits in a bit string corresponding to each of the one or more subgroups are the same.

7. The point cloud encoding apparatus of claim 1, wherein the instructions further cause the apparatus to be configured to write rotation angle information of one or more matched patches in a patch set of a first frame of point cloud in a subgroup into the bitstream.

8. A point cloud decoding apparatus comprising:
a memory configured to store instructions; and
a processor coupled to the memory and configured to execute the instructions, that cause the apparatus to be configured to:
receive a bitstream;
parse the bitstream to obtain subgroup information, wherein the subgroup information comprises a quantity M of subgroups into which N frames of point clouds are divided or a quantity of frames of point clouds comprised in each of one or more subgroups among the M subgroups; and
decode the N frames of point clouds based on the subgroup information.

9. The point cloud decoding apparatus of claim 8, wherein the instructions further cause the apparatus to be configured to parse the bitstream to obtain a quantity of frames of point clouds in each of the M subgroups and M, and wherein M is greater than or equal to 1.

10. The point cloud decoding apparatus of claim 9, wherein the instructions further cause the apparatus to be configured to:

determine a quantity of frames of point clouds in a target subgroup based on N and a quantity of frames of point clouds in each of M−1 subgroups, wherein the target subgroup is other than the M−1 subgroups in the M subgroups, wherein M is greater than or equal to 1; and decode the N frames of point clouds based on the quantity of frames of point clouds in each of the M subgroups.

11. The point cloud decoding apparatus of claim 8, wherein the instructions further cause the apparatus to be configured to parse the bitstream to obtain one or more bit strings, wherein a length of an $s^{th}$ bit string in the one or more bit strings is a quantity of frames of point clouds comprised in an $s^{th}$ subgroup of the one or more subgroups, and wherein the one or more subgroups correspond to the one or more bit strings.

12. The point cloud decoding apparatus of claim 11, wherein the instructions further cause the apparatus to be configured to:

obtain a quantity of frames of point clouds comprised in each of the one or more subgroups based on a length of each of the one or more bit strings;

determine a quantity of frames of point clouds comprised in each of the M subgroups, wherein the M subgroups comprise the one or more subgroups; and decode the N frames of point clouds based on the quantity of frames of point clouds comprised in each of the M subgroups.

13. The point cloud decoding apparatus of claim 11, wherein the one or more subgroups comprise an $(s-1)^{th}$ subgroup and the $s^{th}$ subgroup, and wherein a value of a bit in a bit string corresponding to the $(s-1)^{th}$ subgroup is different from a value of a bit in a bit string corresponding to the $s^{th}$ subgroup.

14. The point cloud decoding apparatus of claim 11, wherein values of bits in a bit string corresponding to each of the one or more subgroups are the same.

15. The point cloud decoding apparatus of claim 8, wherein the instructions further cause the apparatus to be configured to:

parse the bitstream to obtain first rotation angle information of one or more matched patches in a patch set of a first frame of point cloud in a subgroup; and determine second rotation angle information of a matched patch in a patch set of a non-first frame of point cloud in the subgroup based on the first rotation angle information.

16. A point cloud decoding apparatus comprising:
a memory configured to store instructions; and
a processor coupled to the memory and configured to execute the instructions, that when executed by the processor cause the point cloud decoding apparatus to be configured to:
receive a bitstream;
parse the bitstream to obtain first rotation angle information of one or more first matched patches in a first patch set of a first frame of a point cloud in a current subgroup; and
determine second rotation angle information of a second matched patch in a second patch set of a non-first frame of the point cloud based on the first rotation angle information,
wherein the second rotation angle information is for decoding the point cloud.

17. The point cloud encoding apparatus of claim 1, wherein the instructions further cause the point cloud encoding apparatus to be configured to write $N_0, N_1, \ldots, N_{M-1}$, or M into the bitstream, wherein M is greater than or equal to 1, wherein $N_m$ represents a quantity of frames of point clouds in an $m^{th}$ subgroup of the M subgroups, and wherein m=0, 1, ..., and M−1.

18. The point cloud encoding apparatus of claim 1, wherein the instructions further cause the point cloud encoding apparatus to be configured to write (M−1) values in values of $N_0, N_1, \ldots,$ and $N_{M-1}$, and M into the bitstream, wherein M is greater than or equal to 1, wherein $N_m$ represents a quantity of frames of point clouds in an $m^{th}$ subgroup of the M subgroups, and wherein $m=0, 1, \ldots,$ and M−1.

19. The point cloud decoding apparatus of claim 8, wherein the instructions further cause the point cloud decoding apparatus to be configured to parse the bitstream to obtain a quantity of frames of point clouds in each of the M subgroups or M, and wherein M is greater than or equal to 1.

20. The point cloud decoding apparatus of claim 8, wherein the instructions further cause the point cloud decoding apparatus to be configured to parse the bitstream to obtain M and a quantity of frames of point clouds in each of M−1 subgroups, and wherein M is greater than or equal to 1.

* * * * *